US011533659B2

(12) United States Patent
Park et al.

(10) Patent No.: US 11,533,659 B2
(45) Date of Patent: *Dec. 20, 2022

(54) CELL CONFIGURATION FOR PACKET DUPLICATION

(71) Applicant: Comcast Cable Communications, LLC, Philadelphia, PA (US)

(72) Inventors: Kyungmin Park, Herndon, VA (US); Esmael Hejazi Dinan, McLean, VA (US); Hyoungsuk Jeon, Centreville, VA (US); Hua Zhou, Herndon, VA (US); Alireza Babaei, Fairfax, VA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 171 days.

This patent is subject to a terminal disclaimer.

(21) Appl. No.: 17/014,563

(22) Filed: Sep. 8, 2020

(65) Prior Publication Data

US 2021/0099910 A1 Apr. 1, 2021

Related U.S. Application Data

(63) Continuation of application No. 16/246,110, filed on Jan. 11, 2019, now Pat. No. 10,772,008.

(Continued)

(51) Int. Cl.
*H04W 28/06* (2009.01)
*H04W 16/18* (2009.01)
(Continued)

(52) U.S. Cl.
CPC ............. *H04W 28/065* (2013.01); *H04L 1/08* (2013.01); *H04L 41/0816* (2013.01);
(Continued)

(58) Field of Classification Search
CPC ...... H04L 1/08; H04L 41/0816; H04W 16/18; H04W 24/02; H04W 24/10; H04W 28/065; H04W 76/15; H04W 92/12
See application file for complete search history.

(56) References Cited

U.S. PATENT DOCUMENTS 8,798,093 B2  8/2014 Wu
9,432,847 B2  8/2016 Yi et al.
(Continued)

FOREIGN PATENT DOCUMENTS

CN    102448060 A    5/2012
CN    109151903 A    1/2019
(Continued)

OTHER PUBLICATIONS

R3-182243 3GPP TSG RAN WG3 Meeting #99bis, Sanya, China, Apr. 16-20, 2018, Source: Ericsson, Title: Bearer Context Setup procedure.
(Continued)

*Primary Examiner* — Eric Nowlin
(74) *Attorney, Agent, or Firm* — Banner & Witcoff, Ltd.

(57) ABSTRACT

Systems, apparatuses, and methods are described for wireless communications. Packet data convergence protocol (PDCP) packet duplication may be configured for a bearer of a wireless device. The bearer may use various cells to send packets. A base station central unit and/or a base station distributed unit may configure the cells for the bearer based on various types of information.

63 Claims, 26 Drawing Sheets

Related U.S. Application Data

(60) Provisional application No. 62/616,386, filed on Jan. 11, 2018.

(51) Int. Cl.
*H04L 41/0816* (2022.01)
*H04W 24/02* (2009.01)
*H04W 24/10* (2009.01)
*H04L 1/08* (2006.01)
*H04W 76/15* (2018.01)
*H04W 92/12* (2009.01)

(52) U.S. Cl.
CPC ............ *H04W 16/18* (2013.01); *H04W 24/02* (2013.01); *H04W 24/10* (2013.01); *H04W 76/15* (2018.02); *H04W 92/12* (2013.01)

(56) References Cited

U.S. PATENT DOCUMENTS

| | | | |
|---|---|---|---|
| 9,596,674 | B2 | 3/2017 | Somasundaram et al. |
| 9,871,720 | B1 | 1/2018 | Tillotson |
| 9,880,870 | B1 | 1/2018 | Danilov et al. |
| 10,237,784 | B2* | 3/2019 | Loehr ............... H04W 72/0486 |
| 10,405,231 | B2 | 9/2019 | Lohr et al. |
| 10,512,036 | B2 | 12/2019 | Park et al. |
| 10,574,564 | B2 | 2/2020 | Loehr et al. |
| 10,582,507 | B2 | 3/2020 | Majmundar et al. |
| 10,608,797 | B2 | 3/2020 | Park et al. |
| 10,623,991 | B2 | 4/2020 | Jin et al. |
| 10,652,400 | B2* | 5/2020 | Westberg ............... H04M 15/88 |
| 10,772,007 | B2* | 9/2020 | Shim ............... H04W 28/14 |
| 10,869,243 | B2* | 12/2020 | Kim ............... H04L 41/0895 |
| 2008/0310367 | A1 | 12/2008 | Meylan |
| 2009/0175163 | A1 | 7/2009 | Sammour et al. |
| 2009/0190480 | A1 | 7/2009 | Sammour et al. |
| 2010/0034169 | A1 | 2/2010 | Maheshwari et al. |
| 2012/0069732 | A1 | 3/2012 | Xu et al. |
| 2013/0250828 | A1 | 9/2013 | Chou et al. |
| 2014/0079022 | A1 | 3/2014 | Wang et al. |
| 2014/0192775 | A1 | 7/2014 | Li et al. |
| 2015/0016312 | A1 | 1/2015 | Li et al. |
| 2017/0041767 | A1 | 2/2017 | Vajapeyam et al. |
| 2017/0150408 | A1 | 5/2017 | Joseph et al. |
| 2017/0202053 | A1 | 7/2017 | Rune |
| 2018/0006770 | A1 | 1/2018 | Guo et al. |
| 2018/0124642 | A1 | 5/2018 | Phuyal et al. |
| 2018/0124825 | A1 | 5/2018 | Lee et al. |
| 2018/0270713 | A1 | 9/2018 | Park et al. |
| 2018/0270895 | A1 | 9/2018 | Park et al. |
| 2018/0279168 | A1 | 9/2018 | Jheng et al. |
| 2018/0279169 | A1 | 9/2018 | Wang et al. |
| 2018/0279193 | A1 | 9/2018 | Park et al. |
| 2018/0279204 | A1 | 9/2018 | Kim et al. |
| 2018/0279218 | A1 | 9/2018 | Park et al. |
| 2018/0279262 | A1 | 9/2018 | Babaei et al. |
| 2018/0279401 | A1 | 9/2018 | Hong et al. |
| 2018/0287677 | A1 | 10/2018 | Nagaraja et al. |
| 2018/0309660 | A1 | 10/2018 | Loehr et al. |
| 2018/0310202 | A1 | 10/2018 | Lohr et al. |
| 2018/0352601 | A1 | 12/2018 | Park et al. |
| 2018/0367288 | A1 | 12/2018 | Vrzic et al. |
| 2018/0368107 | A1 | 12/2018 | Babaei et al. |
| 2018/0368132 | A1 | 12/2018 | Babaei et al. |
| 2018/0368200 | A1 | 12/2018 | Jin et al. |
| 2018/0376457 | A1 | 12/2018 | Tseng et al. |
| 2019/0037635 | A1 | 1/2019 | Guo et al. |
| 2019/0053325 | A1 | 2/2019 | Yu et al. |
| 2019/0082057 | A1* | 3/2019 | Westberg ............... H04M 15/852 |
| 2019/0098529 | A1 | 3/2019 | Park et al. |
| 2019/0098533 | A1 | 3/2019 | Babaei et al. |
| 2019/0098682 | A1 | 3/2019 | Park et al. |
| 2019/0104562 | A1 | 4/2019 | Tsai et al. |
| 2019/0132790 | A1 | 5/2019 | Lee et al. |
| 2019/0191474 | A1 | 6/2019 | Jin et al. |
| 2019/0200248 | A1 | 6/2019 | Basu Mallick et al. |
| 2019/0200249 | A1 | 6/2019 | Yoon et al. |
| 2019/0200259 | A1* | 6/2019 | Shim ............... H04L 5/001 |
| 2019/0215719 | A1 | 7/2019 | Wei et al. |
| 2019/0215726 | A1 | 7/2019 | Park et al. |
| 2019/0230529 | A1 | 7/2019 | Sadiq et al. |
| 2019/0253915 | A1 | 8/2019 | Joseph et al. |
| 2019/0253919 | A1 | 8/2019 | Wu et al. |
| 2019/0253924 | A1 | 8/2019 | Kim et al. |
| 2019/0253926 | A1 | 8/2019 | Kim et al. |
| 2019/0253986 | A1 | 8/2019 | Jeon et al. |
| 2019/0268799 | A1 | 8/2019 | Hong et al. |
| 2019/0327641 | A1 | 10/2019 | Mok et al. |
| 2019/0327772 | A1 | 10/2019 | Luo et al. |
| 2019/0342809 | A1* | 11/2019 | Kim ............... H04W 36/0058 |
| 2019/0357196 | A1 | 11/2019 | Majmundar et al. |
| 2019/0357238 | A1 | 11/2019 | Zhou et al. |
| 2020/0029379 | A1 | 1/2020 | Xiao et al. |
| 2020/0052826 | A1 | 2/2020 | Han et al. |
| 2020/0053778 | A1 | 2/2020 | Babaei et al. |
| 2020/0053826 | A1 | 2/2020 | Shi |
| 2020/0059395 | A1 | 2/2020 | Chen |
| 2020/0068437 | A1 | 2/2020 | Lohr et al. |
| 2020/0077459 | A1 | 3/2020 | Yi et al. |
| 2020/0084659 | A1 | 3/2020 | Pan et al. |
| 2020/0084663 | A1 | 3/2020 | Park et al. |
| 2020/0092814 | A1 | 3/2020 | Zhou et al. |
| 2020/0120522 | A1 | 4/2020 | Xiao et al. |
| 2020/0120569 | A1 | 4/2020 | Baek et al. |
| 2020/0120593 | A1 | 4/2020 | Park et al. |
| 2020/0382240 | A1* | 12/2020 | Centonza ............... H04W 76/12 |

FOREIGN PATENT DOCUMENTS

| | | |
|---|---|---|
| CN | 110050479 A | 7/2019 |
| EP | 3422622 A1 | 1/2019 |
| EP | 3512140 A1 | 7/2019 |
| GB | 2570134 A | 7/2019 |
| WO | 2018143703 A1 | 8/2018 |
| WO | 2018147677 A1 | 8/2018 |
| WO | 2018175199 A1 | 9/2018 |
| WO | 2018183085 A1 | 10/2018 |
| WO | 2018202933 A1 | 11/2018 |
| WO | 2018203736 A1 | 11/2018 |
| WO | 2018221926 A1 | 12/2018 |
| WO | 2018230920 A1 | 12/2018 |
| WO | 2018231425 A1 | 12/2018 |
| WO | 2018237001 A1 | 12/2018 |
| WO | 2019062801 A1 | 4/2019 |
| WO | 2019070107 A1 | 4/2019 |
| WO | 2019139530 A1 | 7/2019 |
| WO | 2019156507 A1 | 8/2019 |
| WO | 2019160773 A1 | 8/2019 |
| WO | 2019221937 A1 | 11/2019 |
| WO | 2019245339 A1 | 12/2019 |

OTHER PUBLICATIONS

R2-1713898 3GPP TSG-RAN WG2 Meeting #100, Reno, USA, Nov. 27-Dec. 1, 2017, Source: Samsung, Title: RLM RS type and L3 parameter differentiation.
Dec. 2, 2019—European Extended Search Report—EP 19173901.0.
R3-183279 3GPP TSG-RAN2 Meeting #100, Busan, Korea, May 21-25, 2019, Source: Huawei, Title: pCR to 38.460 on indication of PDCP duplication over E1 interface.
May 15, 2020—European Office Action—EP 19151473.6.
Samsung et al: "Discussions on cell information in UE context setup procedure over F1", 3GPP Draft; R3-173854_CEL-LINCONTXTSETUP V1 .0, vol. RAN WG3, No. Prague, Czech; Oct. 9, 2017-Oct. 13, 2017 Oct. 9, 2017.
Jan. 25, 2021—European Office Action—EP 19151473.6.
R3-180599 3GPP TSG-RAN WG3 NR Ad Hoc, Sophia Antipolis, France, Jan. 22-26, 2018, Source: Huawei, Title: pCR to 38.473 on UE context management for mobility handling for SA operation.
R3-180606 3GPP TSG-RAN WG3 NR Ad Hoc, Sophia Antipolis, France, Jan. 22-26, 2018, Source: NTT Docomo, Inc., Title: Summary of offline discussion on CU-DU QoS handling.

(56) References Cited

OTHER PUBLICATIONS

R3-180807 3GPP TSG-RAN WG3 Meeting #99, Athens, Greece, Feb. 26-Mar. 2, 2018, Source: CATT, Title: Discussion on activation of PDCP Duplication.
R3-181732 3GPP TSG RAN WG3 Meeting #99bis, Sanya, China, Apr. 16-20, 2018, Source: ZTE, Title: Bearer Context Modification over E1 interface for TS38.460.
R3-181733 3GPP TSG RAN WG3 Meeting #99bis, Sanya, China, Apr. 16-20, 2018, Source: ZTE, Title: Bearer Context Modification over E1 interface for TS38.463.
R3-181735 3GPP TSG RAN WG3 Meeting #99bis, Sanya, China, Apr. 16-20, 2018, Source: ZTE, Title: Discussion on PDCP COUNT wrap around.
R3-181736 3GPP TSG RAN WG3 Meeting #99bis, Sanya, China, Apr. 16-20, 2018, Source: ZTE, Title: Discussion on E1 interface setup.
R3-181833 3GPP TSG RAN WG3 Meeting #99bis, Sanya, China, Apr. 16-20, 2018, Source: NEC (Rapporteur), Title: Baseline CR for June version of TS 38.401 covering agreements of RAN3#99 on CPUP_Split.
R3-181842 3GPP TSG RAN WG3 Meeting #99bis, Sanya, China, Apr. 16-20, 2018, Source: Nokia, Nokia Shanghai Bell, Title: (TP for CPUP_Split BL CR for TS 38.401) Support of change of gNB-CU-UP.
R3-181843 3GPP TSG RAN WG3 Meeting #99bis, Sanya, China, Apr. 16-20, 2018, Source: Nokia, Nokia Shanghai Bell, Title: (TP for CPUP_Split BL CR for TS 38.401) FFS resolution for E1 overall procedures.
R3-181844 3GPP TSG RAN WG3 Meeting #99bis, Sanya, China, Apr. 16-20, 2018, Source: Nokia, Nokia Shanghai Bell, Title: Definition of gNB-CU-CP/UP.
R3-181845 3GPP TSG RAN WG3 Meeting #99bis, Sanya, China, Apr. 16-20, 2018, Source: Nokia, Nokia Shanghai Bell, Title: E1 non-UE associated functions.
R3-181846 3GPP TSG RAN WG3 Meeting #99bis, Sanya, China, Apr. 16-20, 2018, Source: Nokia, Nokia Shanghai Bell, Title: E1 non-UE associated procedures.
R3-181847 3GPP TSG RAN WG3 Meeting #99bis, Sanya, China, Apr. 16-20, 2018, Source: Nokia, Nokia Shanghai Bell, Title: gNB-CU-UP notification function.
R3-181848 3GPP TSG RAN WG3 Meeting #99bis, Sanya, China, Apr. 16-20, 2018, Source: Nokia, Nokia Shanghai Bell, Title: gNB-CU-UP notification procedure.
R3-181849 3GPP TSG RAN WG3 Meeting #99bis, Sanya, China, Apr. 16-20, 2018, Source: Nokia, Nokia Shanghai Bell, Title: Bearer Context Management procedures.
R3-181850 3GPP TSG RAN WG3 Meeting #99bis, Sanya, China, Apr. 16-20, 2018, Source: Nokia, Nokia Shanghai Bell, Title: Signalling transport for E1.
R3-181893 3GPP TSG RAN WG3 Meeting #99bis, Sanya, China, Apr. 16-20, 2018, Source: LG Electronics, KT Corp., Title: Procedures for Security Support in CU-CP/UP Separation.
R3-182056 3GPP TSG RAN WG3 Meeting #99bis, Sanya, China, Apr. 16-20, 2018, Source: LG Electronics, KT Corp., Title: Discussion on Bearer Context Modification.
R3-182078 3GPP TSG RAN WG3 Meeting #99bis, Sanya, China, Apr. 16-20, 2018, Source: Samsung, Title: E1 interface management procedures.
R3-182079 3GPP TSG RAN WG3 Meeting #99bis, Sanya, China, Apr. 16-20, 2018, Source: Samsung, Title: CU-UP Security Capability indication to CU-CP.
R3-182080 3GPP TSG RAN WG3 Meeting #99bis, Sanya, China, Apr. 16-20, 2018, Source: Samsung, Title: TP for TS 38.463 on E1 interface management.
R3-182081 3GPP TSG RAN WG3 Meeting #99bis, Sanya, China, Apr. 16-20, 2018, Source: Samsung, Title: Additional UE-associated E1 procedures.
R3-182082 3GPP TSG RAN WG3 Meeting #99bis, Sanya, China, Apr. 16-20, 2018, Source: Samsung, Title: TP for TS 38.463 on additional UE-associated E1 procedures.
R3-182109 3GPP TSG RAN WG3 Meeting #99bis, Sanya, China, Apr. 16-20, 2018, Source: Huawei, Title: Initial TPs to 38.462.
R3-182110 3GPP TSG RAN WG3 Meeting #99bis, Sanya, China, Apr. 16-20, 2018, Source: Huawei, Title: Rapporteur editorial updates to 38.462.
R3-182129 3GPP TSG RAN WG3 Meeting #99bis, Sanya, China, Apr. 16-20, 2018, Source: Huawei, Title: Inactivity monitoring in CP/UP separation.
R3-182130 3GPP TSG RAN WG3 Meeting #99bis, Sanya, China, Apr. 16-20, 2018, Source: Huawei, Title: (TP for NR BL CR for TS 38.401) On RRC state transition for CP-UP separation.
R3-182131 3GPP TSG RAN WG3 Meeting #99bis, Sanya, China, Apr. 16-20, 2018, Source: Huawei, Title: Data Forwarding in CP/UP separation.
R3-182132 3GPP TSG RAN WG3 Meeting #99bis, Sanya, China, Apr. 16-20, 2018, Source: Huawei, Title: pCR to 38.460 on QoS handling over E1.
R3-182134 3GPP TSG RAN WG3 Meeting #99bis, Sanya, China, Apr. 16-20, 2018, Source: Huawei, Title: pCR to 38.460 on secondary node modification triggered by gNB-CU-CP.
R3-182136 3GPP TSG RAN WG3 Meeting #99bis, Sanya, China, Apr. 16-20, 2018, Source: Huawei, Title: pCR to 38.460 on centralized retransmission for CP-UP separation.
R3-182224 3GPP TSG RAN WG3 Meeting #99bis, Sanya, China, Apr. 16-20, 2018, Source: Ericsson, Title: E1 support for RRC-inactive.
R3-182225 3GPP TSG RAN WG3 Meeting #99bis, Sanya, China, Apr. 16-20, 2018, Source: Ericsson, Title: Dual-connectivity configuration over E1.
R3-182226 3GPP TSG RAN WG3 Meeting #99bis, Sanya, China, Apr. 16-20, 2018, Source: Ericsson, Title: Potentials of RAN UP network function virtualization.
R3-182227 3GPP TSG RAN WG3 Meeting #99bis, Sanya, China, Feb. 26-Mar. 2, 2018, Source: Ericsson, Title: PDCP duplication configuration.
R3-182228 3GPP TSG RAN WG3 Meeting #99bis, Sanya, China, Apr. 16-20, 2018, Source: Ericsson, Vodafone, KT, AT&T, Title: Support of RAN UP network function virtualization at handover.
R3-182229 3GPP TSG RAN WG3 Meeting #99bis, Sanya, China, Apr. 16-20, 2018, Source: Ericsson, Title: Support of RAN UP network function virtualization at handover—for 38.300.
R3-182230 3GPP TSG RAN WG3 Meeting #99bis, Sanya, China, Apr. 16-20, 2018, Source: Ericsson, Title: Support of RAN UP network function virtualization at handover—for 38.413.
R3-182231 3GPP TSG RAN WG3 Meeting #99bis, Sanya, China, Apr. 16-20, 2018, Source: Ericsson, Title: Support of RAN UP network function virtualization at handover—for 38.423.
R3-182232 3GPP TSG RAN WG3 Meeting #99bis, Sanya, China, Apr. 16-20, 2018, Source: Ericsson, Title: Support of RAN UP network function virtualization at handover—for 36.300.
R3-182233 3GPP TSG RAN WG3 Meeting #99bis, Sanya, China, Apr. 16-20, 2018, Source: Ericsson, Title: Bearer Context definition.
R3-182234 3GPP TSG RAN WG3 Meeting #99bis, Sanya, China, Apr. 16-20, 2018, Source: Ericsson, Title: Resolve FFS in procedures in TS 38.401.
R3-182235 3GPP TSG RAN WG3 Meeting #99bis, Sanya, China, Apr. 16-20, 2018, Source: Ericsson, Title: Multiple TNL associations over E1.
R3-182237 3GPP TSG RAN WG3 Meeting #99bis, Sanya, China, Apr. 16-20, 2018, Source: Ericsson, Title: E1 Setup procedure.
R3-182238 3GPP TSG RAN WG3 Meeting #99bis, Sanya, China, Apr. 16-20, 2018, Source: Ericsson, Title: E1 Reset procedure.
R3-182239 3GPP TSG RAN WG3 Meeting #99bis, Sanya, China, Apr. 16-20, 2018, Source: Ericsson, Title: E1 Release procedure.
R3-182240 3GPP TSG RAN WG3 Meeting #99bis, Sanya, China, Apr. 16-20, 2018, Source: Ericsson, Title: E1 Error Indication.
R3-182241 3GPP TSG RAN WG3 Meeting #99bis, Sanya, China, Apr. 16-20, 2018, Source: Ericsson, Title: Bearer Context Modification procedure.
R3-182242 3GPP TSG RAN WG3 Meeting #99bis, Sanya, China, Apr. 16-20, 2018, Source: Ericsson, Title: E1 Configuration Update.

(56) References Cited

OTHER PUBLICATIONS

R3-174611 3GPP TSG-RAN WG3 Meeting #98, Reno, USA, Nov. 27-Dec. 1, 2017, Source: Samsung, KT, Title: Mobility procedures with high layer split.
R3-174612 3GPP TSG-RAN WG3 Meeting #98, Reno, USA, Nov. 27-Dec. 1, 2017, Source: Samsung, KT, Title: Stage 2 TP for TS38.470 on mobility related procedures.
R3-174613 3GPP TSG-RAN WG3 Meeting #98, Reno, USA, Nov. 27-Dec. 1, 2017, Source: Samsung, KT, Title: Stage 3 TP for TS38.473 on mobility related procedures.
R3-174618 3GPP TSG-RAN WG3 Meeting #98, Reno, USA, Nov. 27-Dec. 1, 2017, Source: Samsung, KT, Title: Further discussions on PDCP duplication in high-layer split.
R3-174637 3GPP TSG-RAN WG3 Meeting #98, Reno, USA, Nov. 27-Dec. 1, 2017, Source: Intel Corporation, Title: Flow Control enhancements fordownlink PDCP duplication.
R3-174638 3GPP TSG-RAN WG3 Meeting #98, Reno, USA, Nov. 27-Dec. 1, 2017, Source: Intel Corporation, Title: Flow Control enhancements for uplink PDCP duplication.
R3-174663 3GPP TSG-RAN WG3 Meeting #98, Reno, USA, Nov. 27-Dec. 1, 2017, Source: CMCC, Title: UE initial access procedure for CU-DU architecture.
R3-174769 3GPP TSG-RAN WG3 Meeting #98, Reno, USA, Nov. 27-Dec. 1, 2017, Source: Ericsson, Title: Discard the duplicated transmissions of PDCP PDUs.
R3-174772 3GPP TSG-RAN WG3 Meeting #98, Reno, USA, Nov. 27-Dec. 1, 2017, Source: Ericsson, Title: Benefits of F1AP Transaction IDs.
R3-174773 3GPP TSG-RAN WG3 Meeting #98, Reno, USA, Nov. 27-Dec. 1, 2017, Source: Ericsson, Title: Further discussion about TNL solution for F1-C.
R3-174774 3GPP TSG-RAN WG3 Meeting #98, Reno, USA, Nov. 27-Dec. 1, 2017, Source: Ericsson, Title: On parallel transactiosn over F1.
R3-174781 3GPP TSG-RAN WG3 Meeting #98, Reno, USA, Nov. 27-Dec. 1, 2017, Source: Ericsson, Title: Mobility procedures.
R3-174782 3GPP TSG-RAN WG3 Meeting #98, Reno, USA, Nov. 27-Dec. 1, 2017, Source: Ericsson, Title: Content for UE mobility command messages.
R3-174786 3GPP TSG-RAN WG3 Meeting #98, Reno, USA, Nov. 27-Dec. 1, 2017, Source: NTT Docomo, Inc., Title: How to acquire status of re-transmitted packets.
R3-174850 3GPP TSG-RAN WG3 Meeting #98, Reno, USA, Nov. 27-Dec. 1, 2017, Source: NTT Docomo, Inc., Title: Consideration on data volume reporting.
R3-174854 3GPP TSG-RAN WG3 Meeting #98, Reno, USA, Nov. 27-Dec. 1, 2017, Source: KT Corp., Title: Considerations for F1 Setup Procedure.
R3-180123 3GPP TSG-RAN WG3 NR Ad Hoc, Sophia Antipolis, France, Jan. 22-26, 2018, Source: ZTE, Title: QoS information transfer over F1 interface.
R3-180124 3GPP TSG-RAN WG3 NR Ad Hoc, Sophia Antipolis, France, Jan. 22-26, 2018, Source: ZTE, Title: Update on QoS information transfer for TS38.473.
R3-180139 3GPP TSG-RAN WG3 NR Ad Hoc, Sophia Antipolis, France, Jan. 22-26, 2018, Source: ZTE, Title: NW slicing for high layer functional split.
R3-180164 3GPP TSG-RAN WG3 NR Ad Hoc, Sophia Antipolis, France, Jan. 22-26, 2018, Source: CATT, Title: TP for 38.401 BL on UE Reconfiguration Completion procedure.
R3-180179 3GPP TSG-RAN WG3 NR Ad Hoc, Sophia Antipolis, France, Jan. 22-26, 2018, Source: CATT, Title: Discussion on UE Context Management procedure.
R3-180180 3GPP TSG-RAN WG3 NR Ad Hoc, Sophia Antipolis, France, Jan. 22-26, 2018, Source: CATT, Title: TP for TS 38.473 on UE Context Management procedure.
R3-180188 3GPP TSG-RAN WG3 NR Ad Hoc, Sophia Antipolis, France, Jan. 22-26, 2018, Source: Nokia, Nokia Shanghai Bell, Title: QoS handling for F1.
R3-180189 3GPP TSG-RAN WG3 NR Ad Hoc, Sophia Antipolis, France, Jan. 22-26, 2018, Source: Nokia, Nokia Shanghai Bell, Title: TP of QoS handling for F1 (TS38.473).
R3-180190 3GPP TSG-RAN WG3 NR Ad Hoc, Sophia Antipolis, France, Jan. 22-26, 2018, Source: Nokia, Nokia Shanghai Bell, KT, Title: User inactivity monitoring.
R3-180234 3GPP TSG-RAN WG3 NR Ad Hoc, Sophia Antipolis, France, Jan. 22-26, 2018, Source: LG Electronics Inc., KT Corp., Title: QoS aspect in UE context management function.
R3-180235 3GPP TSG-RAN WG3 NR Ad Hoc, Sophia Antipolis, France, Jan. 22-26, 2018, Source: LG Electronics Inc., KT Corp., Title: Stage 3 on QoS aspect in UE context management function.
R3-180244 3GPP TSG-RAN WG3 NR Ad Hoc, Sophia Antipolis, France, Jan. 22-26, 2018, Source: Samsung, KT, Title: UE context management update considering parameters over X2 for EN-DC.
R3-180285 3GPP TSG-RAN WG3 NR Ad Hoc, Sophia Antipolis, France, Jan. 22-26, 2018, Source: Samsung, KT, Title: User inactivity monitoring in CU-DU architecture.
R3-180286 3GPP TSG-RAN WG3 NR Ad Hoc, Sophia Antipolis, France, Jan. 22-26, 2018, Source: Samsung, KT, Title: TP for TS 38.473 on user inactivity monitoring.
R3-180300 3GPP TSG-RAN WG3 NR Ad Hoc, Sophia Antipolis, France, Jan. 22-26, 2018, Source: NEC, Title: RLC Mode indication in F1AP.
R3-180330 3GPP TSG-RAN WG3 NR Ad Hoc, Sophia Antipolis, France, Jan. 22-26, 2018, Source: CMCC, Title: QoS management over F1.
R3-180343 3GPP TSG-RAN WG3 NR Ad Hoc, Sophia Antipolis, France, Jan. 22-26, 2018, Source: Huawei, Title: Further discussions on QoS info transfer over F1.
R3-180344 3GPP TSG-RAN WG3 NR Ad Hoc, Sophia Antipolis, France, Jan. 22-26, 2018, Source: Huawei, Title: pCR to 38.473 on QoS info transfer over F1.
R3-180352 3GPP TSG-RAN WG3 NR Ad Hoc, Sophia Antipolis, France, Jan. 22-26, 2018, Source: Huawei, Title: Further discussions on UE context management.
R3-180355 3GPP TSG-RAN WG3 NR Ad Hoc, Sophia Antipolis, France, Jan. 22-26, 2018, Source: Huawei, Title: CR to BL 38.473 on inter-gNB-DU or intra-gNB-DU handover case for SA operation.
R3-180356 3GPP TSG-RAN WG3 NR Ad Hoc, Sophia Antipolis, France, Jan. 22-26, 2018, Source: Huawei, Title: pCR to 38.473 on the introduction of Handover Preparation Information for SA Operation.
R3-180357 3GPP TSG-RAN WG3 NR Ad Hoc, Sophia Antipolis, France, Jan. 22-26, 2018, Source: Huawei, Title: Further discussions on the content of serving cell info.
R3-180367 3GPP TSG-RAN WG3 NR Ad Hoc, Sophia Antipolis, France, Jan. 22-26, 2018, Source: Huawei, Title: Further discussions on confirmation to gNB-DU about completion of RRC messages.
R3-180425 3GPP TSG-RAN WG3 NR Ad Hoc, Sophia Antipolis, France, Jan. 22-26, 2018, Source: Ericsson, Title: UE radio capabilities over F1.
R3-180426 3GPP TSG-RAN WG3 NR Ad Hoc, Sophia Antipolis, France, Jan. 22-26, 2018, Source: Ericsson, Title: Cell information over F1.
R3-180427 3GPP TSG-RAN WG3 NR Ad Hoc, Sophia Antipolis, France, Jan. 22-26, 2018, Source: Ericsson, Title: UE Context Setup over the F1.
R3-180428 3GPP TSG-RAN WG3 NR Ad Hoc, Sophia Antipolis, France, Jan. 22-26, 2018, Source: Ericsson, Title: UE Reject Indication and gNB-DU admission result.
R3-180429 3GPP TSG-RAN WG3 NR Ad Hoc, Sophia Antipolis, France, Jan. 22-26, 2018, Source: Ericsson, Title: Further analysis on inactivity monitoring.
R3-180430 3GPP TSG-RAN WG3 NR Ad Hoc, Sophia Antipolis, France, Jan. 22-26, 2018, Source: Ericsson, Title: Creation of signalling connection.
R3-180431 3GPP TSG-RAN WG3 NR Ad Hoc, Sophia Antipolis, France, Jan. 22-26, 2018, Source: Ericsson, Title: RRC Container in UE Context Setup Request.

(56) References Cited

OTHER PUBLICATIONS

R3-180432 3GPP TSG-RAN WG3 NR Ad Hoc, Sophia Antipolis, France, Jan. 22-26, 2018, Source: Ericsson, Title: RLC mode indication.
R3-180433 3GPP TSG-RAN WG3 NR Ad Hoc, Sophia Antipolis, France, Jan. 22-26, 2018, Source: Ericsson, Title: Introduction of UE Reconfiguration Complete procedure.
R3-180518 3GPP TSG-RAN WG3 NR Ad Hoc, Sophia Antipolis, France, Jan. 22-26, 2018, Source: Ericsson, Vodafone, Title: UE context Setup over the F1.
R3-180596 3GPP TSG-RAN WG3 NR Ad Hoc, Sophia Antipolis, France, Jan. 22-26, 2018, Source: Ericsson, Title: UE Reject Indication.
3GPP TS 38.331 V15.0.0 (Dec. 2017), Technical Specification, 3rd Generation Partnership Project; Technical Specification Group Radio Access Network; NR; Radio Resource Control (RRC) Protocol Specification (Release 15).
3GPP TS 38.331 V15.3.0 (Sep. 2018), Technical Specification, 3rd Generation Partnership Project; Technical Specification Group Radio Access Network; NR; Radio Resource Control (RRC) Protocol Specification (Release 15).
3GPP TS 38.463 V0.2.0 (Apr. 2018), Technical Specification, 3rd Generation Partnership Project; Technical Specification Group Radio Access Network; NG-RAN; E1 application protocol (E1AP) (Release 15).
3GPP TS 38.473 V15.0.0 (Dec. 2017), Technical Specification, 3rd Generation Partnership Project; Technical Specification Group Radio Access Network; NG-RAN; F1 application protocol (F1AP) (Release 15).
3GPP TS 38.473 V15.3.0 (Sep. 2018), Technical Specification, 3rd Generation Partnership Project; Technical Specification Group Radio Access Network; NG-RAN; F1 application protocol (F1AP) (Release 15).
R2-1801279 3GPP TSG-RAN WG2 AH, Vancouver, Canada, Jan. 22-26, 2018, Source: LG Electronics Inc., Title: Restart condition of sCellDeactivationTimer with skipping operation.
R2-1712238 3GPP TSG-RAN WG2 Meeting #100, Reno, USA, Nov. 27-Dec. 1, 2017, Source: OPPO, Title: Discussion on Detailed Issues on RLM.
R2-1712276 3GPP TSG-RAN WG2 Meeting #100, Reno, USA, Nov. 27-Dec. 1, 2017, Source: Spreadtrum Communications, Title: Discussions on the IS and OOS Counting Procedure.
R2-1712308 3GPP TSG-RAN WG2 Meeting #100, Reno, USA, Nov. 27-Dec. 1, 2017, Source: TCL, Title: Interaction between PDCP and RLC Entities for duplication in NR-NR DC.
R2-1712435 3GPP TSG-RAN WG2 Meeting #100, Reno, USA, Nov. 27-Dec. 1, 2017, Source: ZTE Corporation, Title: Consideration on PDCP Duplication in NR.
R2-1712559 3GPP TSG-RAN WG2 Meeting #100, Reno, USA, Nov. 27-Dec. 1, 2017, Source: Huawei, HiSilicon, Title: RLF for NR.
R2-1712736 3GPP TSG-RAN WG2 Meeting #100, Reno, USA, Nov. 27-Dec. 1, 2017, Source: Huawei, ASUSTeK, HiSilicon, Title: PDCP operation for packet duplication.
R2-1712737 3GPP TSG-RAN WG2 Meeting #100, Reno, USA, Nov. 27-Dec. 1, 2017, Source: Huawei, HiSilicon, Title: PDCP data volume calculation for packet duplication.
R2-1712738 3GPP TSG-RAN WG2 Meeting #100, Reno, USA, Nov. 27-Dec. 1, 2017, Source: Huawei, HiSilicon, Title: Clarification on bearer type for packet duplication.
R2-1712739 3GPP TSG-RAN WG2 Meeting #100, Reno, USA, Nov. 27-Dec. 1, 2017, Source: Huawei, HiSilicon, Title: Enhancements for DL packet duplication.
R2-1712753 3GPP TSG-RAN WG2 Meeting #100, Reno, USA, Nov. 27-Dec. 1, 2017, Source: vivo, Title: RLM/RLF in NR.
R2-1712914 3GPP TSG-RAN WG2 Meeting #100, Reno, USA, Nov. 27-Dec. 1, 2017, Source: Lenovo, Motorola Mobility, Title: PDCP packet duplication.
R2-1712926 3GPP TSG-RAN WG2 Meeting #100, Reno, USA, Nov. 27-Dec. 1, 2017, Source: Ericsson, Title: PDCP duplication and discard.
R2-1712928 3GPP TSG-RAN WG2 Meeting #100, Reno, USA, Nov. 27-Dec. 1, 2017, Source: Ericsson, Title: PDCP duplication for AM operation.
R2-1712929 3GPP TSG-RAN WG2 Meeting #100, Reno, USA, Nov. 27-Dec. 1, 2017, Source: Ericsson, Title: PDCP duplication transmit procedure.
R2-1712932 3GPP TSG-RAN WG2 Meeting #100, Reno, USA, Nov. 27-Dec. 1, 2017, Source: Ericsson, Title: PDCP data volume reporting in duplication.
R2-1712964 3GPP TSG-RAN WG2 Meeting #100, Reno, USA, Nov. 27-Dec. 1, 2017, Source: Samsung, Title: Discussion on PDCP data volume calculation during PDCP Duplication.
R2-1712965 3GPP TSG-RAN WG2 Meeting #100, Reno, USA, Nov. 27-Dec. 1, 2017, Source: Institute for Information Industry (III), Title: Discussion on Uplink Packet Duplication.
R2-1713004 3GPP TSG-RAN WG2 Meeting #100, Reno, USA, Nov. 27-Dec. 1, 2017, Source: vivo, Title: Layer-2 behaviors of PDCP duplication deactivation.
R2-1713005 3GPP TSG-RAN WG2 Meeting #100, Reno, USA, Nov. 27-Dec. 1, 2017, Source: vivo, Title: PDCP duplication impacts on LCP.
R2-1713006 3GPP TSG-RAN WG2 Meeting #100, Reno, USA, Nov. 27-Dec. 1, 2017, Source: vivo, Title: Discussion on the PDCP data volume.
R2-1713009 3GPP TSG-RAN WG2 Meeting #100, Reno, USA, Nov. 27-Dec. 1, 2017, Source: vivo, Title: UE layer-2 behaviors at Scell-failure.
R2-1713584 3GPP TSG-RAN WG2 Meeting #100, Reno, USA, Nov. 27-Dec. 1, 2017, Source: Qualcomm Incorporated, Title: PDCP duplication.
R2-1713588 3GPP TSG-RAN WG2 Meeting #100, Reno, USA, Nov. 27-Dec. 1, 2017, Source: Ericsson, Title: Remaining open issues of RLM and RLF in NR.
R2-1713641 3GPP TSG-RAN WG2 Meeting #100, Reno, USA, Nov. 27-Dec. 1, 2017, Source: ITL, Title: Configuration of PDCP duplication on default DRB.
R2-1713829 3GPP TSG-RAN WG2 Meeting #100, Reno, USA, Nov. 27-Dec. 1, 2017, Source: Samsung, Title: Activation and Deactivation of PDCP Duplication.
R2-1713830 3GPP TSG-RAN WG2 Meeting #100, Reno, USA, Nov. 27-Dec. 1, 2017, Source: Samsung, Title: Discussion on CA Duplication.
R2-1713831 3GPP TSG-RAN WG2 Meeting #100, Reno, USA, Nov. 27-Dec. 1, 2017, Source: Samsung, Title: Initial State of Uplink Packet Duplication.
R2-1713848 3GPP TSG-RAN WG2 Meeting #100, Reno, USA, Nov. 27-Dec. 1, 2017, Source: Samsung, Title: The Necessity of Fast RLF Recovery based on T312 in NR.
R2-1800155 3GPP TSG-RAN WG2 AH, Vancouver, Canada, Jan. 22-26, 2018, Source: OPPO, Title: Discussion on behaviour of ConfiguredGrantTimer.
R2-1800165 3GPP TSG-RAN WG2 AH, Vancouver, Canada, Jan. 22-26, 2018, Source: CATT, Title: UE behavior on configured grant timer upon DCI reception.
R2-1800334 3GPP TSG-RAN WG2 AH, Vancouver, Canada, Jan. 22-26, 2018, Source: Ericsson, Title: SPS and BWP inactivity timer interaction.
R2-1800373 3GPP TSG-RAN WG2 AH, Vancouver, Canada, Jan. 22-26, 2018, Source: Samsung Electronics R&D Institute UK, Title: Preventing simultaneous Type 1 configured grants on SUL and UL.
R2-1800374 3GPP TSG-RAN WG2 AH, Vancouver, Canada, Jan. 22-26, 2018, Source: Samsung Electronics R&D Institute UK, Title: Corrections to preventing simultaneous Type 1 configured grants on SUL and UL.
R2-1800566 3GPP TSG-RAN WG2 AH, Vancouver, Canada, Jan. 22-26, 2018, Source: LG Electronics Inc., Title: BWP timer restart for DL SPS.
R2-1800586 3GPP TSG-RAN WG2 AH, Vancouver, Canada, Jan. 22-26, 2018, Source: Nokia, Nokia Shanghai Bell, Title: Prioritization between dynamic grant and configured grant.

(56) References Cited

OTHER PUBLICATIONS

R2-1800587 3GPP TSG-RAN WG2 AH, Vancouver, Canada, Jan. 22-26, 2018, Source: Nokia, Nokia Shanghai Bell, Title: Correction on prioritization between dynamic grant and configured grant.
R2-1800622 3GPP TSG-RAN WG2 AH, Vancouver, Canada, Jan. 22-26, 2018, Source: Samsung, Title: Correction for SPS and Type-2 Configured Grant Calculation.
R2-1800624 3GPP TSG-RAN WG2 AH, Vancouver, Canada, Jan. 22-26, 2018, Source: Samsung, Title: Impact of Flexible Transmission on Configured Grant Operation.
R2-1800659 3GPP TSG-RAN WG2 AH, Vancouver, Canada, Jan. 22-26, 2018, Source: Samsung, Title: Draft CR for correction on SPS and Type-2 configured grant.
R2-1800661 3GPP TSG-RAN WG2 AH, Vancouver, Canada, Jan. 22-26, 2018, Source: Samsung, Title: Draft CR for flexible configured grant transmission.
R2-1800708 3GPP TSG-RAN WG2 AH, Vancouver, Canada, Jan. 22-26, 2018, Source: Ericsson, Title: Confirmation of Configured UL Grant Type 2 Activation for Multiple Aggregated Cells.
R2-1800709 3GPP TSG-RAN WG2 AH, Vancouver, Canada, Jan. 22-26, 2018, Source: Ericsson, Title: Alignment of terminology for Configured Scheduling and SPS.
R2-1800818 3GPP TSG-RAN WG2 AH, Vancouver, Canada, Jan. 22-26, 2018, Source: Samsung Electronics R&D Institute UK, Title: Corrections to prevent simultaneous Type 1 configured grants on SUL and UL.
R2-1800819 3GPP TSG-RAN WG2 AH, Vancouver, Canada, Jan. 22-26, 2018, Source: Samsung Electronics R&D Institute UK, Title: Preventing simultaneous Type 1 configured grants on SUL and UL.
R2-1800898 3GPP TSG-RAN WG2 AH, Vancouver, Canada, Jan. 22-26, 2018, Source: vivo, Title: Text proposal for repetition of the configured grant.
R2-1800902 3GPP TSG-RAN WG2 AH, Vancouver, Canada, Jan. 22-26, 2018, Source: vivo, Title: Collision between dynamic grant and configured grant.
R2-1800925 3GPP TSG-RAN WG2 AH, Vancouver, Canada, Jan. 22-26, 2018, Source: Intel Corporation, Title: URLLC exception for dynamic grant.
R2-1801032 3GPP TSG-RAN WG2 AH, Vancouver, Canada, Jan. 22-26, 2018, Source: Huawei, HiSilicon, Title: Leftovers of HARQ Transmission with Configured Grant Timer.
R2-1801033 3GPP TSG-RAN WG2 AH, Vancouver, Canada, Jan. 22-26, 2018, Source: Huawei, HiSilicon, Title: Corrections on HARQ Transmission with ConfiguredGrantTimer in TS 38.321.
R2-1801034 3GPP TSG-RAN WG2 AH, Vancouver, Canada, Jan. 22-26, 2018, Source: Huawei, HiSilicon, Title: Corrections on Retransmission for Configured Grant.
R2-1801035 3GPP TSG-RAN WG2 AH, Vancouver, Canada, Jan. 22-26, 2018, Source: Huawei, HiSilicon, Title: Corrections on calculations of transmission occasions of configured grant.
R2-1801036 3GPP TSG-RAN WG2 AH, Vancouver, Canada, Jan. 22-26, 2018, Source: Huawei, HiSilicon, Title: Further discussion on configuration of ConfiguredGrantTimer.
R2-1801037 3GPP TSG-RAN WG2 AH, Vancouver, Canada, Jan. 22-26, 2018, Source: Huawei, HiSilicon, Title: Corrections on flexible occasion of initial transmission and repetition for configured grant.
R2-1801038 3GPP TSG-RAN WG2 AH, Vancouver, Canada, Jan. 22-26, 2018, Source: Huawei, HiSilicon, Title: Impact of SUL on configured grant.
R2-1801039 3GPP TSG-RAN WG2 AH, Vancouver, Canada, Jan. 22-26, 2018, Source: Huawei, HiSilicon, Title: Configured grant Type 1 operation with BWP switch.
R2-1801052 3GPP TSG-RAN WG2 AH, Vancouver, Canada, Jan. 22-26, 2018, Source: LG Electronics Inc., Title: Correction on ConfiguredGrantTimer.
R2-1801063 3GPP TSG-RAN WG2 AH, Vancouver, Canada, Jan. 22-26, 2018, Source: LG Electronics Inc., Title: Repetition transmission on configured uplink grant.
R2-1801081 3GPP TSG-RAN WG2 AH, Vancouver, Canada, Jan. 22-26, 2018, Source: ZTE, Title: Consideration on the configured grant for supporting SUL.
R2-1801125 3GPP TSG-RAN WG2 AH, Vancouver, Canada, Jan. 22-26, 2018, Source: InterDigital Inc., Title: Correction on override of configured assignment by dynamic assignment.
R2-1801126 3GPP TSG-RAN WG2 AH, Vancouver, Canada, Jan. 22-26, 2018, Source: InterDigital Inc., Title: Override of configured grant by dynamic grant in case of URLLC.
R2-1801Z39 3GPP TSG-RAN WG2 AH, Vancouver, Canada, Jan. 22-26, 2018, Source: LG Electronics Inc., Title: Prioritization between dynamic grant and configured grant for URLLC.
R2-1801Z77 3GPP TSG-RAN WG2 AH, Vancouver, Canada, Jan. 22-26, 2018, Source: LG Electronics Inc., Title: Restart condition of sCellDeactivationTimer with skipping operation.
R2-1801371 3GPP TSG-RAN WG2 AH, Vancouver, Canada, Jan. 22-26, 2018, Source: Samsung, Title: Remaining Issue on SPS/Grant-free: How to Handle Dynamic Grant Coinciding with Configured Grant.
R2-1801475 3GPP TSG-RAN WG2 AH, Vancouver, Canada, Jan. 22-26, 2018, Source: LG Electronics Inc., Title: Prevention of using CS grant.
R3-174356 3GPP TSG-RAN WG3 Meeting #98, Reno, USA, Nov. 27-Dec. 1, Z017, Source: Nokia, Nokia Shanghai Bell, Title: Transport layer protocol for F1-C.
R3-174357 3GPP TSG-RAN WG3 Meeting #98, Reno, USA, Nov. 27-Dec. 1, Z017, Source: Nokia, Nokia Shanghai Bell, Title: Transport layer protocol for F1-U.
R3-174359 3GPP TSG-RAN WG3 Meeting #98, Reno, USA, Nov. 27-Dec. 1, 2017, Source: Nokia, Nokia Shanghai Bell, Title: UE Initial Access procedure.
R3-174360 3GPP TSG-RAN WG3 Meeting #98, Reno, USA, Nov. 27-Dec. 1, 2017, Source: Nokia, Nokia Shanghai Bell, KT, Title: EFS resolution in intra-gNB-CU mobility.
R3-174361 3GPP TSG-RAN WG3 Meeting #98, Reno, USA, Nov. 27-Dec. 1, 2017, Source: Nokia, Nokia Shanghai Bell, KT, Title: TP of UE Context Modification and UE Attached Indication (TS 38.470).
R3-174362 3GPP TSG-RAN WG3 Meeting #98, Reno, USA, Nov. 27-Dec. 1, 2017, Source: Nokia, Nokia Shanghai Bell, KT, Title: TP of UE Context Modification and UE Attached Indication (TS 38.473).
R3-174364 3GPP TSG-RAN WG3 Meeting #98, Reno, USA, Nov. 27-Dec. 1, 2017, Source: Nokia, Nokia Shanghai Bell, Title: FFS resolution in Centralized Retransmission.
R3-174396 3GPP TSG-RAN WG3 Meeting #98, Reno, USA, Nov. 27-Dec. 1, 2017, Source: ZTE, China Telecom, Title: Solution for UE Initial Access.
R3-174397 3GPP TSG-RAN WG3 Meeting #98, Reno, USA, Nov. 27-Dec. 1, 2017, Source: ZTE, Title: Update on UE Context Management for TS38.470.
R3-174398 3GPP TSG-RAN WG3 Meeting #98, Reno, USA, Nov. 27-Dec. 1, 2017, Source: ZTE, Title: Update on UE Context Management for TS38.473.
R3-174405 3GPP TSG-RAN WG3 Meeting #98, Reno, USA, Nov. 27-Dec. 1, 2017, Source: ZTE, China Unicom, Title: Remaining Issues of Mobility Aspects.
R3-174408 3GPP TSG-RAN WG3 Meeting #98, Reno, USA, Nov. 27-Dec. 1, 2017, Source: ZTE, Title: Consideration on the activation or deactivation of duplication.
R3-174409 3GPP TSG-RAN WG3 Meeting #98, Reno, USA, Nov. 27-Dec. 1, 2017, Source: ZTE, China Telecom, Title: Remaining Issues of Centralized Retransmissions.
R3-174410 3GPP TSG-RAN WG3 Meeting #98, Reno, USA, Nov. 27-Dec. 1, 2017, Source: ZTE, Title: TP for Centralized Retransmissions kept in TS38.475.
R3-174411 3GPP TSG-RAN WG3 Meeting #98, Reno, USA, Nov. 27-Dec. 1, 2017, Source: ZTE, Title: TP for Centralized Retransmissions kept in TS38.425.
R3-174473 3GPP TSG-RAN WG3 Meeting #98, Reno, USA, Nov. 27-Dec. 1, 2017, Source: Huawei, Title: pCR on open issues for PDCP duplication over F1 to 38.473.

(56) References Cited

OTHER PUBLICATIONS

R3-174482 3GPP TSG-RAN WG3 Meeting #98, Reno, USA, Nov. 27-Dec. 1, 2017, Source: Huawei, Title: Further discussions on radio link outage indication.
R3-174533 3GPP TSG-RAN WG3 Meeting #98, Reno, USA, Nov. 27-Dec. 1, 2017, Source: CATT, Title: Discussion on CA based PDCP Duplication.
R3-174535 3GPP TSG-RAN WG3 Meeting #98, Reno, USA, Nov. 27-Dec. 1, 2017, Source: CATT, Title: Discussion on F1 SETUP procedure.
R3-174536 3GPP TSG-RAN WG3 Meeting #98, Reno, USA, Nov. 27-Dec. 1, 2017, Source: CATT, Title: Discussion on Initial UE Access.
R3-174537 3GPP TSG-RAN WG3 Meeting #98, Reno, USA, Nov. 27-Dec. 1, 2017, Source: CATT, Title: Introduction of UE Reconfiguration Complete procedure.
R3-174538 3GPP TSG-RAN WG3 Meeting #98, Reno, USA, Nov. 27-Dec. 1, 2017, Source: CATT, Title: TP for 38.473 on UE Reconfiguration Completion procedure.
R3-174542 3GPP TSG-RAN WG3 Meeting #98, Reno, USA, Nov. 27-Dec. 1, 2017, Source: CATT, Title: Discussion on inter-DU mobility without MN involved.
R3-174543 3GPP TSG-RAN WG3 Meeting #98, Reno, USA, Nov. 27-Dec. 1, 2017, Source: CATT, Title: Stage 3 TP on inter-DU mobility without MN involved.
R3-174545 3GPP TSG-RAN WG3 Meeting #98, Reno, USA, Nov. 27-Dec. 1, 2017, Source: CATT, Title: Discussion on the Intral-cell HO and SCG change procedure.
R3-174546 3GPP TSG-RAN WG3 Meeting #98, Reno, USA, Nov. 27-Dec. 1, 2017, Source: CATT, Title: TP for 38.473 on Intra-cell HO and SCG change procedure.
R3-174606 3GPP TSG-RAN WG3 Meeting #98, Reno, USA, Nov. 27-Dec. 1, 2017, Source: Samsung, KT, Title: Initial access procedure considering CU-DU split.
R3-174607 3GPP TSG-RAN WG3 Meeting #98, Reno, USA, Nov. 27-Dec. 1, 2017, Source: Samsung, KT, Title: Stage 3 TP for TS38.473 to reflect initial access procedure.
R3-174608 3GPP TSG-RAN WG3 Meeting #98, Reno, USA, Nov. 27-Dec. 1, 2017, Source: Samsung, KT, Title: RRC connection resume procedure considering CU-DU split.
R3-174609 3GPP TSG-RAN WG3 Meeting #98, Reno, USA, Nov. 27-Dec. 1, 2017, Source: Samsung, KT, Title: RRC connection reestablishment procedure considering CU-DU split.
R3-172401 3GPP TSG-RAN3 NR AdHoc Meeting, Qingdao, China, Jun. 27-29, 2017, Source: CMCC, Title: gNB ID and NCGI considering CU-DU split.
R3-172417 3GPP TSG-RAN3 NR AdHoc Meeting, Qingdao, China, Jun. 27-29, 2017, Source: ZTE, China Unicom, Title: Discussion on CU DU ID and NCGI.
R3-172418 3GPP TSG-RAN3 NR AdHoc Meeting, Qingdao, China, Jun. 27-29, 2017, Source: ZTE, China Unicom, Title: CUDU ID and NCGI for TS 38.300.
R3-172481 3GPP TSG-RAN3 NR AdHoc Meeting, Qingdao, China, Jun. 27-29, 2017, Source: Samsung, Title: Identification of gNB, gNB-CU/DU, and NR cell.
R3-172484 3GPP TSG-RAN3 NR AdHoc Meeting, Qingdao, China, Jun. 27-29, 2017, Source: Vodafone, Title: Common Radio Resource Management Functional Split for Different Deployment Scenarios.
R3-172511 3GPP TSG-RAN3 NR AdHoc Meeting, Qingdao, China, Jun. 27-29, 2017, Source: Ericsson, Title: Resilience and scalability in a disaggregated gNB.
3GPP TS 36.300 V14.3.0 (Jun. 2017), Technical Specification, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 14).
3GPP TS 38.300 V1.0.0 (Sep. 2017), Technical Specification, 3rd Generation Partnership Project; Technical Specification Group Radio Access Network; NR; NR and NG-RAN; Overall Description; Stage 2 (Release 15).
R2-1707705 3GPP TSG-RAN2 Meeting #99, Berlin, Germany, Aug. 21-25, 2017, Source: OPPO, Title: Control on UL packet duplication for split bearer.
R2-1707708 3GPP TSG-RAN2 Meeting #99, Berlin, Germany, Aug. 21-25, 2017, Source: OPPO, Title: PDCP operation for UL packet duplication.
R2-1707717 3GPP TSG-RAN2 Meeting #99, Berlin, Germany, Aug. 21-25, 2017, Source: Huawei, HiSilicon, Title: UE behaviors upon deactivation of DC duplication.
R2-1707718 3GPP TSG-RAN2 Meeting #99, Berlin, Germany, Aug. 21-25, 2017, Source: Huawei, ASUSTeK, HiSilicon, Title: RLC behaviors upon duplicate deactivation.
R2-1707719 3GPP TSG-RAN2 Meeting #99, Berlin, Germany, Aug. 21-25, 2017, Source: Huawei, ASUSTeK, HiSilicon, Title: PDCP operation for packet duplication.
R2-1707720 3GPP TSG-RAN2 Meeting #99, Berlin, Germany, Aug. 21-25, 2017, Source: Huawei, HiSilicon, Title: PDCP data volume calculation for packet duplication (Revision of R2-1706484).
R2-1707924 3GPP TSG-RAN2 Meeting #99, Berlin, Germany, Aug. 21-25, 2017, Source: CATT, Title: PDCP Status Report for Duplication.
R2-1707925 3GPP TSG-RAN2 Meeting #99, Berlin, Germany, Aug. 21-25, 2017, Source: CATT, Title: Duplication Bearer Type.
R2-1707982 3GPP TSG-RAN2 Meeting #99, Berlin, Germany, Aug. 21-25, 2017, Source: Nokia, Mediatek, Nokia Shanghai Bell, Title: Initial State of PDCP Duplication (Revision of R2-1706545).
R2-1707990 3GPP TSG-RAN2 Meeting #99, Berlin, Germany, Aug. 21-25, 2017, Source: Nokia, Nokia Shanghai Bell, Title: Duplication Impacts to PDCP.
R2-1708017 3GPP TSG-RAN2 Meeting #99, Berlin, Germany, Aug. 21-25, 2017, Source: Ericsson, Title: Aligned duplication support for DRBs and SRBs.
R2-1708097 3GPP TSG-RAN2 Meeting #99, Berlin, Germany, Aug. 21-25, 2017, Source: MediaTek Inc., Title: Stage-2 aspects of data duplication (Revision of R2-1707260).
R2-1708098 3GPP TSG-RAN2 Meeting #99, Berlin, Germany, Aug. 21-25, 2017, Source: MediaTek Inc., Title: Data duplication in NR (Revision of R2-1707261).
R2-1708329 3GPP TSG-RAN2 Meeting #99, Berlin, Germany, Aug. 21-25, 2017, Source: Ericsson, Title: PDCP and RLC behaviour for PDCP data duplication.
R2-1708333 3GPP TSG-RAN2 Meeting #99, Berlin, Germany, Aug. 21-25, 2017, Source: Ericsson, Title: Packet duplication in CA (Revision of R2-1707172).
R2-1708335 3GPP TSG-RAN2 Meeting #99, Berlin, Germany, Aug. 21-25, 2017, Source: Ericsson, Title: PDCP dynamic link switching.
R2-1708336 3GPP TSG-RAN2 Meeting #99, Berlin, Germany, Aug. 21-25, 2017, Source: Ericsson, Title: PDCP data volume reporting in duplication (Revision of R2-1704370).
R2-1708337 3GPP TSG-RAN2 Meeting #99, Berlin, Germany, Aug. 21-25, 2017, Source: Ericsson, Title: PDCP duplication control related to SCell control.
R2-1708444 3GPP TSG-RAN2 Meeting #99, Berlin, Germany, Aug. 21-25, 2017, Source: Samsung, Title: Discussion on PDCP data volume calculation.
R2-1708489 3GPP TSG-RAN2 Meeting #99, Berlin, Germany, Aug. 21-25, 2017, Source: Vivo, Title: Duplication deactivation due to SCell or BWP deactivation.
R2-1708508 3GPP TSG-RAN2 Meeting #99, Berlin, Germany, Aug. 21-25, 2017, Source: Vivo, Title: Layer-2 behaviors of PDCP duplication activation deactivation.
R2-1708573 3GPP TSG-RAN2 Meeting #99, Berlin, Germany, Aug. 21-25, 2017, Source: Panasonic, Title: Packet duplication during the handover.
R2-1708624 3GPP TSG-RAN2 Meeting #99, Berlin, Germany, Aug. 21-25, 2017, Source: Lenovo, Motorola Mobility, Title: PDCP packet duplication.
R2-1708691 3GPP TSG-RAN2 Meeting #99, Berlin, Germany, Aug. 21-25, 2017, Source: Huawei, HiSilicon, Title: Remaining stage 2 issues for CA duplication and for DC duplication.

(56) References Cited

OTHER PUBLICATIONS

R2-1708735 3GPP TSG-RAN2 Meeting #99, Berlin, Germany, Aug. 21-25, 2017, Source: InterDigital Inc., Title: Details of duplication and routing for SRB.
R2-1708821 3GPP TSG-RAN2 Meeting #99, Berlin, Germany, Aug. 21-25, 2017, Source: Intel Corporation, Title: Support of CA packet duplication for RLC AM.
R2-1708862 3GPP TSG-RAN2 Meeting #99, Berlin, Germany, Aug. 21-25, 2017, Source: Fujitsu, Title: Stage 2 TP for RLC AM duplication.
R2-1708950 3GPP TSG-RAN2 Meeting #99, Berlin, Germany, Aug. 21-25, 2017, Source: Qualcomm Incorporated, Title: Further considerations for Packet duplication.
R2-1708951 3GPP TSG-RAN2 Meeting #99, Berlin, Germany, Aug. 21-25, 2017, Source: Qualcomm Incorporated, Title: PDCP duplication.
R2-1709032 3GPP TSG-RAN2 Meeting #99, Berlin, Germany, Aug. 21-25, 2017, Source: Samsung, Title: PDCP Duplication Operations (Revision of R2-177368).
R2-1709036 3GPP TSG-RAN2 Meeting #99, Berlin, Germany, Aug. 21-25, 2017, Source: Samsung, Title: Uplink DRB Duplication.
R2-1709061 3GPP TSG-RAN2 Meeting #99, Berlin, Germany, Aug. 21-25, 2017, Source: LG Electronics Inc., Title: Discussion on the duplicate detection in PDCP.
R2-1709077 3GPP TSG-RAN2 Meeting #99, Berlin, Germany, Aug. 21-25, 2017, Source: ITRI, Title: SCG Failure Case for Duplication SRB.
R2-1709095 3GPP TSG-RAN2 Meeting #99, Berlin, Germany, Aug. 21-25, 2017, Source: LG Electronics Inc., Title: Need for Duplicate RB.
R2-1709100 3GPP TSG-RAN2 Meeting #99, Berlin, Germany, Aug. 21-25, 2017, Source: LG Electronics Inc., Title: Packet duplication in PDCP (Revision of R2-1706870).
R2-1709870 3GPP TSG-RAN2 Meeting #99, Berlin, Germany, Aug. 21-25, 2017, Source: Ericsson, Title: TP on Radio Link Failure for 38.300.
R3-173128 3GPP TSG-RAN2 Meeting #99, Berlin, Germany, Aug. 21-25, 2017, Source: Huawei, Title: PDCP duplication for CU-DU.
R2-1800376 3GPP TSG-RAN WG2 NR Ad Hoc, Vancouver, Canada, Jan. 22-26, 2018, Source: Huawei, HiSilicon, Title: CR on the prioritization between dynamic scheduling and configured scheduling.
R2-1800158 3GPP TSG-RAN WG2 AH, Vancouver, Canada, Jan. 22-26, 2018, Source: OPPO, Title: CR on ConfiguredGrantTimer for C-RNTI based grant.
R2-1800647 3GPP TSG-RAN WG2 AH, Vancouver, Canada, Jan. 22-26, 2018, Source: OPPO, Title: Correction on ConfiguredGrantTimer.
R2-1800710 3GPP TSG-RAN WG2 AH, Vancouver, Canada, Jan. 22-26, 2018, Source: Ericsson, Title: Alignment of terminology for Configured Scheduling and SPS.
R2-1801053 3GPP TSG-RAN WG2 AH, Vancouver, Canada, Jan. 22-26, 2018, Source: LG Electronics Inc., Title: Correction on ConfiguredGrantTimer.
Apr. 8, 2019—Exended European Search Report—EP 19151473.6.
ZTE—Consideration on the activation or deactivation of duplication—Nov. 17, 2017.
CATT—Discussion on CA based PDCP Duplication—Sep. 30, 2017.
3GPP Standard—"3rd Generation Partnership Project: Technical Specificaiton Group Radio Access Network; NG-RAN; F1 application protocol (F1AP) (Release 15)"—Dec. 11, 2017.
3GPP Standard—"3rd Generation Partnership Project; Technical Specification Group Radio Access Network NR Radio Resource Control (RRC) protocol specification (Release 15)"—Jan. 4, 2018.
R2-162709 3GPP TSG-RAN WG2 Meeting #93bis, Dubrovnik, Croatia, Apr. 11-15, 2016, Source: Beam support in NR.
May 27, 2019—Extended European Search Report—19155025.0.
NTT Docomo, Inc.: "F1 interface: Radio resource configuration management", May 15-19, 2017.
CMCC: "System information generation and delivery in CU-DU split architecture", Aug. 21-25, 2017.
ZTE: "Discussion on the solution for UE Initial Access", Oct. 9-13, 2017.
Feb. 27, 2019—EP Search Report—19151430.6.
May 14, 2017—TP for UE Radio Bearer Management.
NOKIA—May 1, 2010—"Enabling MRO in case of re-establishment request in unprepared eNB".
Aug. 6, 2019—European Extended Search Report—EP 19157448.2.
3GPP TSG-RAN WG2 #100: "Discussion on Inter-nodeRRC container", Dec. 1, 2017.
3GPP TSG-RAN Meeting #76: "Miscellaneous general corrections and clarifications resulting from ASN.1 review", Jun. 5, 2017.
R1-1704159 3GPP TSG-RAN WG2 Meeting #98, Hangzhou, China, May 15-19, 2017, Source: Samsung, Title: Random Access Response in NR.
R1-1704672 3GPP TSG-RAN WG2 Meeting #98, Hangzhou, China, May 15-19, 2017, Source: ZTE, Title: Consideration on the 4-step random access procedure.
R2-1704901 3GPP TSG-RAN WG2 Meeting #98, Hangzhou, China, May 15-19, 2017, Source: Qualcomm Incorporated, Title: Prioritized random access in NR.
R3-172102 3GPP TSG-RAN3 NR AdHoc Meeting, Qingdao, China, Jun. 27-29, 2017, Source: China Telecom, Title: On the preliminary transport comparison between F1-C and F1-U protocols.
R3-172176 3GPP TSG-RAN3 NR AdHoc Meeting, Qingdao, China, Jun. 27-29, 2017, Source: Huawei, Title: F1AP procedures for RRC Connection Setup.
R3-172178 3GPP TSG-RAN3 NR AdHoc Meeting, Qingdao, China, Jun. 27-29, 2017, Source: Huawei, Title: TP on Transmitting RRC Connection Setup message over F1 to 38.470.
R3-172198 3GPP TSG-RAN3 NR AdHoc Meeting, Qingdao, China, Jun. 27-29, 2017, Source: Huawei, Title: Discussions on F1 interface management.
R3-172199 3GPP TSG-RAN3 NR AdHoc Meeting, Qingdao, China, Jun. 27-29, 2017, Source: Huawei, Title: TP on F1 interface management to 38.470.
R3-172200 3GPP TSG-RAN3 NR AdHoc Meeting, Qingdao, China, Jun. 27-29, 2017, Source: Huawei, HiSilicon, Title: TP on F1 interface management procedures to 38.473.
R3-172209 3GPP TSG-RAN3 NR AdHoc Meeting, Qingdao, China, Jun. 27-29, 2017, Source: Chinatelecom, Title: gNB and gNB-CU ID discussion.
R3-172218 3GPP TSG-RAN3 NR AdHoc Meeting, Qingdao, China, Jun. 27-29, 2017, Source: CATT, Title: Discussion on the F1AP functions necessary for Option 3.
R3-172244 3GPP TSG-RAN3 NR AdHoc Meeting, Qingdao, China, Jun. 27-29, 2017, Source: Samsung, KT, SK Telecom, Title: Centralized retransmission of lost PDUs.
R3-172250 3GPP TSG-RAN3 NR AdHoc Meeting, Qingdao, China, Jun. 27-29, 2017, Source: Samsung, KT, SK Telecom, Title: On-demand SI support in high layer functional split.
R3-172251 3GPP TSG-RAN3 NR AdHoc Meeting, Qingdao, China, Jun. 27-29, 2017, Source: Samsung, KT, SK Telecom, Title: Stage 2 text proposal for TS38.401 on mechanism of centralized retransmission of lost PDUs.
R3-172256 3GPP TSG-RAN3 NR AdHoc Meeting, Qingdao, China, Jun. 27-29, 2017, Source: Samsung, KT, SK Telecom, Title: Stage 2 text proposal for TS38.401 on supporting on-demand SI.
R3-172266 3GPP TSG-RAN3 NR AdHoc Meeting, Qingdao, China, Jun. 27-29, 2017, Source: LG Electronics Inc., Title: Issue on C-RNTI allocation for RRC connection resume.
R3-172309 3GPP TSG-RAN3 NR AdHoc Meeting, Qingdao, China, Jun. 27-29, 2017, Source: Nokia, Alcatel-Lucent Shanghai Bell, Title: Inter-gNB-DU Mobility procedure.
R3-172310 3GPP TSG-RAN3 NR AdHoc Meeting, Qingdao, China, Jun. 27-29, 2017, Source: Nokia, Alcatel-Lucent Shanghai Bell, Title: TP of Inter-gNB-DU Mobility procedure (TS 38.401).
R3-172321 3GPP TSG-RAN3 NR AdHoc Meeting, Qingdao, China, Jun. 27-29, 2017, Source: Nokia, Alcatel-Lucent Shanghai Bell, Title: Retransmission procedure in radio link outage.

(56) References Cited

OTHER PUBLICATIONS

R3-172322 3GPP TSG-RAN3 NR AdHoc Meeting, Qingdao, China, Jun. 27-29, 2017, Source: Nokia, Alcatel-Lucent Shanghai Bell, Title: TP of Retransmission procedure in radio link outage (TS 38.401).

R3-172323 3GPP TSG-RAN3 NR AdHoc Meeting, Qingdao, China, Jun. 27-29, 2017, Source: Nokia, Alcatel-Lucent Shanghai Bell, Title: TP of Retransmission procedure in radio link outage (TS 38.475).

R3-172324 3GPP TSG-RAN3 NR AdHoc Meeting, Qingdao, China, Jun. 27-29, 2017, Source: Nokia, Title: [DRAFT] LS on retransmission procedure in radio link outage.

R3-172333 3GPP TSG-RAN3 NR AdHoc Meeting, Qingdao, China, Jun. 27-29, 2017, Source: Nokia, Alcatel-Lucent Shanghai Bell, Title: UE Initial Access Procedure.

R3-172334 3GPP TSG-RAN3 NR AdHoc Meeting, Qingdao, China, Jun. 27-29, 2017, Source: Nokia, Alcatel-Lucent Shanghai Bell, Title: TP of UE Initial Access procedure (TS 38.401).

R3-172342 3GPP TSG-RAN3 NR AdHoc Meeting, Qingdao, China, Jun. 27-29, 2017, Source: LG Electronics Inc., Title: Consideration on C-RNTI during initial UE access.

R3-172343 3GPP TSG-RAN3 NR AdHoc Meeting, Qingdao, China, Jun. 27-29, 2017, Source: LG Electronics Inc., Title: TP for consideration on C-RNTI during initial UE access.

R3-172344 3GPP TSG-RAN3 NR AdHoc Meeting, Qingdao, China, Jun. 27-29, 2017, Source: LG Electronics Inc., Title: TP for consideration on C-RNTI during initial UE access.

R3-172345 3GPP TSG-RAN3 NR AdHoc Meeting, Qingdao, China, Jun. 27-29, 2017, Source: ZTE, Title: RRC message transmission over F1 interface for TS 38.401.

R3-172346 3GPP TSG-RAN3 NR AdHoc Meeting, Qingdao, China, Jun. 27-29, 2017, Source: ZTE, Title: RRC message transmission over F1 interface for TS 38.470.

R3-172347 3GPP TSG-RAN3 NR AdHoc Meeting, Qingdao, China, Jun. 27-29, 2017, Source: ZTE, Title: RRC message transmission over F1 interface for TS 38.473.

R3-172356 3GPP TSG-RAN3 NR AdHoc Meeting, Qingdao, China, Jun. 27-29, 2017, Source: ZTE, China Telecom, Title: Discussion on flow control over F1-U.

R3-172357 3GPP TSG-RAN3 NR AdHoc Meeting, Qingdao, China, Jun. 27-29, 2017, Source: ZTE, Title: Update on flow control over F1 interface for TS 38.401.

R3-172358 3GPP TSG-RAN3 NR AdHoc Meeting, Qingdao, China, Jun. 27-29, 2017, Source: ZTE, Title: Flow control over F1 interface for TS 38.475.

R3-172399 3GPP TSG-RAN3 NR AdHoc Meeting, Qingdao, China, Jun. 27-29, 2017, Source: NEC, Title: How many gNB-DUs can be operated by one gNB-CU.

* cited by examiner

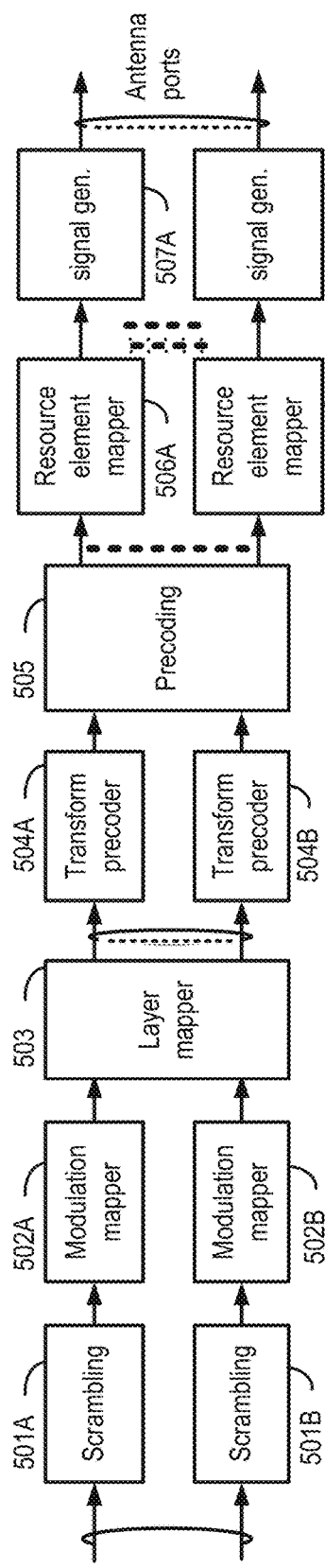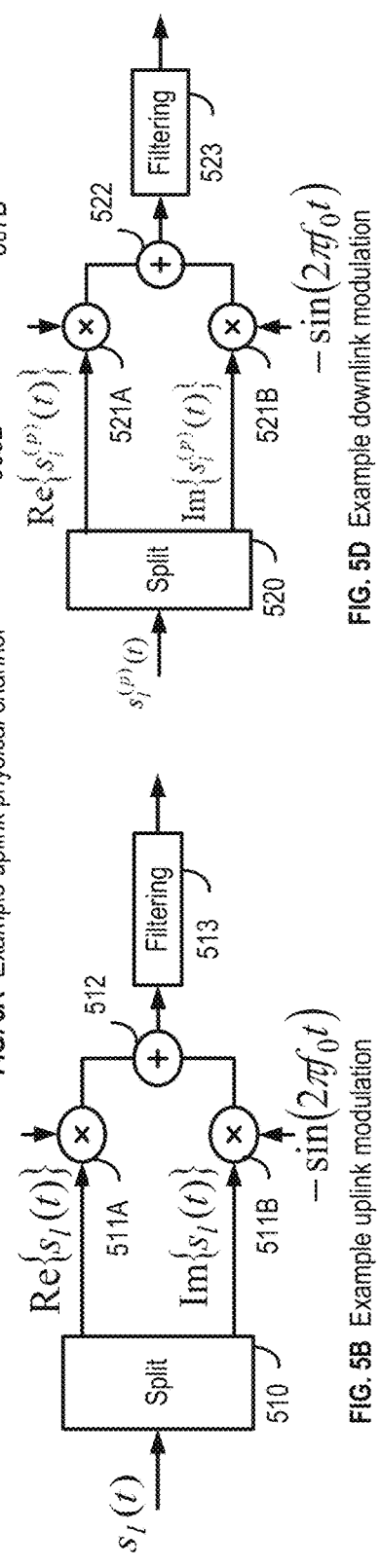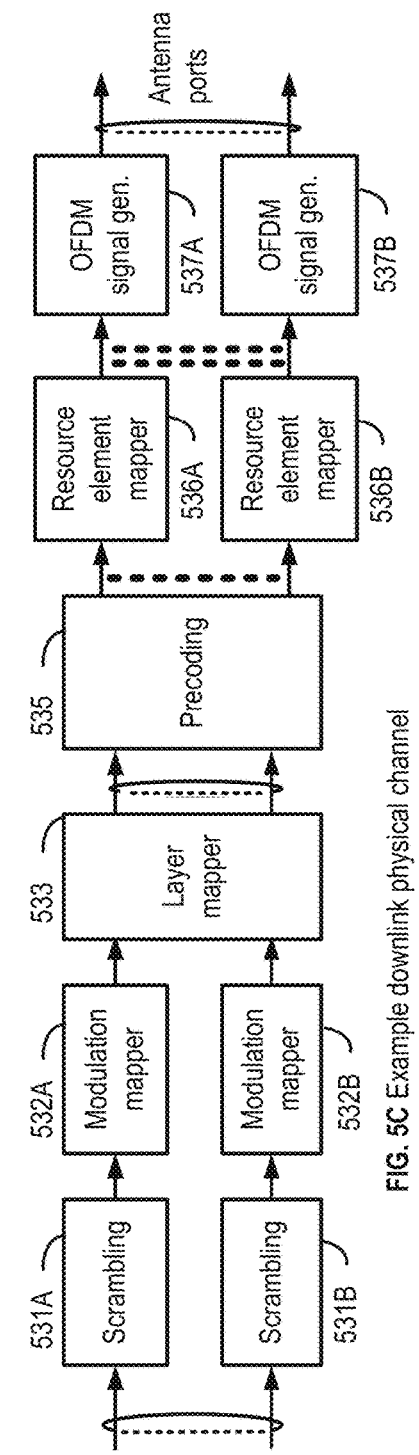
FIG. 5A Example uplink physical channel
FIG. 5B Example uplink modulation
FIG. 5C Example downlink physical channel
FIG. 5D Example downlink modulation

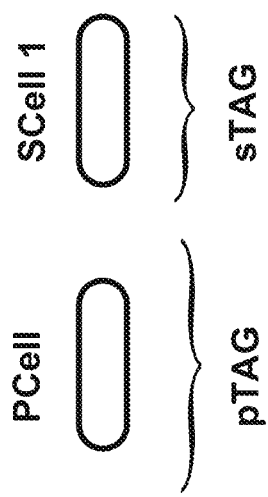
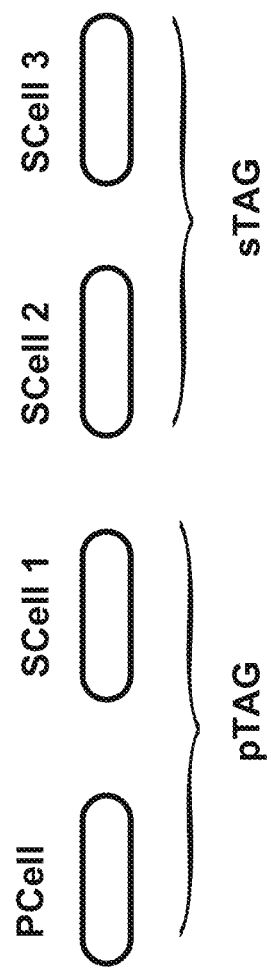
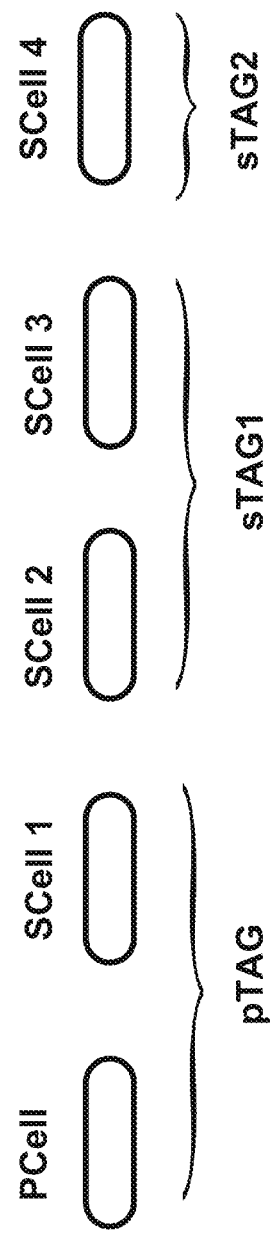
FIG. 8

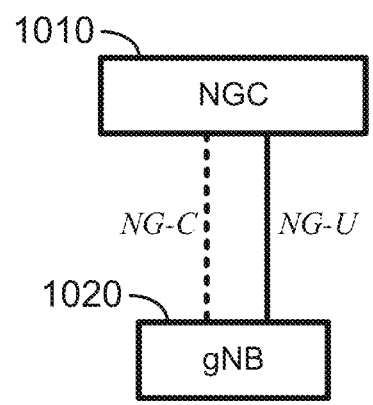
FIG. 10A gNB connected to NGC
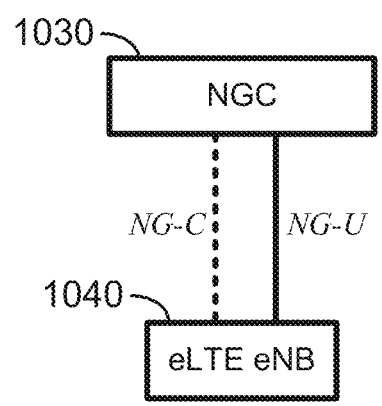
FIG. 10B eLTE eNB connected to NGC

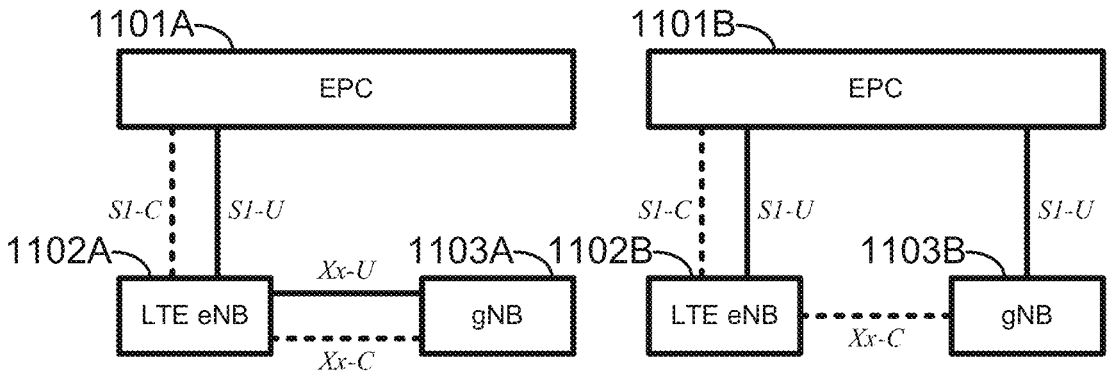

FIG. 11A LTE eNB connected to EPC with non-standalone gNB.
gNB user plane connected to EPC via LTE eNB.

FIG. 11B LTE eNB connected to EPC with non-standalone gNB.
gNB user plane connected to EPC directly.

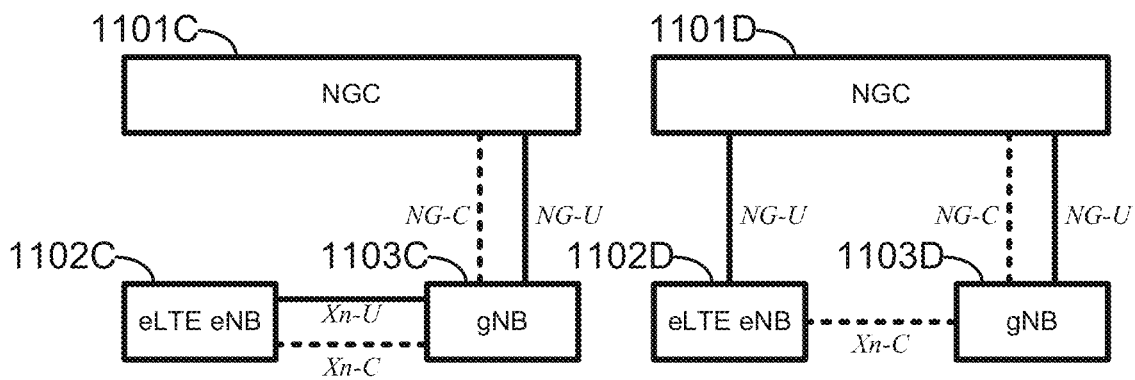

FIG. 11C gNB connected to NGC with non-standalone eLTE eNB.
eLTE eNB user plane connected to NGC via gNB.

FIG. 11D gNB connected to NGC with non-standalone eLTE eNB.
eLTE eNB user plane connected to NGC directly.

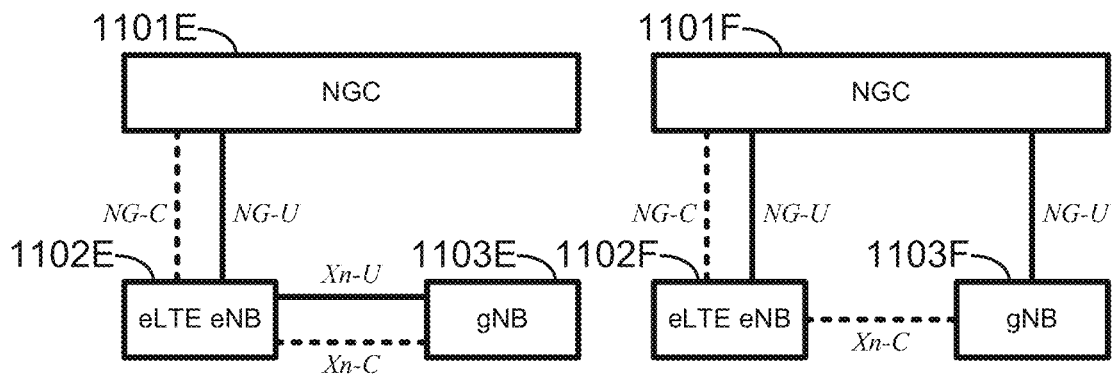

FIG. 11E eLTE eNB connected to NGC with non-standalone gNB.
gNB user plane connected to NGC via eLTE eNB.

FIG. 11F eLTE eNB connected to NGC with non-standalone gNB.
gNB user plane connected to NGC directly.

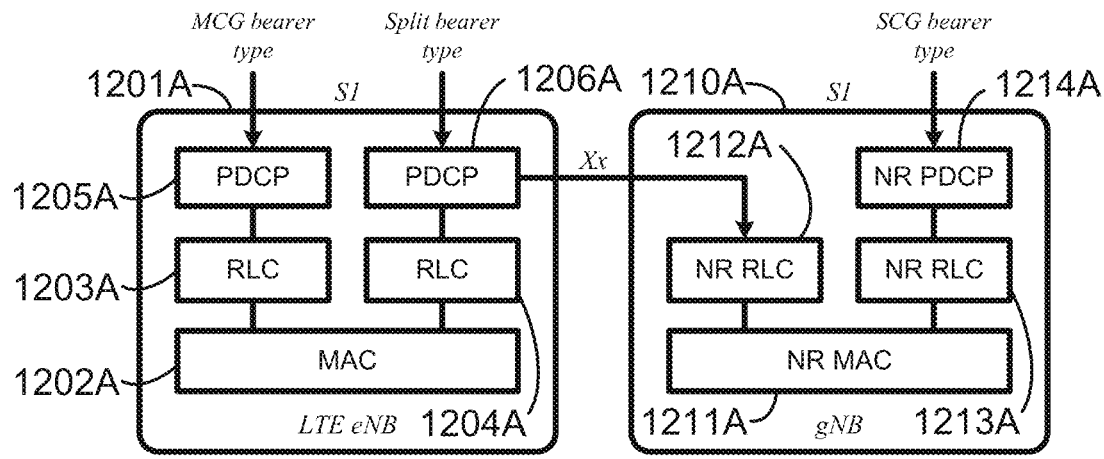
FIG. 12A Radio protocol architecture for split bearer and SCG bearer. LTE eNB connected to EPC with non-standalone gNB.
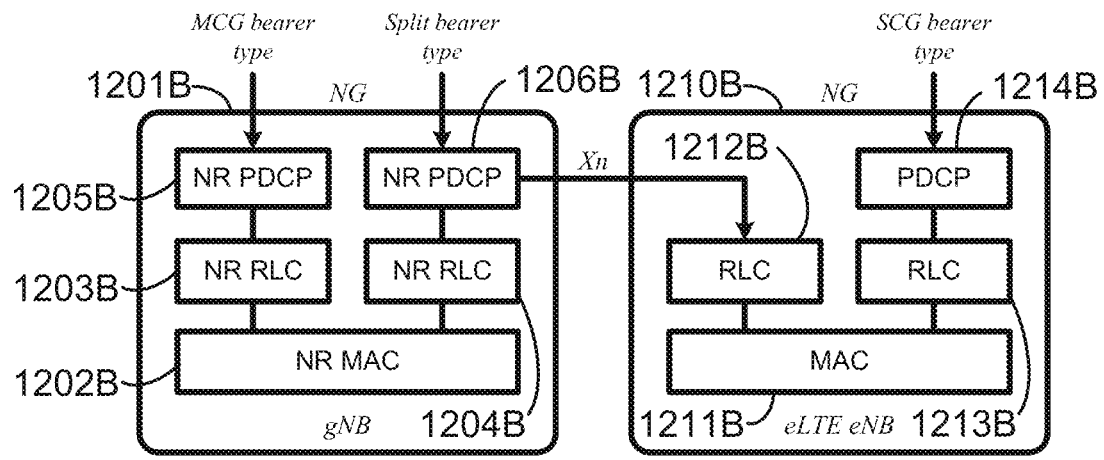
FIG. 12B Radio protocol architecture for split bearer and SCG bearer. gNB connected to NGC with non-standalone eLTE eNB.
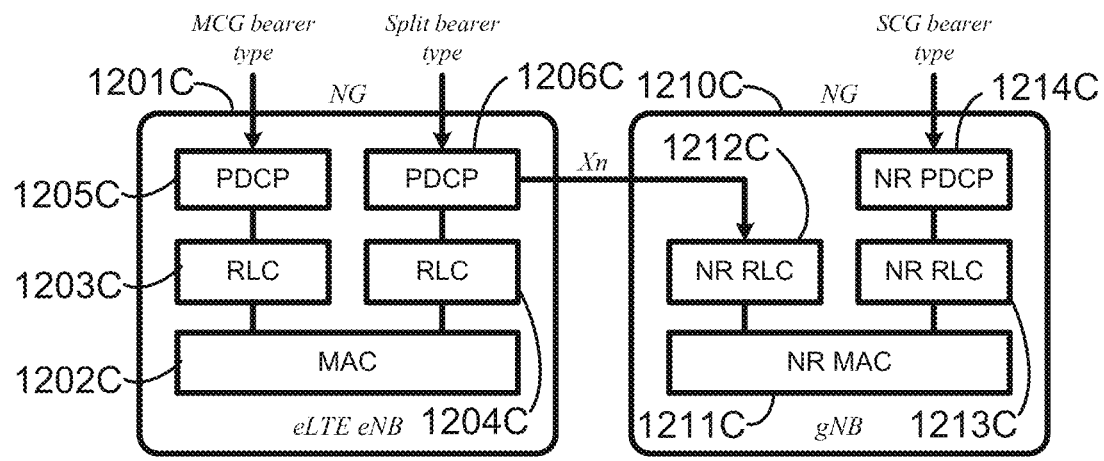
FIG. 12C Radio protocol architecture for split bearer and SCG bearer. eLTE eNB connected to NGC with non-standalone gNB.

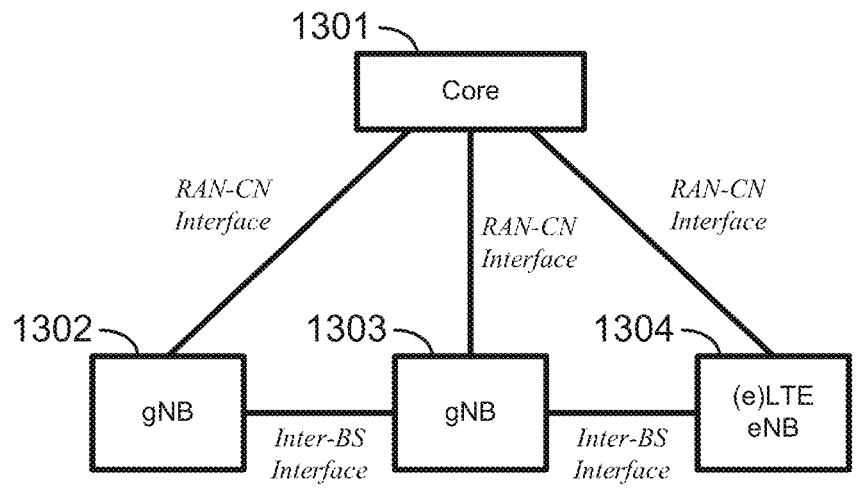
FIG. 13A Non-centralized deployment
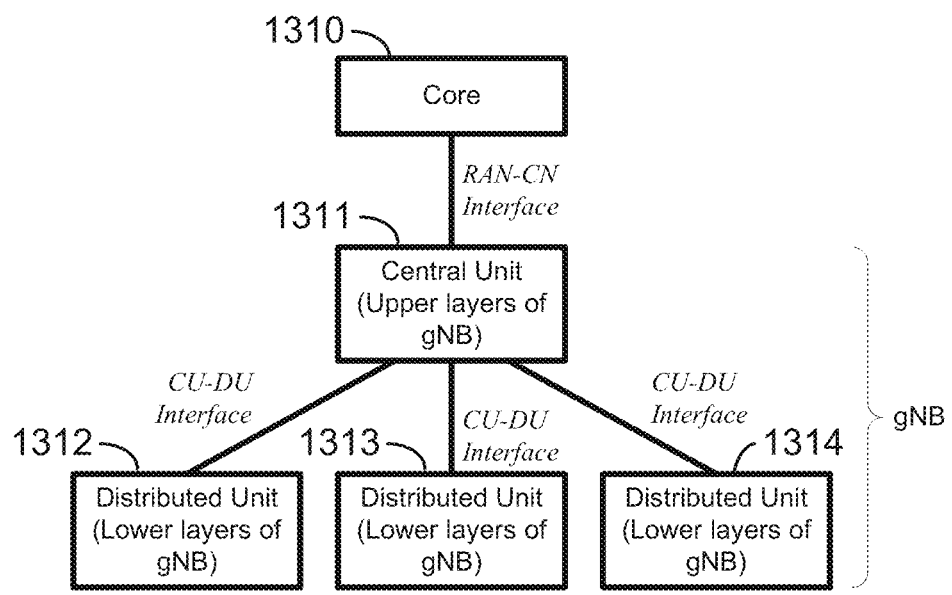
FIG. 13B Centralized deployment

CELL CONFIGURATION FOR PACKET DUPLICATION

CROSS-REFERENCE TO RELATED APPLICATIONS

This application claims the benefit and is a continuation of U.S. application Ser. No. 16/246,110, titled "Cell Configuration for Packet Duplication" and filed on Jan. 11, 2019, which claims the benefit of U.S. Provisional Application No. 62/616,386, titled "PDCP Duplication Cell Configuration" and filed on Jan. 11, 2018, each of which is hereby incorporated by reference in its entirety.

BACKGROUND

In wireless communications, packets may be duplicated. A base station may configure cells for packet duplication. Inefficient methods for configuring cells may lead to decreased performance of wireless communications.

SUMMARY

The following summary presents a simplified summary of certain features. The summary is not an extensive overview and is not intended to identify key or critical elements.

Systems, apparatuses, and methods are described for configuring cells for packet duplication. Packet duplication may be configured for a bearer of a wireless device. The bearer of the wireless device may be associated with different cells for sending original packets and/or duplicated packets. A base station central unit and/or a base station distributed unit may configure the cells of the bearer of the wireless device. The configuration of the cells may be based on information associated with the base station central unit and/or associated with the base station distributed unit. Effective cell configuration may be facilitated, and/or performance of wireless communications may be increased, by configuring the cells for packet duplication in an efficient manner.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

FIG. 5A, FIG. 5B, FIG. 5C and FIG. 5D show examples for uplink and downlink signal transmission.

FIG. 8 shows example timing advance group (TAG) configurations.

FIG. 10A and FIG. 10B show examples for interfaces between a 5G core network and base stations.

FIG. 11A, FIG. 11B, FIG. 11C, FIG. 11D, FIG. 11E, and FIG. 11F show examples for architectures of tight interworking between a 5G RAN and a long term evolution (LTE) radio access network (RAN).

FIG. 12A, FIG. 12B, and FIG. 12C show examples for radio protocol structures of tight interworking bearers.

FIG. 13A and FIG. 13B show examples for gNodeB (gNB) deployment.

DETAILED DESCRIPTION

Figure 1:
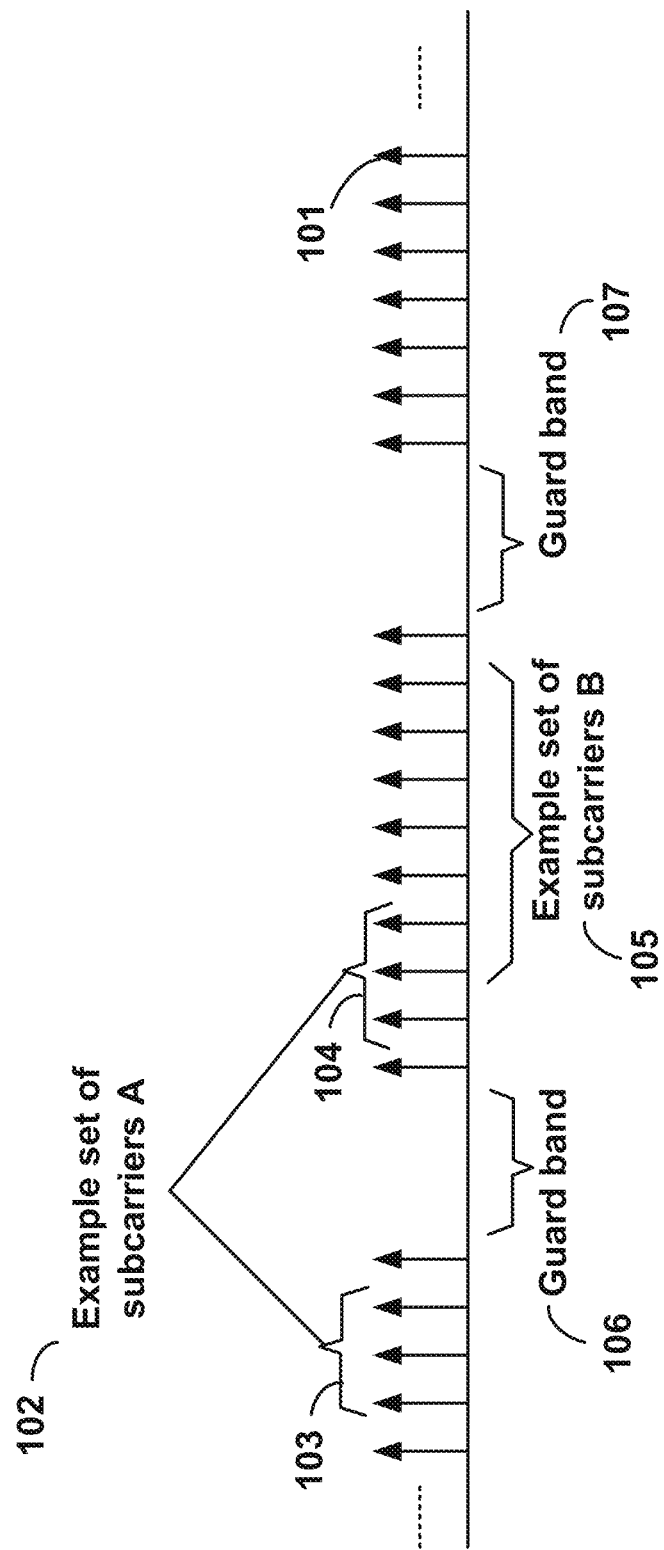
FIG. 1 shows example sets of orthogonal frequency division multiplexing (OFDM) subcarriers.

The accompanying drawings, which form a part hereof, show examples of the disclosure. It is to be understood that the examples shown in the drawings and/or discussed herein are non-exclusive and that there are other examples of how the disclosure may be practiced.

The features described herein may enable operation of carrier aggregation and may be used in the technical field of multicarrier communication systems. Examples may relate cell configuration in multicarrier communication systems.

The following acronyms are used throughout the present disclosure, provided below for convenience although other acronyms may be introduced in the detailed description:

3GPP 3rd Generation Partnership Project
5G 5th generation wireless systems
5GC 5G Core Network
ACK Acknowledgement
AMF Access and Mobility Management Function
ASIC application-specific integrated circuit
BPSK binary phase shift keying
CA carrier aggregation
CC component carrier
CDMA code division multiple access
CP cyclic prefix
CPLD complex programmable logic devices
CSI channel state information
CSS common search space
CU central unit
DC dual connectivity
DFTS-OFDM discrete Fourier transform spreading OFDM DL downlink
DU distributed unit
eLTE enhanced LTE
eNB evolved Node B
EPC evolved packet core
E-UTRAN evolved-universal terrestrial radio access network
FDD frequency division multiplexing
FPGA field programmable gate arrays
Fs-C Fs-control plane
Fs-U Fs-user plane
gNB next generation node B
HARQ hybrid automatic repeat request
HDL hardware description languages
ID identifier
IE information element
LTE long term evolution
MAC media access control
MCG master cell group
MIB master information block
MME mobility management entity
NACK Negative Acknowledgement
NAS non-access stratum
NG CP next generation control plane core
NGC next generation core
NG-C NG-control plane
NG-U NG-user plane
NR MAC new radio MAC
NR PDCP new radio PDCP
NR PHY new radio physical
NR RLC new radio RLC
NR RRC new radio RRC
NR new radio
NSSAI network slice selection assistance information
OFDM orthogonal frequency division multiplexing
PCC primary component carrier
PCell primary cell
PDCCH physical downlink control channel
PDCP packet data convergence protocol
PDU packet data unit
PHY physical
PLMN public land mobile network
PSCell primary secondary cell
pTAG primary timing advance group
PUCCH physical uplink control channel
QAM quadrature amplitude modulation
QPSK quadrature phase shift keying
RA random access
RACH random access channel
RAN radio access network
RAP random access preamble
RAR random access response
RB resource blocks
RLC radio link control
RRC radio resource control
RRM radio resource management
SCC secondary component carrier
SCell secondary cell
SCG secondary cell group
SC-OFDM single carrier-OFDM
SFN system frame number
S-GW serving gateway
SRB signaling radio bearer
sTAG(s) secondary timing advance group(s)
TA timing advance
TAG timing advance group
TAI tracking area identifier
TDD time division duplexing
TDMA time division multiple access
UE user equipment
UL uplink
UPGW user plane gateway
URLLC ultra-reliable low-latency communications
VHDL VHSIC hardware description language
Xn-C Xn-control plane
Xn-U Xn-user plane
Xx-C Xx-control plane
Xx-U Xx-user plane Examples may be implemented using various physical layer modulation and transmission mechanisms. Example transmission mechanisms may include, but are not limited to: CDMA, OFDM, TDMA, Wavelet technologies, and/or the like. Hybrid transmission mechanisms such as TDMA/CDMA, and OFDM/CDMA may also be employed. Various modulation schemes may be used for signal transmission in the physical layer. Examples of modulation schemes include, but are not limited to: phase, amplitude, code, a combination of these, and/or the like. An example radio transmission method may implement QAM using BPSK, QPSK, 16-QAM, 64-QAM, 256-QAM, and/or the like. Physical radio transmission may be enhanced by dynamically or semi-dynamically changing the modulation and coding scheme depending on transmission requirements and radio conditions.

FIG. 1 shows example sets of OFDM subcarriers. As shown in this example, arrow(s) in the diagram may depict a subcarrier in a multicarrier OFDM system. The OFDM system may use technology such as OFDM technology, DFTS-OFDM, SC-OFDM technology, or the like. For example, arrow 101 shows a subcarrier transmitting information symbols. FIG. 1 is shown as an example, and a typical multicarrier OFDM system may include more subcarriers in a carrier. For example, the number of subcarriers in a carrier may be in the range of 10 to 10,000 subcarriers. FIG. 1 shows two guard bands 106 and 107 in a transmission band. As shown in FIG. 1, guard band 106 is between subcarriers 103 and subcarriers 104. The example set of subcarriers A 102 includes subcarriers 103 and subcarriers 104. FIG. 1 also shows an example set of subcarriers B 105. As shown, there is no guard band between any two subcarriers in the example set of subcarriers B 105. Carriers in a multicarrier OFDM communication system may be contiguous carriers, non-contiguous carriers, or a combination of both contiguous and non-contiguous carriers.

Figure 2:
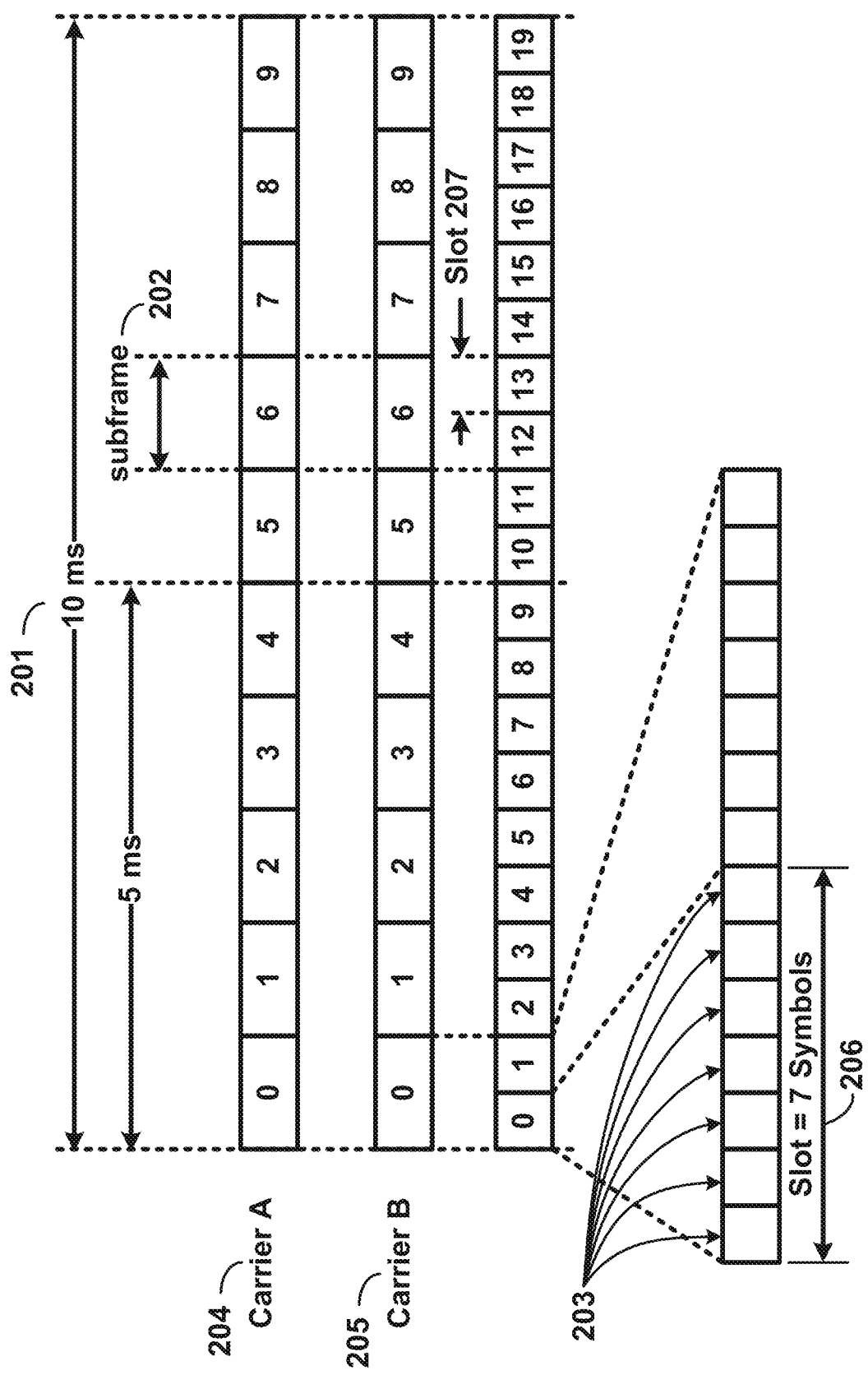
FIG. 2 shows example transmission time and reception time for two carriers in a carrier group.

FIG. 2 shows an example timing arrangement with transmission time and reception time for two carriers. A multicarrier OFDM communication system may include one or more carriers, for example, ranging from 1 to 10 carriers. Carrier A 204 and carrier B 205 may have the same or different timing structures. Although FIG. 2 shows two synchronized carriers, carrier A 204 and carrier B 205 may or may not be synchronized with each other. Different radio frame structures may be supported for FDD and TDD duplex mechanisms. FIG. 2 shows an example FDD frame timing. Downlink and uplink transmissions may be organized into radio frames 201. In this example, radio frame duration is 10 milliseconds (msec). Other frame durations, for example, in the range of 1 to 100 msec may also be supported. Each 10 msec radio frame 201 may be divided into ten equally sized subframes 202. Other subframe durations such as including 0.5 msec, 1 msec, 2 msec, and 5 msec may also be supported. Subframe(s) may comprise two or more slots (e.g., slots 206 and 207). For the example of FDD, 10 subframes may be available for downlink transmission and 10 subframes may be available for uplink transmissions in each 10 msec interval. Uplink and downlink transmissions may be separated in the frequency domain. A slot may be 7 or 14 OFDM symbols for the same subcarrier spacing of up to 60 kHz with normal CP. A slot may be 14 OFDM symbols for the same subcarrier spacing higher than 60 kHz with normal CP. A slot may include all downlink, all uplink, or a downlink part and an uplink part, and/or alike. Slot aggregation may be supported, for example, data transmission may be scheduled to span one or multiple slots. For example, a mini-slot may start at an OFDM symbol in a subframe. A mini-slot may have a duration of one or more OFDM symbols. Slot(s) may include a plurality of OFDM symbols 203. The number of OFDM symbols 203 in a slot 206 may depend on the cyclic prefix length and subcarrier spacing.

Figure 3:
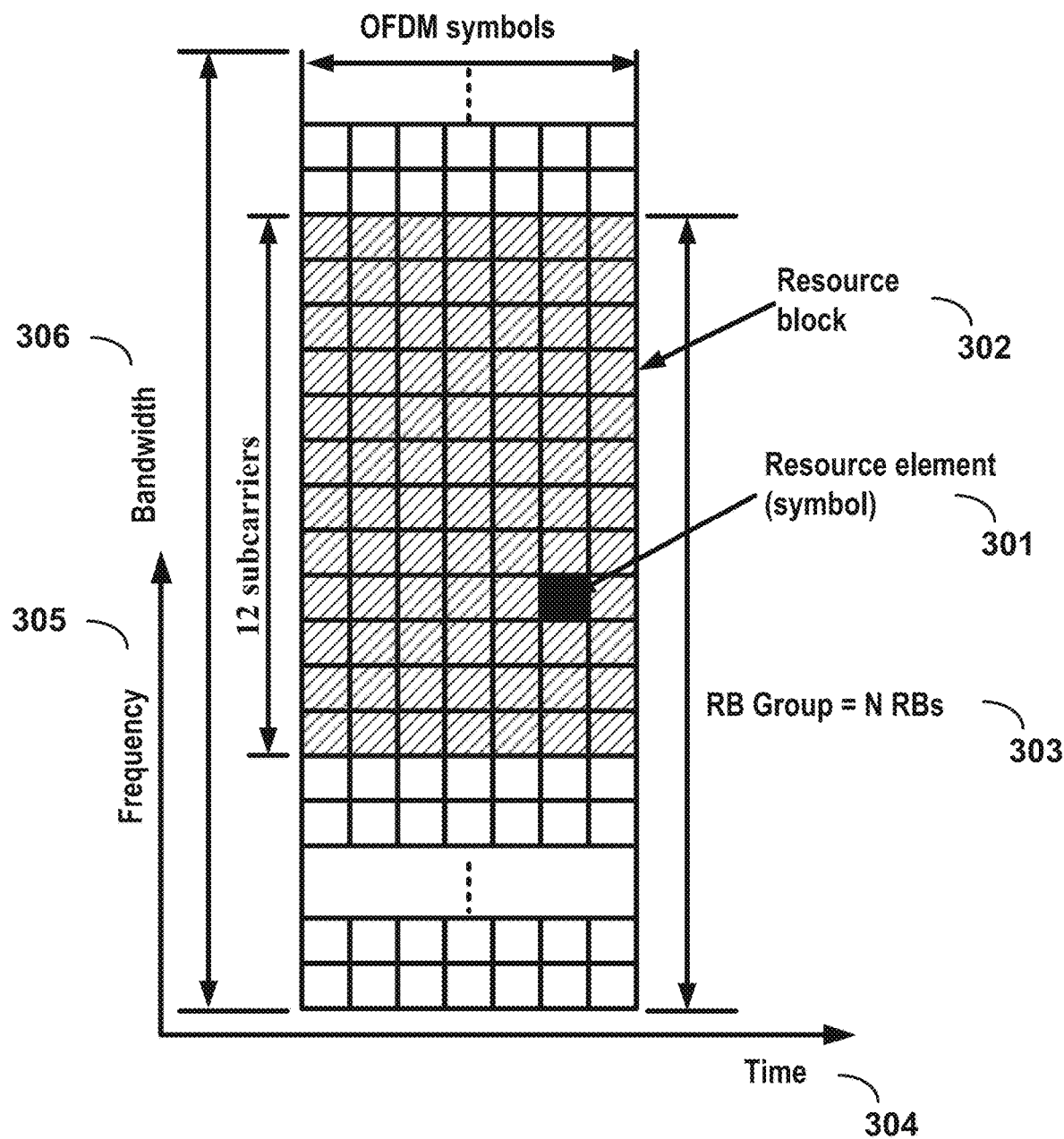
FIG. 3 shows example OFDM radio resources.

FIG. 3 shows an example of OFDM radio resources. The resource grid structure in time 304 and frequency 305 is shown in FIG. 3. The quantity of downlink subcarriers or RBs may depend, at least in part, on the downlink transmission bandwidth 306 configured in the cell. The smallest radio resource unit may be called a resource element (e.g., 301). Resource elements may be grouped into resource blocks (e.g., 302). Resource blocks may be grouped into larger radio resources called Resource Block Groups (RBG) (e.g., 303). The transmitted signal in slot 206 may be described by one or several resource grids of a plurality of subcarriers and a plurality of OFDM symbols. Resource blocks may be used to describe the mapping of certain physical channels to resource elements. Other pre-defined groupings of physical resource elements may be implemented in the system depending on the radio technology. For example, 24 subcarriers may be grouped as a radio block for a duration of 5 msec. A resource block may correspond to one slot in the time domain and 180 kHz in the frequency domain (for 15 kHz subcarrier bandwidth and 12 subcarriers).

Multiple numerologies may be supported. A numerology may be derived by scaling a basic subcarrier spacing by an integer N. Scalable numerology may allow at least from 15 kHz to 480 kHz subcarrier spacing. The numerology with 15 kHz and scaled numerology with different subcarrier spacing with the same CP overhead may align at a symbol boundary every 1 msec in a NR carrier.

Figure 4:
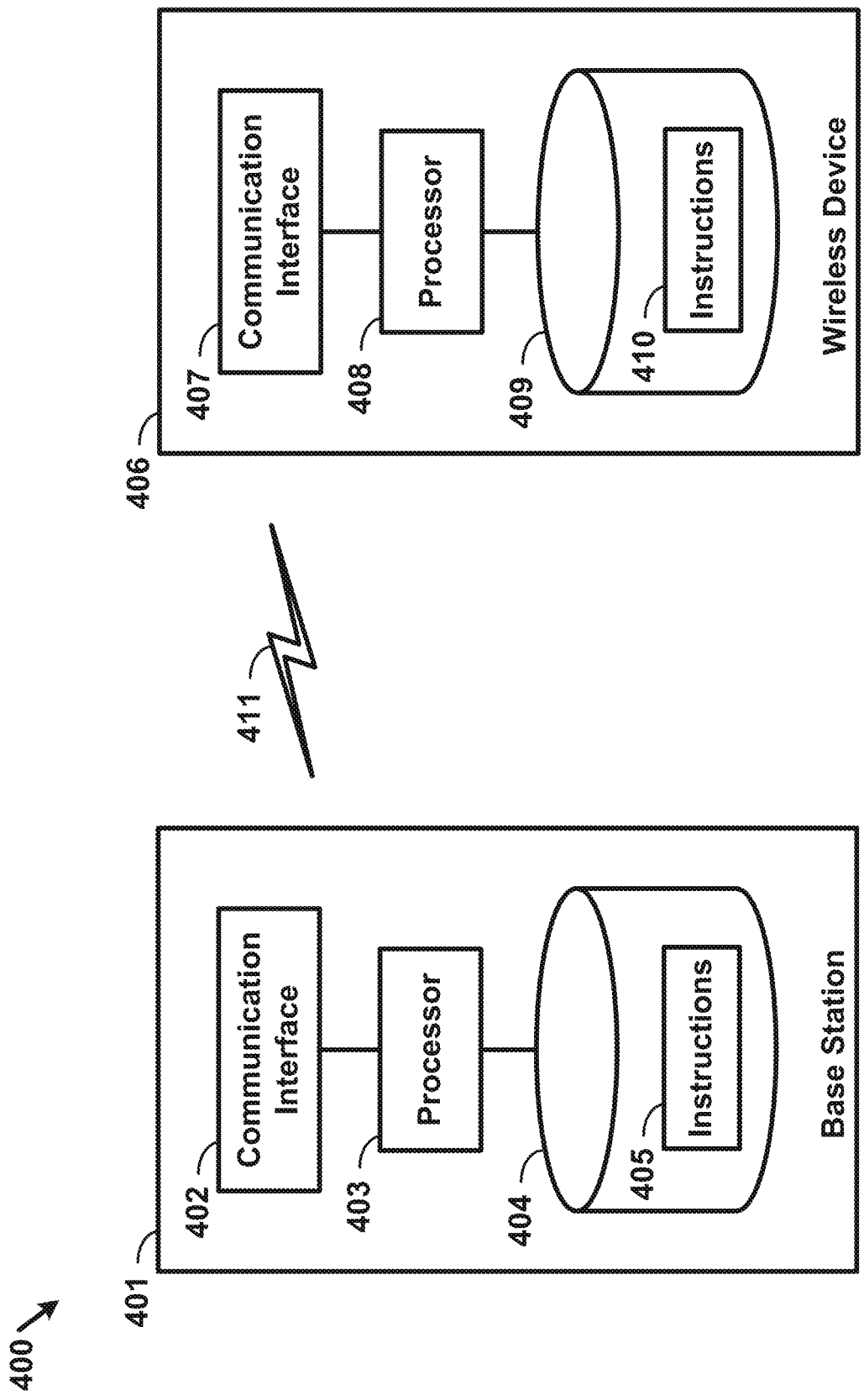
FIG. 4 shows hardware elements of a base station and a wireless device.

FIG. 4 shows hardware elements of a base station 401 and a wireless device 406. A communication network 400 may include at least one base station 401 and at least one wireless device 406. The base station 401 may include at least one communication interface 402, one or more processors 403, and at least one set of program code instructions 405 stored in non-transitory memory 404 and executable by the one or more processors 403. The wireless device 406 may include at least one communication interface 407, one or more processors 408, and at least one set of program code instructions 410 stored in non-transitory memory 409 and executable by the one or more processors 408. A communication interface 402 in the base station 401 may be configured to engage in communication with a communication interface 407 in the wireless device 406, such as via a communication path that includes at least one wireless link 411. The wireless link 411 may be a bi-directional link. The communication interface 407 in the wireless device 406 may also be configured to engage in communication with the communication interface 402 in the base station 401. The base station 401 and the wireless device 406 may be configured to send and receive data over the wireless link 411 using multiple frequency carriers. Base stations, wireless devices, and other communication devices may include structure and operations of transceiver(s). Transceivers, which may comprise both a transmitter and receiver, may be employed in devices such as wireless devices, base stations, relay nodes, and/or the like. Examples for radio technology implemented in the communication interfaces 402, 407 and the wireless link 411 are shown in FIG. 1, FIG. 2, FIG. 3, FIG. 5, and associated text. The communication network 400 may comprise any number and/or type of devices, such as, for example, computing devices, wireless devices, mobile devices, handsets, tablets, laptops, internet of things (IoT) devices, hotspots, cellular repeaters, computing devices, and/or, more generally, user equipment (e.g., UE). Although one or more of the above types of devices may be referenced herein (e.g., UE, wireless device, computing device, etc.), it should be understood that any device herein may comprise any one or more of the above types of devices or similar devices. The communication network 400, and any other network referenced herein, may comprise an LTE network, a 5G network, or any other network for wireless communications. Apparatuses, systems, and/or methods described herein may generally be described as implemented on one or more devices (e.g., wireless device, base station, eNB, gNB, computing device, etc.), in one or more networks, but it will be understood that one or more features and steps may be implemented on any device and/or in any network. As used throughout, the term "base station" may comprise one or more of: a base station, a node, a Node B, a gNB, an eNB, an ng-eNB, a relay node (e.g., an integrated access and backhaul (IAB) node), a donor node (e.g., a donor eNB, a donor gNB, etc.), an access point (e.g., a Wi-Fi access point), a computing device, a device capable of wirelessly communicating, or any other device capable of sending and/or receiving signals. As used throughout, the term "wireless device" may comprise one or more of: a UE, a handset, a mobile device, a computing device, a node, a device capable of wirelessly communicating, or any other device capable of sending and/or receiving signals. Any reference to one or more of these terms/devices also considers use of any other term/device mentioned above.

The communications network 400 may comprise Radio Access Network (RAN) architecture. The RAN architecture may comprise one or more RAN nodes that may be a next generation Node B (gNB) (e.g., 401) providing New Radio (NR) user plane and control plane protocol terminations towards a first wireless device (e.g. 406). A RAN node may be a next generation evolved Node B (ng-eNB), providing Evolved UMTS Terrestrial Radio Access (E-UTRA) user plane and control plane protocol terminations towards a second wireless device. The first wireless device may communicate with a gNB over a Uu interface. The second wireless device may communicate with a ng-eNB over a Uu interface. Base station 401 may comprise one or more of a gNB, ng-eNB, and/or the like.

A gNB or an ng-eNB may host functions such as: radio resource management and scheduling, IP header compression, encryption and integrity protection of data, selection of Access and Mobility Management Function (AMF) at User Equipment (UE) attachment, routing of user plane and control plane data, connection setup and release, scheduling and transmission of paging messages (originated from the AMF), scheduling and transmission of system broadcast information (originated from the AMF or Operation and Maintenance (O&M)), measurement and measurement reporting configuration, transport level packet marking in the uplink, session management, support of network slicing, Quality of Service (QoS) flow management and mapping to data radio bearers, support of wireless devices in RRC_I-

NACTIVE state, distribution function for Non-Access Stratum (NAS) messages, RAN sharing, and dual connectivity or tight interworking between NR and E-UTRA.

One or more gNBs and/or one or more ng-eNBs may be interconnected with each other by means of Xn interface. A gNB or an ng-eNB may be connected by means of NG interfaces to 5G Core Network (5GC). 5GC may comprise one or more AMF/User Plane Function (UPF) functions. A gNB or an ng-eNB may be connected to a UPF by means of an NG-User plane (NG-U) interface. The NG-U interface may provide delivery (e.g., non-guaranteed delivery) of user plane Protocol Data Units (PDUs) between a RAN node and the UPF. A gNB or an ng-eNB may be connected to an AMF by means of an NG-Control plane (e.g., NG-C) interface. The NG-C interface may provide functions such as NG interface management, UE context management, UE mobility management, transport of NAS messages, paging, PDU session management, configuration transfer or warning message transmission.

A UPF may host functions such as anchor point for intra-/inter-Radio Access Technology (RAT) mobility (if applicable), external PDU session point of interconnect to data network, packet routing and forwarding, packet inspection and user plane part of policy rule enforcement, traffic usage reporting, uplink classifier to support routing traffic flows to a data network, branching point to support multi-homed PDU session, QoS handling for user plane, for example, packet filtering, gating, Uplink (UL)/Downlink (DL) rate enforcement, uplink traffic verification (e.g. Service Data Flow (SDF) to QoS flow mapping), downlink packet buffering and/or downlink data notification triggering.

An AMF may host functions such as NAS signaling termination, NAS signaling security, Access Stratum (AS) security control, inter Core Network (CN) node signaling for mobility between $3^{rd}$ Generation Partnership Project (3GPP) access networks, idle mode UE reachability (e.g., control and execution of paging retransmission), registration area management, support of intra-system and inter-system mobility, access authentication, access authorization including check of roaming rights, mobility management control (subscription and policies), support of network slicing and/or Session Management Function (SMF) selection An interface may be a hardware interface, a firmware interface, a software interface, and/or a combination thereof. The hardware interface may include connectors, wires, electronic devices such as drivers, amplifiers, and/or the like. A software interface may include code stored in a memory device to implement protocol(s), protocol layers, communication drivers, device drivers, combinations thereof, and/or the like. A firmware interface may include a combination of embedded hardware and code stored in and/or in communication with a memory device to implement connections, electronic device operations, protocol(s), protocol layers, communication drivers, device drivers, hardware operations, combinations thereof, and/or the like.

The term configured may relate to the capacity of a device whether the device is in an operational or a non-operational state. Configured may also refer to specific settings in a device that effect the operational characteristics of the device whether the device is in an operational or a non-operational state. The hardware, software, firmware, registers, memory values, and/or the like may be "configured" within a device, whether the device is in an operational or a nonoperational state, to provide the device with specific characteristics. Terms such as "a control message to cause in a device" may mean that a control message has parameters that may be used to configure specific characteristics in the device, whether the device is in an operational or a non-operational state.

A network (e.g., a 5G network) may include a multitude of base stations, providing a user plane NR PDCP/NR RLC/NR MAC/NR PHY and control plane (e.g., NR RRC) protocol terminations towards the wireless device. The base station(s) may be interconnected with other base station(s) (e.g., employing an Xn interface). The base stations may also be connected employing, for example, an NG interface to an NGC. FIG. 10A and FIG. 10B show examples for interfaces between a 5G core network (e.g., NGC) and base stations (e.g., gNB and eLTE eNB). For example, the base stations may be interconnected to the NGC control plane (e.g., NG CP) employing the NG-C interface and to the NGC user plane (e.g., UPGW) employing the NG-U interface. The NG interface may support a many-to-many relation between 5G core networks and base stations.

A base station may include many sectors, for example: 1, 2, 3, 4, or 6 sectors. A base station may include many cells, for example, ranging from 1 to 50 cells or more. A cell may be categorized, for example, as a primary cell or secondary cell. At RRC connection establishment/re-establishment/handover, one serving cell may provide the NAS (non-access stratum) mobility information (e.g., TAI), and at RRC connection re-establishment/handover, one serving cell may provide the security input. This cell may be referred to as the Primary Cell (PCell). In the downlink, the carrier corresponding to the PCell may be the Downlink Primary Component Carrier (DL PCC); in the uplink, the carrier corresponding to the PCell may be the Uplink Primary Component Carrier (UL PCC). Depending on wireless device capabilities, Secondary Cells (SCells) may be configured to form together with the PCell a set of serving cells. In the downlink, the carrier corresponding to an SCell may be a Downlink Secondary Component Carrier (DL SCC); in the uplink, the carrier corresponding to an SCell may be an Uplink Secondary Component Carrier (UL SCC). An SCell may or may not have an uplink carrier.

A cell, comprising a downlink carrier and optionally an uplink carrier, may be assigned a physical cell ID and a cell index. A carrier (downlink or uplink) may belong to only one cell. The cell ID or cell index may also identify the downlink carrier or uplink carrier of the cell (depending on the context in which it is used). The cell ID may be equally referred to a carrier ID, and cell index may be referred to carrier index. In implementation, the physical cell ID or cell index may be assigned to a cell. A cell ID may be determined using a synchronization signal transmitted on a downlink carrier. A cell index may be determined using RRC messages. For example, reference to a first physical cell ID for a first downlink carrier may indicate that the first physical cell ID is for a cell comprising the first downlink carrier. The same concept may apply to, for example, carrier activation. Reference to a first carrier that is activated may equally mean that the cell comprising the first carrier is activated.

A device may be configured to operate as needed by freely combining any of the example features described herein. The disclosed mechanisms may be performed if certain criteria are met, for example, in a wireless device, a base station, a radio environment, a network, a combination of the above, and/or the like. Example criteria may be based, at least in part, on for example, traffic load, initial system set up, packet sizes, traffic characteristics, a combination of the above, and/or the like. If the one or more criteria are met, various example embodiments may be satisfied. Therefore, it may be possible to implement examples that selectively implement disclosed protocols.

A base station may communicate with a variety of wireless devices. Wireless devices may support multiple technologies, and/or multiple releases of the same technology. Wireless devices may have some specific capability(ies) depending on its wireless device category and/or capability(ies). A base station may comprise multiple sectors. Reference to a base station communicating with a plurality of wireless devices may indicate that a base station may communicate with a subset of the total wireless devices in a coverage area. A plurality of wireless devices of a given LTE or 5G release, with a given capability and in a given sector of the base station, may be used. The plurality of wireless devices may refer to a selected plurality of wireless devices, and/or a subset of total wireless devices in a coverage area which perform according to disclosed methods, and/or the like. There may be a plurality of wireless devices in a coverage area that may not comply with the disclosed methods, for example, because those wireless devices perform based on older releases of LTE or 5G technology.

A base station may transmit (e.g., to a wireless device) one or more messages (e.g. RRC messages) that may comprise a plurality of configuration parameters for one or more cells. One or more cells may comprise at least one primary cell and at least one secondary cell. An RRC message may be broadcasted or unicasted to the wireless device. Configuration parameters may comprise common parameters and dedicated parameters.

Services and/or functions of an RRC sublayer may comprise at least one of: broadcast of system information related to AS and NAS; paging initiated by 5GC and/or NG-RAN; establishment, maintenance, and/or release of an RRC connection between a wireless device and NG-RAN, which may comprise at least one of addition, modification and release of carrier aggregation; or addition, modification, and/or release of dual connectivity in NR or between E-UTRA and NR. Services and/or functions of an RRC sublayer may further comprise at least one of security functions comprising key management; establishment, configuration, maintenance, and/or release of Signaling Radio Bearers (SRBs) and/or Data Radio Bearers (DRBs); mobility functions which may comprise at least one of a handover (e.g. intra NR mobility or inter-RAT mobility) and a context transfer; or a wireless device cell selection and reselection and control of cell selection and reselection. Services and/or functions of an RRC sublayer may further comprise at least one of QoS management functions; a wireless device measurement configuration/reporting; detection of and/or recovery from radio link failure; or NAS message transfer to/from a core network entity (e.g. AMF, Mobility Management Entity (MME)) from/to the wireless device.

An RRC sublayer may support an RRC_Idle state, an RRC_Inactive state and/or an RRC_Connected state for a wireless device. In an RRC_Idle state, a wireless device may perform at least one of: Public Land Mobile Network (PLMN) selection; receiving broadcasted system information; cell selection/re-selection; monitoring/receiving a paging for mobile terminated data initiated by 5GC; paging for mobile terminated data area managed by 5GC; or DRX for CN paging configured via NAS. In an RRC_Inactive state, a wireless device may perform at least one of: receiving broadcasted system information; cell selection/re-selection; monitoring/receiving a RAN/CN paging initiated by NG-RAN/5GC; RAN-based notification area (RNA) managed by NG-RAN; or DRX for RAN/CN paging configured by NG-RAN/NAS. In an RRC_Idle state of a wireless device, a base station (e.g. NG-RAN) may keep a 5GC-NG-RAN connection (both C/U-planes) for the wireless device; and/or store a UE AS context for the wireless device. In an RRC_Connected state of a wireless device, a base station (e.g. NG-RAN) may perform at least one of: establishment of 5GC-NG-RAN connection (both C/U-planes) for the wireless device; storing a UE AS context for the wireless device; transmit/receive of unicast data to/from the wireless device; or network-controlled mobility based on measurement results received from the wireless device. In an RRC_Connected state of a wireless device, an NG-RAN may know a cell that the wireless device belongs to.

System information (SI) may be divided into minimum SI and other SI. The minimum SI may be periodically broadcast. The minimum SI may comprise basic information required for initial access and information for acquiring any other SI broadcast periodically or provisioned on-demand, i.e. scheduling information. The other SI may either be broadcast, or be provisioned in a dedicated manner, either triggered by a network or upon request from a wireless device. A minimum SI may be transmitted via two different downlink channels using different messages (e.g. MasterInformationBlock and SystemInformationBlockType1). The other SI may be transmitted via SystemInformationBlockType2. For a wireless device in an RRC_Connected state, dedicated RRC signaling may be employed for the request and delivery of the other SI. For the wireless device in the RRC_Idle state and/or the RRC_Inactive state, the request may trigger a random-access procedure.

A wireless device may send its radio access capability information which may be static. A base station may request what capabilities for a wireless device to report based on band information. If allowed by a network, a temporary capability restriction request may be sent by the wireless device to signal the limited availability of some capabilities (e.g. due to hardware sharing, interference or overheating) to the base station. The base station may confirm or reject the request. The temporary capability restriction may be transparent to 5GC (e.g., static capabilities may be stored in 5GC).

If CA is configured, a wireless device may have an RRC connection with a network. At RRC connection establishment/re-establishment/handover procedure, one serving cell may provide NAS mobility information, and at RRC connection re-establishment/handover, one serving cell may provide a security input. This cell may be referred to as the PCell. Depending on the capabilities of the wireless device, SCells may be configured to form together with the PCell a set of serving cells. The configured set of serving cells for the wireless device may comprise one PCell and one or more SCells.

The reconfiguration, addition and removal of SCells may be performed by RRC. At intra-NR handover, RRC may also add, remove, or reconfigure SCells for usage with the target PCell. If adding a new SCell, dedicated RRC signaling may be employed to send all required system information of the SCell. In connected mode, wireless devices may not need to acquire broadcasted system information directly from the SCells.

An RRC connection reconfiguration procedure may be used to modify an RRC connection, (e.g. to establish, modify and/or release RBs, to perform handover, to setup, modify, and/or release measurements, to add, modify, and/or release SCells and cell groups). As part of the RRC connection reconfiguration procedure, NAS dedicated information may be transferred from the network to the wireless device. The RRCConnectionReconfiguration message may be a command to modify an RRC connection. It may convey information for measurement configuration, mobility control, radio resource configuration (e.g. RBs, MAC main configuration and physical channel configuration) comprising any associated dedicated NAS information and security configuration. If the received RRC Connection Reconfiguration message includes the sCellToReleaseList, the wireless device may perform an SCell release. If the received RRC Connection Reconfiguration message includes the sCellToAddModList, the wireless device may perform SCell additions or modification.

An RRC connection establishment (or reestablishment, resume) procedure may be used to establish (or reestablish, resume) an RRC connection. An RRC connection establishment procedure may comprise SRB1 establishment. The RRC connection establishment procedure may be used to transfer the initial NAS dedicated information message from a wireless device to E-UTRAN. The RRCConnectionReestablishment message may be used to re-establish SRB1.

A measurement report procedure may be to transfer measurement results from a wireless device to NG-RAN. The wireless device may initiate a measurement report procedure, for example, after successful security activation. A measurement report message may be employed to transmit measurement results.

FIG. 5A, FIG. 5B, FIG. 5C, and FIG. 5D show examples of architecture for uplink and downlink signal transmission. FIG. 5A shows an example for an uplink physical channel. The baseband signal representing the physical uplink shared channel may perform the following processes, which may be performed by the structures described below. These structures and corresponding functions are shown as examples, and it is anticipated that other mechanisms may be implemented in various examples. The structures and corresponding functions may comprise, for example, one or more scrambling devices 501A and 501B configured to perform scrambling of coded bits in each of the codewords to be transmitted on a physical channel; one or more modulation mappers 502A and 502B configured to perform modulation of scrambled bits to generate complex-valued symbols; a layer mapper 503 configured to perform mapping of the complex-valued modulation symbols onto one or several transmission layers; one or more transform precoders 504A and 504B to generate complex-valued symbols; a precoding device 505 configured to perform precoding of the complex-valued symbols; one or more resource element mappers 506A and 506B configured to perform mapping of precoded complex-valued symbols to resource elements; one or more signal generators 507A and 507B configured to perform the generation of a complex-valued time-domain DFTS-OFDM/SC-FDMA signal for each antenna port; and/or the like.

FIG. 5B shows an example for performing modulation and up-conversion to the carrier frequency of the complex-valued DFTS-OFDM/SC-FDMA baseband signal, for example, for each antenna port and/or for the complex-valued physical random access channel (PRACH) baseband signal. For example, the baseband signal, represented as $s_1(t)$, may be split, by a signal splitter 510, into real and imaginary components, $Re\{s_1(t)\}$ and $Im\{s_1\}$, respectively. The real component may be modulated by a modulator 511A, and the imaginary component may be modulated by a modulator 511B. The output signal of the modulator 511A and the output signal of the modulator 511B may be mixed by a mixer 512. The output signal of the mixer 512 may be input to a filtering device 513, and filtering may be employed by the filtering device 513 prior to transmission.

FIG. 5C shows an example structure for downlink transmissions. The baseband signal representing a downlink physical channel may perform the following processes, which may be performed by structures described below. These structures and corresponding functions are shown as examples, and it is anticipated that other mechanisms may be implemented in various examples. The structures and corresponding functions may comprise, for example, one or more scrambling devices 531A and 531B configured to perform scrambling of coded bits in each of the codewords to be transmitted on a physical channel; one or more modulation mappers 532A and 532B configured to perform modulation of scrambled bits to generate complex-valued modulation symbols; a layer mapper 533 configured to perform mapping of the complex-valued modulation symbols onto one or several transmission layers; a precoding device 534 configured to perform precoding of the complex-valued modulation symbols on each layer for transmission on the antenna ports; one or more resource element mappers 535A and 535B configured to perform mapping of complex-valued modulation symbols for each antenna port to resource elements; one or more OFDM signal generators 536A and 536B configured to perform the generation of complex-valued time-domain OFDM signal for each antenna port; and/or the like.

FIG. 5D shows an example structure for modulation and up-conversion to the carrier frequency of the complex-valued OFDM baseband signal for each antenna port. For example, the baseband signal, represented as $s_1^{(p)}(t)$, may be split, by a signal splitter 520, into real and imaginary components, $Re\{s_1^{(p)}(t)\}$ and $Im\{s_1^{(p)}(t)\}$, respectively. The real component may be modulated by a modulator 521A, and the imaginary component may be modulated by a modulator 521B. The output signal of the modulator 521A and the output signal of the modulator 521B may be mixed by a mixer 522. The output signal of the mixer 522 may be input to a filtering device 523, and filtering may be employed by the filtering device 523 prior to transmission.

Figure 6:
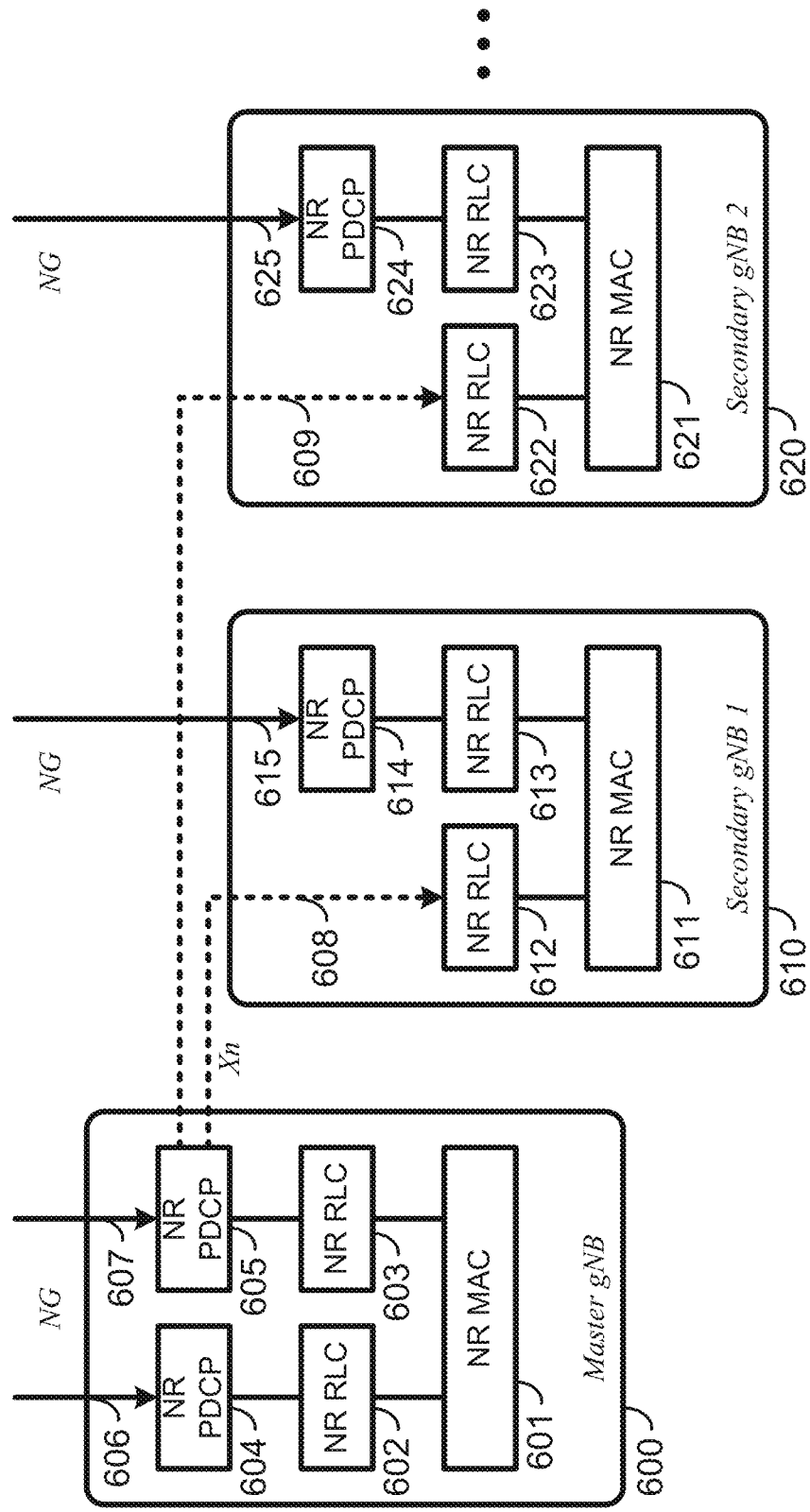
FIG. 6 shows an example protocol structure with multi-connectivity.
Figure 7:
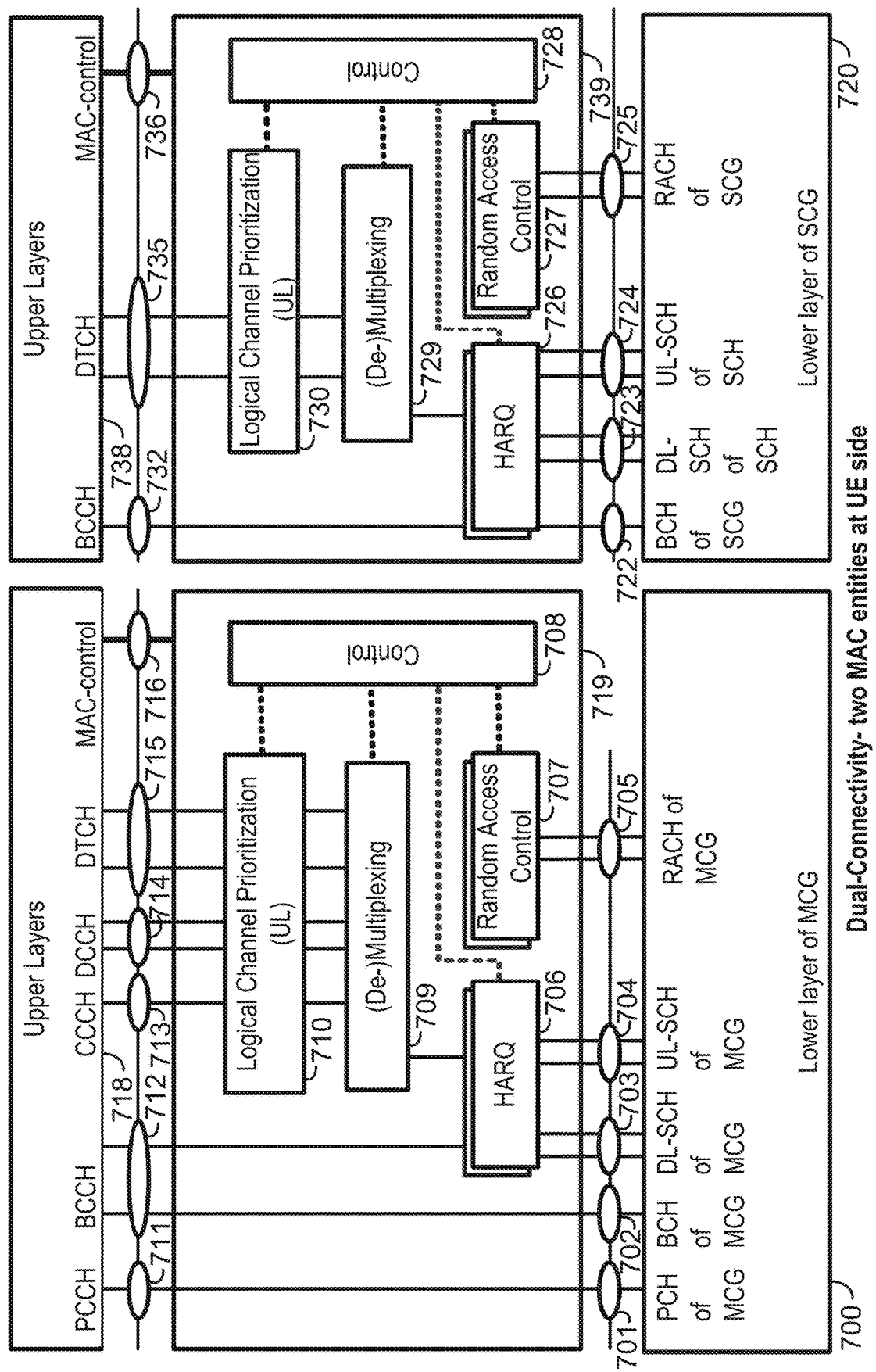
FIG. 7 shows an example protocol structure with carrier aggregation (CA) and dual connectivity (DC).

FIG. 6 and FIG. 7 show examples for protocol structures with CA and multi-connectivity. NR may support multi-connectivity operation, whereby a multiple receiver/transmitter (RX/TX) wireless device in RRC_CONNECTED may be configured to utilize radio resources provided by multiple schedulers located in multiple gNBs connected via a non-ideal or ideal backhaul over the Xn interface. gNBs involved in multi-connectivity for a certain wireless device may assume two different roles: a gNB may either act as a master gNB (e.g., 600) or as a secondary gNB (e.g., 610 or 620). In multi-connectivity, a wireless device may be connected to one master gNB (e.g., 600) and one or more secondary gNBs (e.g., 610 and/or 620). Any one or more of the Master gNB 600 and/or the secondary gNBs 610 and 620 may be a Next Generation (NG) NodeB. The master gNB 600 may comprise protocol layers NR MAC 601, NR RLC 602 and 603, and NR PDCP 604 and 605. The secondary gNB may comprise protocol layers NR MAC 611, NR RLC 612 and 613, and NR PDCP 614. The secondary gNB may comprise protocol layers NR MAC 621, NR RLC 622 and 623, and NR PDCP 624. The master gNB 600 may communicate via an interface 606 and/or via an interface 607, the secondary gNB 610 may communicate via an interface 615, and the secondary gNB 620 may communicate via an interface 625. The master gNB 600 may also communicate with the secondary gNB 610 and the secondary gNB 621 via interfaces 608 and 609, respectively, which may include Xn interfaces. For example, the master gNB 600 may communicate via the interface 608, at layer NR PDCP 605, and with the secondary gNB 610 at layer NR RLC 612. The master gNB 600 may communicate via the interface 609, at layer NR PDCP 605, and with the secondary gNB 620 at layer NR RLC 622.

FIG. 7 shows an example structure for the UE side MAC entities, for example, if a Master Cell Group (MCG) and a Secondary Cell Group (SCG) are configured. Media Broadcast Multicast Service (MBMS) reception may be included but is not shown in this figure for simplicity.

In multi-connectivity, the radio protocol architecture that a particular bearer uses may depend on how the bearer is set up. As an example, three alternatives may exist, an MCG bearer, an SCG bearer, and a split bearer, such as shown in FIG. 6. NR RRC may be located in a master gNB and SRBs may be configured as an MCG bearer type and may use the radio resources of the master gNB. Multi-connectivity may have at least one bearer configured to use radio resources provided by the secondary gNB. Multi-connectivity may or may not be configured or implemented.

For multi-connectivity, the wireless device may be configured with multiple NR MAC entities: e.g., one NR MAC entity for a master gNB, and other NR MAC entities for secondary gNBs. In multi-connectivity, the configured set of serving cells for a wireless device may comprise two subsets: e.g., the Master Cell Group (MCG) including the serving cells of the master gNB, and the Secondary Cell Groups (SCGs) including the serving cells of the secondary gNBs.

At least one cell in a SCG may have a configured UL component carrier (CC) and one of the UL CCs, for example, named PSCell (or PCell of SCG, or sometimes called PCell), may be configured with PUCCH resources. If the SCG is configured, there may be at least one SCG bearer or one split bearer. If a physical layer problem or a random access problem on a PSCell occurs or is detected, if the maximum number of NR RLC retransmissions has been reached associated with the SCG, or if an access problem on a PSCell during a SCG addition or a SCG change occurs or is detected, then an RRC connection re-establishment procedure may not be triggered, UL transmissions towards cells of the SCG may be stopped, a master gNB may be informed by the wireless device of a SCG failure type, and for a split bearer the DL data transfer over the master gNB may be maintained. The NR RLC Acknowledge Mode (AM) bearer may be configured for the split bearer. Like the PCell, a PSCell may not be de-activated. The PSCell may be changed with an SCG change (e.g., with a security key change and a RACH procedure). A direct bearer type may change between a split bearer and an SCG bearer, or a simultaneous configuration of an SCG and a split bearer may or may not be supported.

A master gNB and secondary gNBs may interact for multi-connectivity. The master gNB may maintain the RRM measurement configuration of the wireless device, and the master gNB may, (e.g., based on received measurement reports, and/or based on traffic conditions and/or bearer types), decide to ask a secondary gNB to provide additional resources (e.g., serving cells) for a wireless device. If a request from the master gNB is received, a secondary gNB may create a container that may result in the configuration of additional serving cells for the wireless device (or the secondary gNB decide that it has no resource available to do so). For wireless device capability coordination, the master gNB may provide some or all of the Active Set (AS) configuration and the wireless device capabilities to the secondary gNB. The master gNB and the secondary gNB may exchange information about a wireless device configuration, such as by employing NR RRC containers (e.g., inter-node messages) carried in Xn messages. The secondary gNB may initiate a reconfiguration of its existing serving cells (e.g., PUCCH towards the secondary gNB). The secondary gNB may decide which cell is the PSCell within the SCG. The master gNB may or may not change the content of the NR RRC configuration provided by the secondary gNB. In an SCG addition and an SCG SCell addition, the master gNB may provide the latest measurement results for the SCG cell(s). Both a master gNB and a secondary gNBs may know the system frame number (SFN) and subframe offset of each other by operations, administration, and maintenance (OAM) (e.g., for the purpose of discontinuous reception (DRX) alignment and identification of a measurement gap). If adding a new SCG SCell, dedicated NR RRC signaling may be used for sending required system information of the cell for CA, except, for example, for the SFN acquired from an MIB of the PSCell of an SCG.

FIG. 7 shows an example of dual-connectivity (DC) for two MAC entities at a wireless device side. A first MAC entity may comprise a lower layer of an MCG 700, an upper layer of an MCG 718, and one or more intermediate layers of an MCG 719. The lower layer of the MCG 700 may comprise, for example, a paging channel (PCH) 701, a broadcast channel (BCH) 702, a downlink shared channel (DL-SCH) 703, an uplink shared channel (UL-SCH) 704, and a random access channel (RACH) 705. The one or more intermediate layers of the MCG 719 may comprise, for example, one or more hybrid automatic repeat request (HARQ) processes 706, one or more random access control processes 707, multiplexing and/or de-multiplexing processes 709, logical channel prioritization on the uplink processes 710, and a control processes 708 providing control for the above processes in the one or more intermediate layers of the MCG 719. The upper layer of the MCG 718 may comprise, for example, a paging control channel (PCCH) 711, a broadcast control channel (BCCH) 712, a common control channel (CCCH) 713, a dedicated control channel (DCCH) 714, a dedicated traffic channel (DTCH) 715, and a MAC control 716.

A second MAC entity may comprise a lower layer of an SCG 720, an upper layer of an SCG 738, and one or more intermediate layers of an SCG 739. The lower layer of the SCG 720 may comprise, for example, a BCH 722, a DL-SCH 723, an UL-SCH 724, and a RACH 725. The one or more intermediate layers of the SCG 739 may comprise, for example, one or more HARQ processes 726, one or more random access control processes 727, multiplexing and/or de-multiplexing processes 729, logical channel prioritization on the uplink processes 730, and a control processes 728 providing control for the above processes in the one or more intermediate layers of the SCG 739. The upper layer of the SCG 738 may comprise, for example, a BCCH 732, a DCCH 714, a DTCH 735, and a MAC control 736.

Serving cells may be grouped in a TA group (TAG). Serving cells in one TAG may use the same timing reference. For a given TAG, a wireless device may use at least one downlink carrier as a timing reference. For a given TAG, a wireless device may synchronize uplink subframe and frame transmission timing of uplink carriers belonging to the same TAG. Serving cells having an uplink to which the same TA applies may correspond to serving cells hosted by the same receiver. A wireless device supporting multiple TAs may support two or more TA groups. One TA group may include the PCell and may be called a primary TAG (pTAG). In a multiple TAG configuration, at least one TA group may not include the PCell and may be called a secondary TAG (sTAG). Carriers within the same TA group may use the same TA value and/or the same timing reference. If DC is configured, cells belonging to a cell group (e.g., MCG or SCG) may be grouped into multiple TAGs including a pTAG and one or more sTAGs.

FIG. 8 shows example TAG configurations. In Example 1, a pTAG comprises a PCell, and an sTAG comprises an SCell1. In Example 2, a pTAG comprises a PCell and an SCell1, and an sTAG comprises an SCell2 and an SCell3. In Example 3, a pTAG comprises a PCell and an SCell1, and an sTAG1 comprises an SCell2 and an SCell3, and an sTAG2 comprises a SCell4. Up to four TAGs may be supported in a cell group (MCG or SCG), and other example TAG configurations may also be provided. In various examples, structures and operations are described for use with a pTAG and an sTAG. Some of the examples may be used for configurations with multiple sTAGs.

An eNB may initiate an RA procedure, via a PDCCH order, for an activated SCell. The PDCCH order may be sent on a scheduling cell of this SCell. If cross carrier scheduling is configured for a cell, the scheduling cell may be different than the cell that is employed for preamble transmission, and the PDCCH order may include an SCell index. At least a non-contention-based RA procedure may be supported for SCell(s) assigned to sTAG(s).

Figure 9:
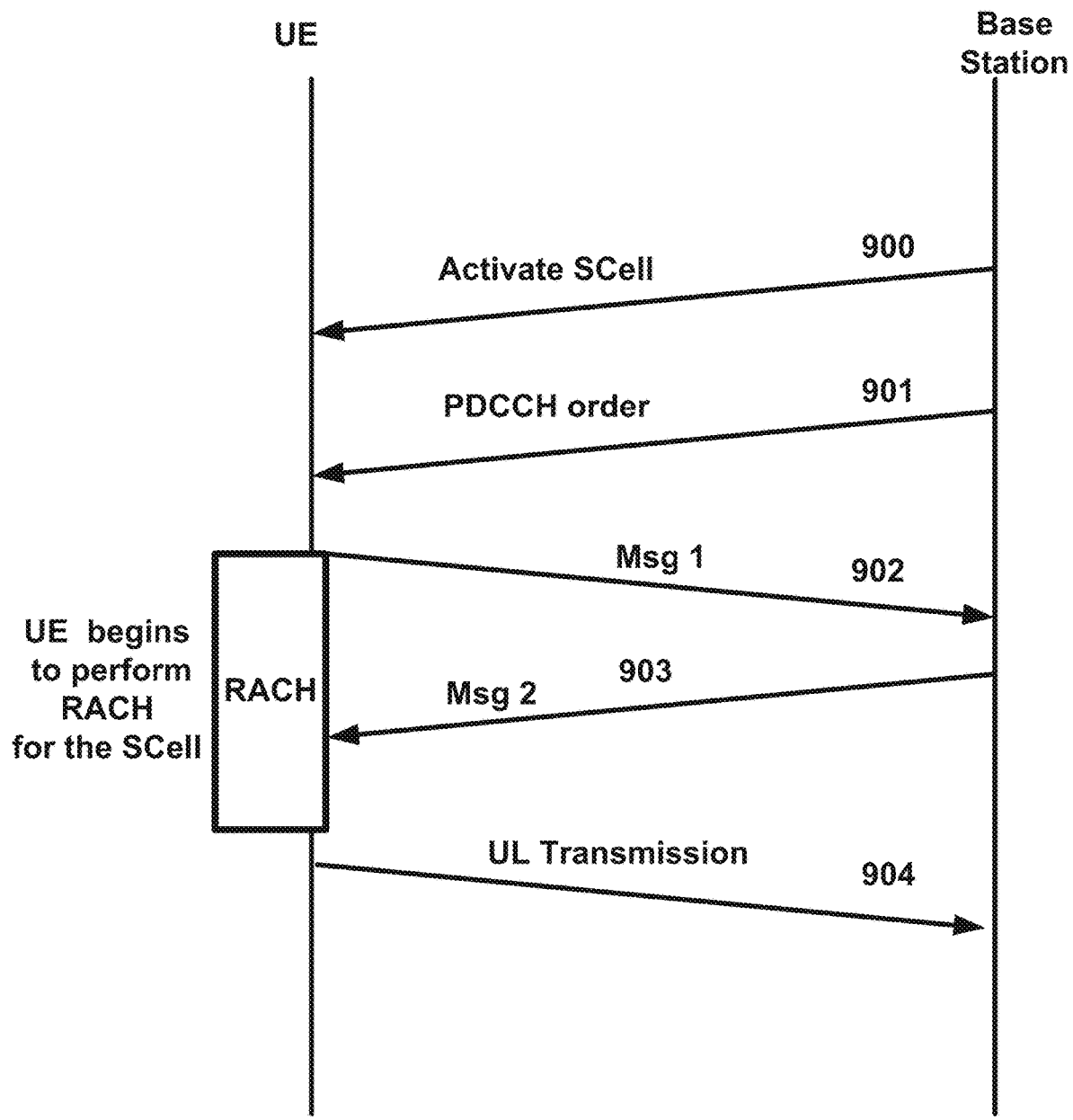
FIG. 9 shows example message flow in a random access process in a secondary TAG.

FIG. 9 shows an example of random access processes, and a corresponding message flow, in a secondary TAG. A base station, such as an eNB, may transmit an activation command 900 to a wireless device, such as a UE. The activation command 900 may be transmitted to activate an SCell. The base station may also transmit a PDDCH order 901 to the wireless device, which may be transmitted, for example, after the activation command 900. The wireless device may begin to perform a RACH process for the SCell, which may be initiated, for example, after receiving the PDDCH order 901. A wireless device may transmit to the base station (e.g., as part of a RACH process) a preamble 902 (e.g., Msg1), such as a random access preamble (RAP). The preamble 902 may be transmitted after or in response to the PDCCH order 901. The wireless device may transmit the preamble 902 via an SCell belonging to an sTAG. Preamble transmission for SCells may be controlled by a network using PDCCH format 1A. The base station may send a random access response (RAR) 903 (e.g., Msg2 message) to the wireless device. The RAR 903 may be after or in response to the preamble 902 transmission via the SCell. The RAR 903 may be addressed to a random access radio network temporary identifier (RA-RNTI) in a PCell common search space (CSS). If the wireless device receives the RAR 903, the RACH process may conclude. The RACH process may conclude, for example, after or in response to the wireless device receiving the RAR 903 from the base station. After the RACH process, the wireless device may transmit an uplink transmission 904. The uplink transmission 904 may comprise uplink packets transmitted via the same SCell used for the preamble 902 transmission.

Timing alignment (e.g., initial timing alignment) for communications between the wireless device and the base station may be performed through a random access procedure, such as described above regarding FIG. 9. The random access procedure may involve a wireless device, such as a UE, transmitting a random access preamble and a base station, such as an eNB, responding with an initial TA command NTA (amount of timing advance) within a random access response window. The start of the random access preamble may be aligned with the start of a corresponding uplink subframe at the wireless device assuming NTA=0.

The eNB may estimate the uplink timing from the random access preamble transmitted by the wireless device. The TA command may be derived by the eNB based on the estimation of the difference between the desired UL timing and the actual UL timing. The wireless device may determine the initial uplink transmission timing relative to the corresponding downlink of the sTAG on which the preamble is transmitted.

The mapping of a serving cell to a TAG may be configured by a serving eNB with RRC signaling. The mechanism for TAG configuration and reconfiguration may be based on RRC signaling. If an eNB performs an SCell addition configuration, the related TAG configuration may be configured for the SCell. An eNB may modify the TAG configuration of an SCell by removing (e.g., releasing) the SCell and adding (e.g., configuring) a new SCell (with the same physical cell ID and frequency) with an updated TAG ID. The new SCell with the updated TAG ID may initially be inactive subsequent to being assigned the updated TAG ID. The eNB may activate the updated new SCell and start scheduling packets on the activated SCell. In some examples, it may not be possible to change the TAG associated with an SCell, but rather, the SCell may need to be removed and a new SCell may need to be added with another TAG. For example, if there is a need to move an SCell from an sTAG to a pTAG, at least one RRC message, such as at least one RRC reconfiguration message, may be sent to the wireless device. The at least one RRC message may be sent to the wireless device to reconfigure TAG configurations, for example, by releasing the SCell and configuring the SCell as a part of the pTAG. If, for example, an SCell is added or configured without a TAG index, the SCell may be explicitly assigned to the pTAG. The PCell may not change its TA group and may be a member of the pTAG.

The purpose of an RRC connection reconfiguration procedure may be to modify an RRC connection, (e.g., to establish, modify and/or release RBs, to perform handover, to setup, modify, and/or release measurements, to add, modify, and/or release SCells). If the received RRC Connection Reconfiguration message includes the sCellToReleaseList, the wireless device may perform an SCell release. If the received RRC Connection Reconfiguration message includes the sCellToAddModList, the wireless device may perform SCell additions or modification.

In LTE Release-10 and Release-11 CA, a PUCCH transmission is only transmitted on a PCell (e.g., a PSCell) to an eNB. In LTE-Release 12 and earlier, a wireless device may transmit PUCCH information on one cell (e.g., a PCell or a PSCell) to a given eNB. As the number of CA capable wireless devices increases, and as the number of aggregated carriers increases, the number of PUCCHs and the PUCCH payload size may increase. Accommodating the PUCCH transmissions on the PCell may lead to a high PUCCH load on the PCell. A PUCCH on an SCell may be used to offload the PUCCH resource from the PCell. More than one PUCCH may be configured. For example, a PUCCH on a PCell may be configured and another PUCCH on an SCell may be configured. One, two, or more cells may be configured with PUCCH resources for transmitting CSI, acknowledgment (ACK), and/or non-acknowledgment (NACK) to a base station. Cells may be grouped into multiple PUCCH groups, and one or more cells within a group may be configured with a PUCCH. One SCell may belong to one PUCCH group. SCells with a configured PUCCH transmitted to a base station may be called a PUCCH SCell, and a cell group with a common PUCCH resource transmitted to the same base station may be called a PUCCH group.

A MAC entity may have a configurable timer, for example, timeAlignmentTimer, per TAG. The timeAlignmentTimer may be used to control how long the MAC entity considers the serving cells belonging to the associated TAG to be uplink time aligned. If a Timing Advance Command MAC control element is received, the MAC entity may apply the Timing Advance Command for the indicated TAG; and/or the MAC entity may start or restart the timeAlignmentTimer associated with a TAG that may be indicated by the Timing Advance Command MAC control element. If a Timing Advance Command is received in a Random Access Response message for a serving cell belonging to a TAG, the MAC entity may apply the Timing Advance Command for this TAG and/or start or restart the timeAlignmentTimer associated with this TAG. Additionally or alternatively, if the Random Access Preamble is not selected by the MAC entity, the MAC entity may apply the Timing Advance Command for this TAG and/or start or restart the timeAlignmentTimer associated with this TAG. If the timeAlignmentTimer associated with this TAG is not running, the Timing Advance Command for this TAG may be applied, and the timeAlignmentTimer associated with this TAG may be started. If the contention resolution is not successful, a timeAlignmentTimer associated with this TAG may be stopped. If the contention resolution is successful, the MAC entity may ignore the received Timing Advance Command The MAC entity may determine whether the contention resolution is successful or whether the contention resolution is not successful.

A timer may be considered to be running after it is started, until it is stopped, or until it expires; otherwise it may be considered to not be running A timer can be started if it is not running or restarted if it is running. For example, a timer may be started or restarted from its initial value.

Features described herein may enable operation of multi-carrier communications. Features may comprise a non-transitory tangible computer readable media comprising instructions executable by one or more processors to cause operation of multi-carrier communications. The features may comprise an article of manufacture that comprises a non-transitory tangible computer readable machine-accessible medium having instructions encoded thereon for enabling programmable hardware to cause a device (e.g. wireless communicator, UE, base station, etc.) to enable operation of multi-carrier communications. The devices herein may include processors, memory, interfaces, and/or the like. Features may comprise communication networks comprising devices such as base stations, wireless devices (or user equipment: UE), servers, switches, antennas, and/or the like.

FIG. 10A and FIG. 10B show examples for interfaces between a 5G core network (e.g., NGC) and base stations (e.g., gNB and eLTE eNB). A base station, such as a gNB 1020, may be interconnected to an NGC 1010 control plane employing an NG-C interface. The base station, for example, the gNB 1020, may also be interconnected to an NGC 1010 user plane (e.g., UPGW) employing an NG-U interface. As another example, a base station, such as an eLTE eNB 1040, may be interconnected to an NGC 1030 control plane employing an NG-C interface. The base station, for example, the eLTE eNB 1040, may also be interconnected to an NGC 1030 user plane (e.g., UPGW) employing an NG-U interface. An NG interface may support a many-to-many relation between 5G core networks and base stations.

FIG. 11A, FIG. 11B, FIG. 11C, FIG. 11D, FIG. 11E, and FIG. 11F are examples for architectures of tight interworking between a 5G RAN and an LTE RAN. The tight interworking may enable a multiple receiver/transmitter (RX/TX) wireless device in an RRC_CONNECTED state to be configured to utilize radio resources provided by two schedulers located in two base stations (e.g., an eLTE eNB and a gNB). The two base stations may be connected via a non-ideal or ideal backhaul over the Xx interface between an LTE eNB and a gNB, or over the Xn interface between an eLTE eNB and a gNB. Base stations involved in tight interworking for a certain wireless device may assume different roles. For example, a base station may act as a master base station or a base station may act as a secondary base station. In tight interworking, a wireless device may be connected to both a master base station and a secondary base station. Mechanisms implemented in tight interworking may be extended to cover more than two base stations.

A master base station may be an LTE eNB 1102A or an LTE eNB 1102B, which may be connected to EPC nodes 1101A or 1101B, respectively. This connection to EPC nodes may be, for example, to an MME via the S1-C interface and/or to an S-GW via the S1-U interface. A secondary base station may be a gNB 1103A or a gNB 1103B, either or both of which may be a non-standalone node having a control plane connection via an Xx-C interface to an LTE eNB (e.g., the LTE eNB 1102A or the LTE eNB 1102B). In the tight interworking architecture of FIG. 11A, a user plane for a gNB (e.g., the gNB 1103A) may be connected to an S-GW (e.g., the EPC 1101A) through an LTE eNB (e.g., the LTE eNB 1102A), via an Xx-U interface between the LTE eNB and the gNB, and via an S1-U interface between the LTE eNB and the S-GW. In the architecture of FIG. 11B, a user plane for a gNB (e.g., the gNB 1103B) may be connected directly to an S-GW (e.g., the EPC 1101B) via an S1-U interface between the gNB and the S-GW.

A master base station may be a gNB 1103C or a gNB 1103D, which may be connected to NGC nodes 1101C or 1101D, respectively. This connection to NGC nodes may be, for example, to a control plane core node via the NG-C interface and/or to a user plane core node via the NG-U interface. A secondary base station may be an eLTE eNB 1102C or an eLTE eNB 1102D, either or both of which may be a non-standalone node having a control plane connection via an Xn-C interface to a gNB (e.g., the gNB 1103C or the gNB 1103D). In the tight interworking architecture of FIG. 11C, a user plane for an eLTE eNB (e.g., the eLTE eNB 1102C) may be connected to a user plane core node (e.g., the NGC 1101C) through a gNB (e.g., the gNB 1103C), via an Xn-U interface between the eLTE eNB and the gNB, and via an NG-U interface between the gNB and the user plane core node. In the architecture of FIG. 11D, a user plane for an eLTE eNB (e.g., the eLTE eNB 1102D) may be connected directly to a user plane core node (e.g., the NGC 1101D) via an NG-U interface between the eLTE eNB and the user plane core node.

A master base station may be an eLTE eNB 1102E or an eLTE eNB 1102F, which may be connected to NGC nodes 1101E or 1101F, respectively. This connection to NGC nodes may be, for example, to a control plane core node via the NG-C interface and/or to a user plane core node via the NG-U interface. A secondary base station may be a gNB 1103E or a gNB 1103F, either or both of which may be a non-standalone node having a control plane connection via an Xn-C interface to an eLTE eNB (e.g., the eLTE eNB 1102E or the eLTE eNB 1102F). In the tight interworking architecture of FIG. 11E, a user plane for a gNB (e.g., the gNB 1103E) may be connected to a user plane core node (e.g., the NGC 1101E) through an eLTE eNB (e.g., the eLTE eNB 1102E), via an Xn-U interface between the eLTE eNB and the gNB, and via an NG-U interface between the eLTE eNB and the user plane core node. In the architecture of FIG. 11F, a user plane for a gNB (e.g., the gNB 1103F) may be connected directly to a user plane core node (e.g., the NGC 1101F) via an NG-U interface between the gNB and the user plane core node.

FIG. 12A, FIG. 12B, and FIG. 12C are examples for radio protocol structures of tight interworking bearers.

An LTE eNB 1201A may be an S1 master base station, and a gNB 1210A may be an S1 secondary base station. An example for a radio protocol architecture for a split bearer and an SCG bearer is shown. The LTE eNB 1201A may be connected to an EPC with a non-standalone gNB 1210A, via an Xx interface between the PDCP 1206A and an NR RLC 1212A. The LTE eNB 1201A may include protocol layers MAC 1202A, RLC 1203A and RLC 1204A, and PDCP 1205A and PDCP 1206A. An MCG bearer type may interface with the PDCP 1205A, and a split bearer type may interface with the PDCP 1206A. The gNB 1210A may include protocol layers NR MAC 1211A, NR RLC 1212A and NR RLC 1213A, and NR PDCP 1214A. An SCG bearer type may interface with the NR PDCP 1214A.

A gNB 1201B may be an NG master base station, and an eLTE eNB 1210B may be an NG secondary base station. An example for a radio protocol architecture for a split bearer and an SCG bearer is shown. The gNB 1201B may be connected to an NGC with a non-standalone eLTE eNB 1210B, via an Xn interface between the NR PDCP 1206B and an RLC 1212B. The gNB 1201B may include protocol layers NR MAC 1202B, NR RLC 1203B and NR RLC 1204B, and NR PDCP 1205B and NR PDCP 1206B. An MCG bearer type may interface with the NR PDCP 1205B, and a split bearer type may interface with the NR PDCP 1206B. The eLTE eNB 1210B may include protocol layers MAC 1211B, RLC 1212B and RLC 1213B, and PDCP 1214B. An SCG bearer type may interface with the PDCP 1214B.

An eLTE eNB 1201C may be an NG master base station, and a gNB 1210C may be an NG secondary base station. An example for a radio protocol architecture for a split bearer and an SCG bearer is shown. The eLTE eNB 1201C may be connected to an NGC with a non-standalone gNB 1210C, via an Xn interface between the PDCP 1206C and an NR RLC 1212C. The eLTE eNB 1201C may include protocol layers MAC 1202C, RLC 1203C and RLC 1204C, and PDCP 1205C and PDCP 1206C. An MCG bearer type may interface with the PDCP 1205C, and a split bearer type may interface with the PDCP 1206C. The gNB 1210C may include protocol layers NR MAC 1211C, NR RLC 1212C and NR RLC 1213C, and NR PDCP 1214C. An SCG bearer type may interface with the NR PDCP 1214C.

In a 5G network, the radio protocol architecture that a particular bearer uses may depend on how the bearer is setup. At least three alternatives may exist, for example, an MCG bearer, an SCG bearer, and a split bearer, such as shown in FIG. 12A, FIG. 12B, and FIG. 12C. The NR RRC may be located in a master base station, and the SRBs may be configured as an MCG bearer type and may use the radio resources of the master base station. Tight interworking may have at least one bearer configured to use radio resources provided by the secondary base station. Tight interworking may or may not be configured or implemented.

The wireless device may be configured with two MAC entities: e.g., one MAC entity for a master base station, and one MAC entity for a secondary base station. In tight interworking, the configured set of serving cells for a wireless device may comprise of two subsets: e.g., the Master Cell Group (MCG) including the serving cells of the master base station, and the Secondary Cell Group (SCG) including the serving cells of the secondary base station.

At least one cell in a SCG may have a configured UL CC and one of them, for example, a PSCell (or the PCell of the SCG, which may also be called a PCell), is configured with PUCCH resources. If the SCG is configured, there may be at least one SCG bearer or one split bearer. If one or more of a physical layer problem or a random access problem is detected on a PSCell, if the maximum number of (NR) RLC retransmissions associated with the SCG has been reached, and/or if an access problem on a PSCell during an SCG addition or during an SCG change is detected, then: an RRC connection re-establishment procedure may not be triggered, UL transmissions towards cells of the SCG may be stopped, a master base station may be informed by the wireless device of a SCG failure type, and/or for a split bearer the DL data transfer over the master base station may be maintained. The RLC AM bearer may be configured for the split bearer. Like the PCell, a PSCell may not be de-activated. A PSCell may be changed with an SCG change, for example, with security key change and a RACH procedure. A direct bearer type change, between a split bearer and an SCG bearer, may not be supported. Simultaneous configuration of an SCG and a split bearer may not be supported.

A master base station and a secondary base station may interact. The master base station may maintain the RRM measurement configuration of the wireless device. The master base station may determine to ask a secondary base station to provide additional resources (e.g., serving cells) for a wireless device. This determination may be based on, for example, received measurement reports, traffic conditions, and/or bearer types. If a request from the master base station is received, a secondary base station may create a container that may result in the configuration of additional serving cells for the wireless device, or the secondary base station may determine that it has no resource available to do so. The master base station may provide at least part of the AS configuration and the wireless device capabilities to the secondary base station, for example, for wireless device capability coordination. The master base station and the secondary base station may exchange information about a wireless device configuration such as by using RRC containers (e.g., inter-node messages) carried in Xn or Xx messages. The secondary base station may initiate a reconfiguration of its existing serving cells (e.g., PUCCH towards the secondary base station). The secondary base station may determine which cell is the PSCell within the SCG. The master base station may not change the content of the RRC configuration provided by the secondary base station. If an SCG is added and/or an SCG SCell is added, the master base station may provide the latest measurement results for the SCG cell(s). Either or both of a master base station and a secondary base station may know the SFN and subframe offset of each other by OAM, (e.g., for the purpose of DRX alignment and identification of a measurement gap). If a new SCG SCell is added, dedicated RRC signaling may be used for sending required system information of the cell, such as for CA, except, for example, for the SFN acquired from an MIB of the PSCell of an SCG.

FIG. 13A and FIG. 13B show examples for gNB deployment. A core 1301 and a core 1310 may interface with other nodes via RAN-CN interfaces. In a non-centralized deployment example, the full protocol stack (e.g., NR RRC, NR PDCP, NR RLC, NR MAC, and NR PHY) may be supported at one node, such as a gNB 1302, a gNB 1303, and/or an eLTE eNB or LTE eNB 1304. These nodes (e.g., the gNB 1302, the gNB 1303, and the eLTE eNB or LTE eNB 1304) may interface with one of more of each other via a respective inter-BS interface. In a centralized deployment example, upper layers of a gNB may be located in a Central Unit (CU) 1311, and lower layers of the gNB may be located in Distributed Units (DU) 1312, 1313, and 1314. The CU-DU interface (e.g., Fs interface) connecting CU 1311 and DUs 1312, 1312, and 1314 may be ideal or non-ideal. The Fs-C may provide a control plane connection over the Fs interface, and the Fs-U may provide a user plane connection over the Fs interface. In the centralized deployment, different functional split options between the CU 1311 and the DUs 1312, 1313, and 1314 may be possible by locating different protocol layers (e.g., RAN functions) in the CU 1311 and in the DU 1312, 1313, and 1314. The functional split may support flexibility to move the RAN functions between the CU 1311 and the DUs 1312, 1313, and 1314 depending on service requirements and/or network environments. The functional split option may change during operation (e.g., after the Fs interface setup procedure), or the functional split option may change only in the Fs setup procedure (e.g., the functional split option may be static during operation after Fs setup procedure).

Figure 14:
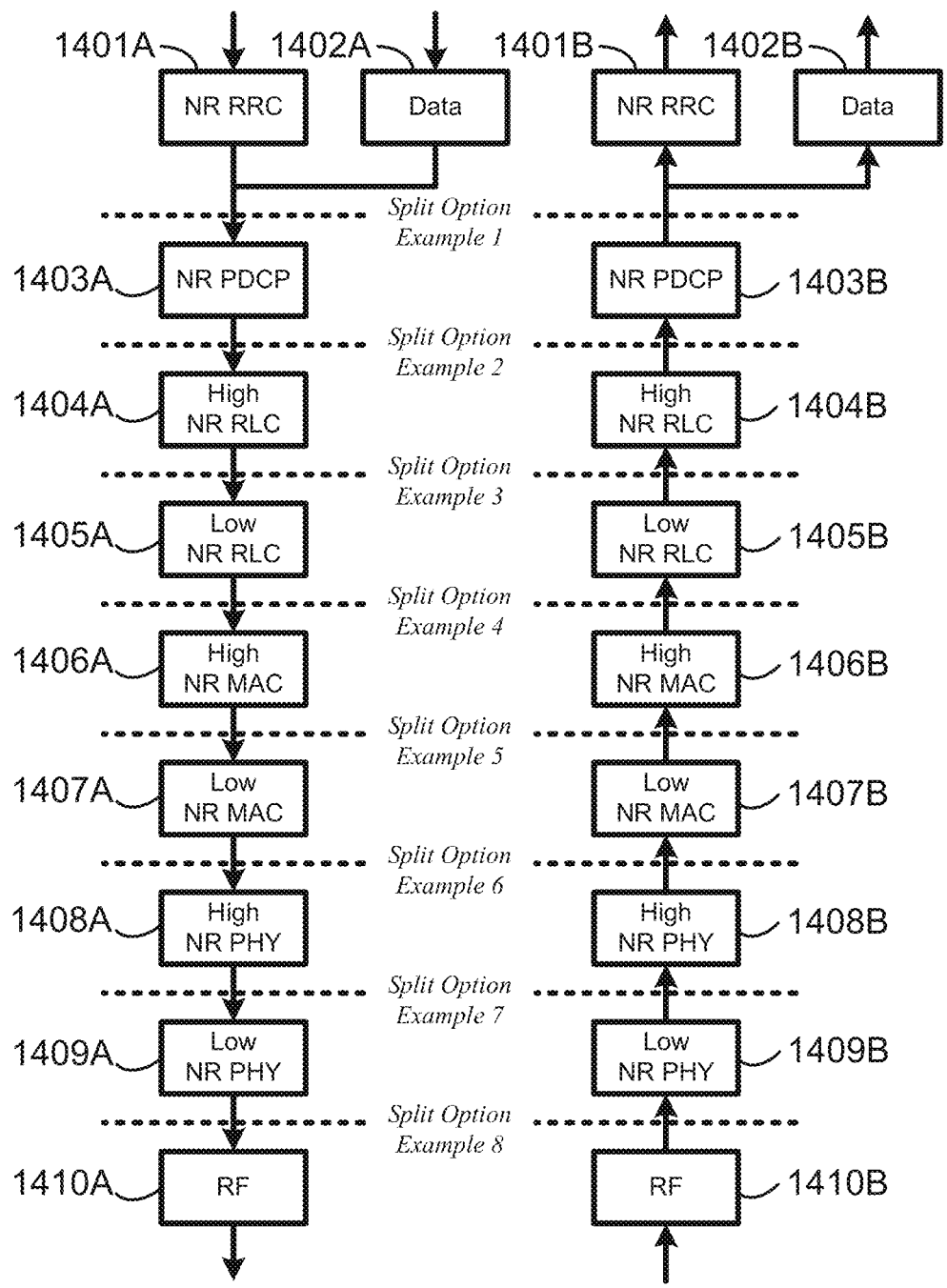
FIG. 14 shows functional split option examples of a centralized gNB deployment.

FIG. 14 shows examples for different functional split options of a centralized gNB deployment. Element numerals that are followed by "A" or "B" designations in FIG. 14 may represent the same elements in different traffic flows, for example, either receiving data (e.g., data 1402A) or sending data (e.g., 1402B). In the split option example 1, an NR RRC 1401 may be in a CU, and an NR PDCP 1403, an NR RLC (e.g., comprising a High NR RLC 1404 and/or a Low NR RLC 1405), an NR MAC (e.g., comprising a High NR MAC 1406 and/or a Low NR MAC 1407), an NR PHY (e.g., comprising a High NR PHY 1408 and/or a LOW NR PHY 1409), and an RF 1410 may be in a DU. In the split option example 2, the NR RRC 1401 and the NR PDCP 1403 may be in a CU, and the NR RLC, the NR MAC, the NR PHY, and the RF 1410 may be in a DU. In the split option example 3, the NR RRC 1401, the NR PDCP 1403, and a partial function of the NR RLC (e.g., the High NR RLC 1404) may be in a CU, and the other partial function of the NR RLC (e.g., the Low NR RLC 1405), the NR MAC, the NR PHY, and the RF 1410 may be in a DU. In the split option example 4, the NR RRC 1401, the NR PDCP 1403, and the NR RLC may be in a CU, and the NR MAC, the NR PHY, and the RF 1410 may be in a DU. In the split option example 5, the NR RRC 1401, the NR PDCP 1403, the NR RLC, and a partial function of the NR MAC (e.g., the High NR MAC 1406) may be in a CU, and the other partial function of the NR MAC (e.g., the Low NR MAC 1407), the NR PHY, and the RF 1410 may be in a DU. In the split option example 6, the NR RRC 1401, the NR PDCP 1403, the NR RLC, and the NR MAC may be in CU, and the NR PHY and the RF 1410 may be in a DU. In the split option example 7, the NR RRC 1401, the NR PDCP 1403, the NR RLC, the NR MAC, and a partial function of the NR PHY (e.g., the High NR PHY 1408) may be in a CU, and the other partial function of the NR PHY (e.g., the Low NR PHY 1409) and the RF 1410 may be in a DU. In the split option example 8, the NR RRC 1401, the NR PDCP 1403, the NR RLC, the NR MAC, and the NR PHY may be in a CU, and the RF 1410 may be in a DU.

The functional split may be configured per CU, per DU, per wireless device, per bearer, per slice, and/or with other granularities. In a per CU split, a CU may have a fixed split, and DUs may be configured to match the split option of the CU. In a per DU split, each DU may be configured with a different split, and a CU may provide different split options for different DUs. In a per wireless device split, a gNB (e.g., a CU and a DU) may provide different split options for different wireless devices. In a per bearer split, different split options may be utilized for different bearer types. In a per slice splice, different split options may be applied for different slices.

A new radio access network (new RAN) may support different network slices, which may allow differentiated treatment customized to support different service requirements with end to end scope. The new RAN may provide a differentiated handling of traffic for different network slices that may be pre-configured, and the new RAN may allow a single RAN node to support multiple slices. The new RAN may support selection of a RAN part for a given network slice, for example, by one or more slice ID(s) or NSSAI(s) provided by a wireless device or provided by an NGC (e.g., an NG CP). The slice ID(s) or NSSAI(s) may identify one or more of pre-configured network slices in a PLMN. For an initial attach, a wireless device may provide a slice ID and/or an NSSAI, and a RAN node (e.g., a gNB) may use the slice ID or the NSSAI for routing an initial NAS signaling to an NGC control plane function (e.g., an NG CP). If a wireless device does not provide any slice ID or NSSAI, a RAN node may send a NAS signaling to a default NGC control plane function. For subsequent accesses, the wireless device may provide a temporary ID for a slice identification, which may be assigned by the NGC control plane function, to enable a RAN node to route the NAS message to a relevant NGC control plane function. The new RAN may support resource isolation between slices. If the RAN resource isolation is implemented, shortage of shared resources in one slice does not cause a break in a service level agreement for another slice.

The amount of data traffic carried over networks is expected to increase for many years to come. The number of users and/or devices is increasing, and each user/device accesses an increasing number and variety of services, for example, video delivery, large files, and images. This requires not only high capacity in the network, but also provisioning very high data rates to meet customers' expectations on interactivity and responsiveness. More spectrum may be required for network operators to meet the increasing demand Considering user expectations of high data rates along with seamless mobility, it is beneficial that more spectrum be made available for deploying macro cells as well as small cells for communication systems.

Striving to meet the market demands, there has been increasing interest from operators in deploying some complementary access utilizing unlicensed spectrum to meet the traffic growth. This is exemplified by the large number of operator-deployed Wi-Fi networks and the 3GPP standardization of LTE/WLAN interworking solutions. This interest indicates that unlicensed spectrum, if present, may be an effective complement to licensed spectrum for network operators, for example, to help address the traffic explosion in some examples, such as hotspot areas. Licensed Assisted Access (LAA) offers an alternative for operators to make use of unlicensed spectrum, for example, if managing one radio network, offering new possibilities for optimizing the network's efficiency.

Listen-before-talk (clear channel assessment) may be implemented for transmission in an LAA cell. In a listen-before-talk (LBT) procedure, equipment may apply a clear channel assessment (CCA) check before using the channel.

For example, the CCA may utilize at least energy detection to determine the presence or absence of other signals on a channel to determine if a channel is occupied or clear, respectively. For example, European and Japanese regulations mandate the usage of LBT in the unlicensed bands. Apart from regulatory requirements, carrier sensing via LBT may be one way for fair sharing of the unlicensed spectrum.

Discontinuous transmission on an unlicensed carrier with limited maximum transmission duration may be enabled. Some of these functions may be supported by one or more signals to be transmitted from the beginning of a discontinuous LAA downlink transmission. Channel reservation may be enabled by the transmission of signals, by an LAA node, after gaining channel access, for example, via a successful LBT operation, so that other nodes that receive the transmitted signal with energy above a certain threshold sense the channel to be occupied. Functions that may need to be supported by one or more signals for LAA operation with discontinuous downlink transmission may include one or more of the following: detection of the LAA downlink transmission (including cell identification) by wireless devices, time synchronization of wireless devices, and frequency synchronization of wireless devices.

DL LAA design may employ subframe boundary alignment according to LTE-A carrier aggregation timing relationships across serving cells aggregated by CA. This may not indicate that the eNB transmissions may start only at the subframe boundary. LAA may support transmitting PDSCH if not all OFDM symbols are available for transmission in a subframe according to LBT. Delivery of necessary control information for the PDSCH may also be supported.

LBT procedures may be employed for fair and friendly coexistence of LAA with other operators and technologies operating in unlicensed spectrum. LBT procedures on a node attempting to transmit on a carrier in unlicensed spectrum may require the node to perform a clear channel assessment to determine if the channel is free for use. An LBT procedure may involve at least energy detection to determine if the channel is being used. For example, regulatory requirements in some regions, for example, in Europe, specify an energy detection threshold such that if a node receives energy greater than this threshold, the node assumes that the channel is not free. Nodes may follow such regulatory requirements. A node may optionally use a lower threshold for energy detection than that specified by regulatory requirements. LAA may employ a mechanism to adaptively change the energy detection threshold, for example, LAA may employ a mechanism to adaptively change (e.g., lower or increase) the energy detection threshold from an upper bound. Adaptation mechanism may not preclude static or semi-static setting of the threshold. A Category 4 LBT mechanism or other type of LBT mechanisms may be implemented.

Various example LBT mechanisms may be implemented. For some signals, in some implementation scenarios, in some situations, and/or in some frequencies, no LBT procedure may performed by the transmitting entity. Category 2 (e.g., LBT without random back-off) may be implemented. The duration of time that the channel is sensed to be idle before the transmitting entity transmits may be deterministic. Category 3 (e.g., LBT with random back-off with a contention window of fixed size) may be implemented. The LBT procedure may have the following procedure as one of its components. The transmitting entity may draw a random number N within a contention window. The size of the contention window may be specified by the minimum and maximum value of N. The size of the contention window may be fixed. The random number N may be employed in the LBT procedure to determine the duration of time that the channel is sensed to be idle, for example, before the transmitting entity transmits on the channel. Category 4 (e.g., LBT with random back-off with a contention window of variable size) may be implemented. The transmitting entity may draw a random number N within a contention window. The size of contention window may be specified by the minimum and maximum value of N. The transmitting entity may vary the size of the contention window if drawing the random number N. The random number N may be used in the LBT procedure to determine the duration of time that the channel is sensed to be idle, for example, before the transmitting entity transmits on the channel LAA may employ uplink LBT at the wireless device. The UL LBT scheme may be different from the DL LBT scheme, for example, by using different LBT mechanisms or parameters. These differences in schemes may be due to the LAA UL being based on scheduled access, which may affect a wireless device's channel contention opportunities. Other considerations motivating a different UL LBT scheme may include, but are not limited to, multiplexing of multiple wireless devices in a single subframe.

LAA may use uplink LBT at the wireless device. The UL LBT scheme may be different from the DL LBT scheme, for example, by using different LBT mechanisms or parameters. These differences in schemes may be due to the LAA UL being based on scheduled access, which may affect a wireless device's channel contention opportunities. Other considerations motivating a different UL LBT scheme may include, but are not limited to, multiplexing of multiple wireless devices in a single subframe.

A DL transmission burst may be a continuous transmission from a DL transmitting node, for example, with no transmission immediately before or after from the same node on the same CC. An UL transmission burst from a wireless device perspective may be a continuous transmission from a wireless device, for example, with no transmission immediately before or after from the same wireless device on the same CC. A UL transmission burst may be defined from a wireless device perspective or from a base station perspective. If a base station is operating DL and UL LAA over the same unlicensed carrier, DL transmission burst(s) and UL transmission burst(s) on LAA may be scheduled in a TDM manner over the same unlicensed carrier. An instant in time may be part of a DL transmission burst or part of an UL transmission burst.

One or more logical channels of a bearer may be used for sending original packets and/or duplicated packets, for example, if packet data convergence protocol (PDCP) packet duplication is configured for the bearer. Original packets and/or duplicated packets may be sent via various cells associated with the logical channels. A first group of cells may be used for sending original packets. A second group of cells may be used for sending duplicated packets. The first group of cells may be different from the second group of cells. If a particular group of cells (e.g., the first group of cells or the second group of cells) fails to deliver packets to a destination (e.g., a wireless device in downlink transmission, a base station in uplink transmission, etc.), another group of cells (e.g., the other of the first group of cells or the second group of cells that has not failed) may still be able to deliver the packets to the destination.

One or more parts of a base station or multiple base stations (e.g., a base station central unit (CU) and/or a base station distributed unit (DU)) may select the cells associated with the logical channels. For example, each of the base station CU and the base station DU may have information that may be used for selecting the cells. The base station CU may have higher layer information (e.g., radio resource control (RRC) information) associated with the cells, load status of the cells, overall channel quality status of the cells, and/or the like. The base station DU may have lower layer information associated with the cells.

Performance of packet duplication may be decreased, for example, if a base station DU configures cells without knowing information from a base station CU. Performance of wireless communications may be decreased, for example, if a base station CU and a base station DU does not have a process to share cell configuration (e.g., determination or selection) information for duplicated PDCP packets (e.g., second logical channel) and/or original PDCP packets (e.g., first logical channel) of a bearer. A process to share cell configuration information for duplicated packets and/or original PDCP packets may comprise, for example, sharing a result of selecting first cells for a first logical channel of the bearer and selecting second cells for a second logical channel for duplications of PDCP packets of the first logical channel and/or the bearer.

A base station CU and/or a base station DU, for example, may share its information associated with cell configuration with its counterpart, which may help avoid and/or alleviate the above and/or other issues. A base station DU may select first cells for a first logical channel (e.g., for original PDCP packets) and second cells for a second logical channel (e.g., for duplicated PDCP packets) based on PDCP duplication information. The PDCP duplication information may be received from a base station CU (e.g., Duplication Indication IE, which may be indicated by a true/false indication). The base station DU may send (e.g., transmit) the selection information to the base station CU. A base station CU may select first cells for a first logical channel (e.g., for original PDCP packets) and second cells for a second logical channel (e.g., for duplicated PDCP packets). The base station CU may send (e.g., transmit) the selection information to the base station DU. Example processes may be described herein as being performed by a base station CU and/or a base station DU, but the example processes may additionally or alternatively be performed by any two parts of a base station or multiple base stations.

A base station CU (e.g., gNB-CU), for example, may send (e.g., transmit), to a base station DU (e.g., gNB-DU), PDCP duplication information for a bearer of a wireless device. The base station DU and/or the base station CU may configure a first logical channel and/or a second logical channel for PDCP duplication of the bearer. The second logical channel may be used to send (e.g., transmit) duplications of PDCP packets of the first logical channel (e.g., PDCP duplication packets of the bearer). The base station DU may determine one or more first cells for the first logical channel and/or one or more second cells for the second logical channel. The base station DU may send (e.g., transmit), to the base station CU, the determined cell information for the first logical channel and for the second logical channel. The base station CU may determine one or more first cells for the first logical channel and one or more second cells for the second logical channel. The base station CU may send (e.g., transmit), to the base station DU, the determined cell information for the first logical channel and for the second logical channel. The base station CU may further send the determined cell information to the wireless device via an RRC message. The base station CU may send (e.g., transmit) the RRC message to the wireless device via the base station DU. The base station DU may not send duplicated PDCP packets (e.g., packets of the second logical channel) via cells for original PDCP packets. The second logical channel for duplicated PDCP packets may use first cells different from second cells used by the first logical channel for original PDCP packets.

A base station (e.g., gNB, eNB, and/or the like) may comprise one or more parts. For example, a base station may comprise a base station CU (e.g., gNB-CU) and one or more base station DUs (e.g., gNB-DU). Example processes may be described herein as being performed by a base station CU and/or a base station DU, but the example processes may additionally or alternatively be performed by any two parts of a base station or multiple base stations. The base station CU may provide functionalities of a PDCP layer and/or an SDAP layer for wireless devices. A base station DU of the one or more base station DUs may provide functionalities of an RLC layer, a MAC layer, and/or a PHY layer (e.g., for wireless devices). The base station CU may implement one or more upper layers among a PDCP layer, an SDAP layer, an RLC layer, a MAC layer, and/or a PHY layer. The base station DU may implement one or more lower layers among a PDCP layer, an SDAP layer, an RLC layer, a MAC layer, and/or a PHY layer. The base station CU may be connected to, and/or in communication with, the one or more base station DUs, for example, via one or more F1 interfaces. The base station CU may communicate with the base station DU via an F1 interface.

The base station (e.g., the base station CU) may configure a first bearer for a wireless device. The base station CU may send a first message, such as an F1 message. The first message may comprise one or more of: a wireless device (e.g., UE) context setup request message, a wireless device (e.g., UE) context modification request message, a wireless device (e.g., UE) context modification confirm message, and/or the like. The first message may indicate a request to setup the first bearer for the wireless device. The first message (e.g., an F1 message) may comprise one or more of: an identifier of the wireless device (e.g., wireless device identifier such as a UE ID, a gNB-CU UE F1AP ID, a gNB-DU UE F1AP ID, etc.); a TMSI, a GUTI, an IMSI, a C-RNTI, and/or the like; an identifier of the first bearer, a first uplink GTP tunnel endpoint identifier (e.g., UL TEID) of a first uplink GTP tunnel for the first bearer, one or more bearer identifiers of one or more bearers requested to be setup, and/or one or more logical channels of the first bearer. The first message may comprise RRC information (e.g., CU to DU RRC Information). The first message may comprise cell group information (E.g., CG-ConfigInfo). The one or more bearers requested to be setup may comprise one or more of a signaling radio bearer (SRB) and/or a data radio bearer (DRB).

The base station DU, for example, may setup the first bearer for the wireless device (e.g., allocate radio resources for the first bearer, setup PHY/MAC/RLC configuration parameters for the first bearer, and/or the like), for example, after or in response to receiving the first message. The base station DU may send a response message (e.g., an F1 response message) to the base station CU, for example, after or in response to receiving the first message (e.g., the F1 message). The response message may comprise one or more of a list of bearers setup (e.g., which may comprise the first bearer), a list of bearers failed to be setup, an identifier of the wireless device, and/or the like.

The base station CU, for example, may determine to initiate PDCP duplication for the first bearer of the wireless device. The first bearer may comprise an SRB and/or a DRB. The base station CU may initiate PDCP duplication for the first bearer, for example, to increase transmission reliability such as by creating a diversity gain of multiple packet transmission paths for packets (e.g., a first path for original packets and a second path for duplicated packets). The first bearer may be used for ultra reliable low latency (URLLC) and/or other services (e.g., high priority services).

An additional RLC entity and/or an additional logical channel may be added to a radio bearer to handle duplicated PDCP PDUs, for example, if duplication is configured for the radio bearer by RRC. PDCP duplication may comprise sending the same PDCP PDUs at least twice (e.g., a first time via the original RLC entity and a second time via the additional RLC entity). By using two independent transmission paths, packet duplication may increase reliability and/or may reduce latency. PDCP duplication may be beneficial for URLLC and/or other services (e.g., high priority services). Original PDCP PDUs and corresponding duplicates may not be sent via the same carrier. At least two different logical channels may use a same MAC entity (e.g., if carrier aggregation (CA) is implemented) and/or different MAC entities (e.g., if dual connectivity (DC) is implemented). Logical channel mapping restrictions may be used in MAC, for example, may help avoid the logical channel carrying the original PDCP PDUs and/or the logical channel carrying the corresponding duplicates using the same carrier (e.g., if the two logical channels use the same MAC entity).

PDCP packet duplication may be activated and/or deactivated for a DRB based on a MAC control element (MAC CE), for example, if PDCP packet duplication is configured. The logical channel mapping restrictions may be lifted, for example, if PDCP packet duplication is deactivated (e.g., in CA). Additionally or alternatively, the wireless device may use the MAC CE commands regardless of their origin (e.g., MCG or SCG), for example, if DC is implemented.

The base station DU, for example, may receive, from the base station CU, a first message comprising bearer configuration parameters at least for the first bearer for the wireless device. The first message may comprise an F1 message indicating a request to setup the first bearer. The first message may comprise a message indicating a request to modify the first bearer, for example, if the first bearer is setup by the base station DU before the first message. The first message may comprise one or more of: a wireless device (e.g., UE) context setup request message, a wireless device (e.g., UE) context modification request message, a wireless device (e.g., UE) context modification confirm message, and/or the like. The first message may comprise one or more of an identifier of the wireless device (e.g., UE identifier, gNB-CU UE F1AP ID, gNB-DU UE F1AP ID, TMSI, GUTI, IMSI, C-RNTI, and/or the like), a first bearer identifier of the first bearer, one or more uplink GTP tunnel endpoint identifiers (e.g., UL TEIDs) of one or more uplink GTP tunnels for the first bearer and/or one or more logical channels of the first bearer, one or more bearer identifiers of one or more bearers requested to be setup, one or more bearer identifiers of one or more bearers requested to be modified, and/or the like. The one or more bearers requested to be setup/modified may comprise one or more of an SRB and/or a DRB. The bearer configuration parameters may be included in a CU To DU RRC Information IE, in an SRB Setup List IE, and/or in a DRB Setup List IE of the first message. The CU To DU RRC Information IE may further comprise RRC parameters determined by the base station CU for the wireless device and/or provided by the wireless device.

The bearer configuration parameters may comprise one or more of: an identifier of the wireless device, a first bearer identifier of the first bearer, a PDCP duplication information for the first bearer, and/or the like. The PDCP duplication information may comprise one or more of: a logical channel information element (IE), a PDCP duplication indication IE, and/or the like. The one or more logical channel IE may comprise a first logical channel identifier of the first logical channel of the first bearer and/or a second logical channel identifier of the second logical channel configured to send duplicates of PDCP packets (e.g., PDCP PDUs) of the first logical channel (and/or the first bearer). For PDCP duplication of three or more times, the one or more logical channel IE may comprise three or more logical channel identifiers. The PDCP duplication indication IE may indicate that PDCP packets of the first bearer are duplicated (e.g., a true or false indication). The base station DU, for example, may determine logical channel identifiers for the first logical channel and/or the second logical channel, for example, if the first logical channel identifier and/or the second logical channel identifier is not indicated in the first message.

The first message may comprise a first (e.g., uplink GTP) tunnel endpoint identifier (e.g., first UL TEID) of the first (e.g., uplink GTP) tunnel for the first logical channel of the first bearer and/or a second (e.g., uplink GTP) tunnel endpoint identifier (e.g., second UL TEID) of the second (e.g., uplink GTP) tunnel for the second logical channel of the first bearer. The second logical channel may comprise a logical channel to send duplicates of PDCP packets (e.g., PDCP PDUs) of the first logical channel (and/or the first bearer). The first message may further comprise at least one of a first IE indicating that the first logical channel is a default logical channel of the first bearer and/or a second IE indicating that the second logical channel is for duplicated PDCP packets of the first bearer (and/or of the first logical channel).

The first message (e.g., the bearer configuration parameter) may comprise cell configuration parameters for the first logical channel and/or for the second logical channel. The first message (e.g., the bearer configuration parameter, and/or the cell configuration parameters for the first logical channel and/or for the second logical channel) may comprise at least one first cell identifier (e.g., a global cell identifier (e.g., NCGI, ECGI, CGI, and/or the like), a physical cell identifier (e.g., PCI), and/or the like) of at least one first cell used for the first logical channel of the first bearer and/or at least one second cell identifier (e.g., a global cell identifier (e.g., NCGI, ECGI, CGI, and/or the like), a physical cell identifier (e.g., PCI), and/or the like) of at least one second cell used for a second logical channel for duplications of PDCP packets of the first logical channel (and/or of the first bearer). The base station CU, for example, may determine (e.g., select and/or configure) the at least one first cell for the first logical channel and/or the at least one second cell for the second logical channel. The base station CU may determine the at least one first cell and/or the at least one second cell, for example, based on: a measurement report received from the wireless device (e.g., via one or more RRC messages), and/or one or more cell configuration parameters received from the base station DU (e.g., via one or more F1 messages).

The measurement report may comprise a reference signal received power (RSRP) and/or a reference signal received quality (RSRQ) of one or more cells of the base station DU. The one or more cell configuration parameters received from the base station DU may comprise at least one of power configuration parameters, beam configuration parameters, subframe scheduling parameters, control channel configuration parameters, one or more elements of system information blocks (e.g., system information block type 1 to 21), and/or the like for one or more cells of the base station DU.

The base station CU, for example, may determine (e.g., select and/or configure, which may be based on the measurement report of cells) the at least one first cell and/or the at least one second cell such that the first logical channel and the second logical channel have similar cell qualities. The base station CU may determine (e.g., select and/or configure, which may be based on the measurement report for cells) the at least one first cell and the at least one second cell such that the first logical channel has a better cell quality than the cell quality of the second logical channel. The base station CU may select, for duplicated packets, the at least one second cell from among secondary cells of the wireless device and/or among LAA cells. Each of the at least one second cell may be different from any of the at least one first cell.

The base station DU, for example, may determine (e.g., select and/or configure, which may be based on the bearer configuration parameters and/or the first message) at least one first cell to be used for the first logical channel of the first bearer and/or at least one second cell to be used for the second logical channel of the first bearer. The second logical channel may be for duplicated PDCP packets of the first bearer (and/or of the first logical channel). The base station DU may determine (e.g., select and/or configure, which may be based on the bearer configuration parameters (comprising the PDCP duplication information) and/or the cell configuration parameters of the first message) the at least one first cell and/or the at least one second cell, for example, if the first message comprises the cell configuration parameters for the first logical channel and/or for the second logical channel. The base station DU may determine (e.g., select and/or configure) the at least one first cell and/or the at least one second cell, such as indicated by the base station CU in the first message (e.g., as indicated by the cell configuration parameters), for example, if the first message comprises the cell configuration parameters for the first logical channel and/or for the second logical channel. The base station DU may determine (e.g., select and/or configure, which may be based on the bearer configuration parameters (comprising the PDCP duplication information without the cell configuration parameters) of the first message) the at least one first cell and/or the at least one second cell, for example, if the first message does not comprise the cell configuration parameters for the first logical channel and/or for the second logical channel.

The base station DU, for example, may determine (e.g., select and/or configure) the at least one first cell for the first logical channel and the at least one second cell for the second logical channel. The base station DU may determine the at least one first cell and/or the at least one second cell, for example, based on one or more of: a physical layer measurement report (e.g., CSI report, sounding reference signal, SRS measurement) that may be received from the wireless device (e.g., via an air interface), a RRC layer measurement report that may be received from the wireless device (e.g., via the base station CU), and/or one or more cell configuration parameters of the base station DU. The one or more RRC layer measurement report may comprise a reference signal received power (RSRP) and/or a reference signal received quality (RSRQ) of one or more cells of the base station DU. The one or more cell configuration parameters of the base station DU may comprise one or more of: a power configuration parameter, a beam configuration parameter, a subframe scheduling parameter, a control channel configuration parameter, an element of system information blocks (e.g., system information block type 1 to 21), and/or the like for one or more cells of the base station DU.

The base station DU, for example, may determine (e.g., select and/or configure, which may be based on the physical layer measurement report and/or the one or more RRC layer measurement report for cells) the at least one first cell and/or the at least one second cell such that the first logical channel and the second logical channel have similar cell qualities. The base station DU may determine (e.g., select and/or configure, which may be based on the physical layer measurement report and/or the one or more RRC layer measurement report for cells) the at least one first cell and/or the at least one second cell such that the first logical channel has better cell quality than the cell quality of the second logical channel. The base station DU may select the at least one second cell for duplicated packets among secondary cells of the wireless device and/or among LAA cells. Each of the at least one second cell may be different from any of the at least one first cell.

The base station DU, for example, may send, to the base station CU (e.g., via the F1 interface), a second message. The base station DU may send the second message, for example, after or in response to the first message. The second message may comprise, for example, a wireless device (e.g., UE) context setup response message, a wireless device (e.g., UE) context modification response message, a wireless device (e.g., UE) context modification required message, and/or the like. The second message may comprise radio resource configuration parameters for the wireless device. The second message may comprise cell group information (e.g., CellGroupConfig, PhysicalCellGroupConfig, etc.). The radio resource configuration parameters may comprise: at least one first cell identifier of the at least one first cell and for the first logical channel, and/or at least one second cell identifier of the at least one second cell and for the second logical channel The radio resource configuration parameters may be included in the second message, such as in a DU To CU RRC Information IE, in an SRB Setup List IE, and/or in a DRB Setup List IE of the second message. The DU To CU RRC Information IE may comprise RRC parameters that may be determined by the base station DU for the wireless device.

The second message may not comprise the at least one first cell identifier for the first logical channel and/or the at least one second cell identifier for the second logical channel, for example, if the base station CU determines the at least one first cells for the first logical channel and/or the at least one second cells for the second logical channel. The second message may indicate that the first bearer is setup for the wireless device (e.g., by indicating that the base station DU allocates radio resources for the first bearer, by setting up PHY/MAC/RLC configuration parameters for the first bearer, and/or the like). The second message may comprise at least one of a list of bearers setup (e.g., comprising the first bearer), a list of bearers failed to be setup, the wireless device identifier of the wireless device, and/or the like.

The base station DU, for example, may receive, from the base station CU, an RRC message (e.g., an RRC connection reconfiguration message) for the wireless device. The RRC message may comprise the radio resource configuration parameters. The base station DU may determine the radio resource configuration parameters comprising the at least one first cell identifier for the first logical channel and/or the at least one second cell identifier for the second logical channel, for example, if the second message does not comprise the at least one first cell identifier for the first logical channel and/or the at least one second cell identifier for the second logical channel. The base station DU may receive the RRC message, for example, via an F1 interface message (e.g., a DL RRC message transfer message). An RRC-Container IE of the DL RRC message transfer message may comprise the RRC message. The base station may send the RRC message to the wireless device. The base station DU may send the RRC message to the wireless device without interpretation (e.g., the base station DU may not decode the RRC message and/or one or more elements of the RRC message).

The base station DU, for example, may receive a response RRC message (e.g., an RRC connection reconfiguration complete message) from the wireless device, for example, after or in response to the RRC message. The base station DU may send (e.g., forward, transmit, etc.) the response RRC message to the base station CU, for example, via an F1 interface message (e.g., a UL RRC message transfer message).

The base station DU, for example, may receive, from the wireless device via the at least one first cell, first uplink transport blocks associated with the first logical channel. The base station DU may receive, from the wireless device via the at least one second cell, second uplink transport blocks associated with the second logical channel. The base station DU may send, to the wireless device via the at least one first cell, first downlink transport blocks associated with the first logical channel. The base station DU and may send, to the wireless device via the at least one second cell, second downlink transport blocks associated with the second logical channel.

Figure 15:
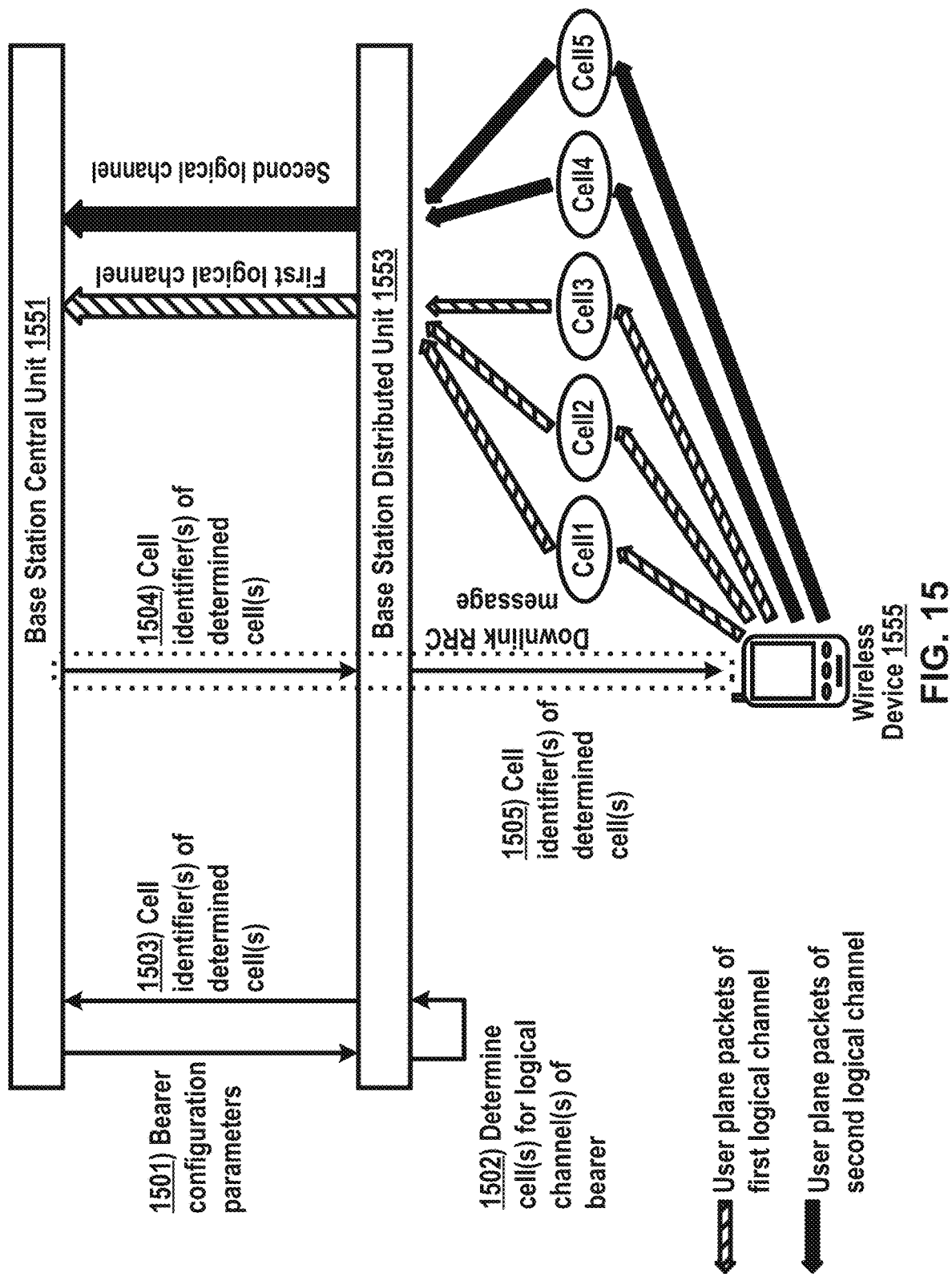
FIG. 15 shows an example for cell configuration associated with uplink transmissions.

FIG. 15 shows an example for cell configuration associated with uplink transmissions. In step 1501, a base station CU 1551 (e.g., a gNB-CU), for example, may send (e.g., transmit), to a base station DU 1553 (e.g., a gNB-DU), a first message. The first message may indicate, for example, bearer configuration parameters comprising PDCP duplication information of a first bearer for a wireless device 1555 (e.g., a UE). The base station DU 1553 may receive the first message. In step 1502, the base station DU 1553 may determine, for example, one or more cells (e.g., cell 1, cell 2, and/or cell 3) for a first logical channel of the first bearer and/or one or more cells (e.g., cell 4 and/or cell 5) for a second logical channel for duplications of PDCP packets of the first logical channel. The base station DU 1553 may determine the one or more cells for the first logical channel of the first bearer and/or the one or more cells for the second logical channel for duplications of PDCP packets of the first logical channel, for example, based on the first message. In step 1503, the base station DU 1553 may send, to the base station CU 1551, a second message. The second message may indicate the determined one or more cells for the first logical channel of the first bearer and/or the determined one or more cells for the second logical channel of the first bearer. The second message may indicate cell identifiers of cell 1, cell 2, and/or cell 3 for the first logical channel, and/or cell identifiers of cell 4 and/or cell 5 for the second logical channel. The base station CU 1551 may receive the second message.

In step 1504, the base station CU 1551, for example, may send, to the base station DU 1553, an RRC message. The RRC message may indicate, for example, cell identifiers of cell 1, cell 2, and/or cell 3 for the first logical channel, and/or cell identifiers of cell 4 and/or cell 5 for the second logical channel. The base station DU 1553 may receive the RRC message. In step 1505, the base station DU 1553 may send, to the wireless device 1555, the RRC message. The wireless device 1555 may receive the RRC message. The wireless device 1555 may, for example, configure the one or more cells for the first logical channel (e.g., cell 1, cell 2, and/or cell 3) and/or the one or more cells for the second logical channel (e.g., cell 4 and/or cell 5). The first logical channel, the second logical channel, and/or the cell(s) for the first logical channel and/or the second logical channel may be configured for uplink communications. The wireless device 1555 may send, to the base station DU 1553 via cell 1, cell 2, and/or cell 3, first transport blocks. The wireless device 1555 may send, to the base station DU 1553 via cell 4 and/or cell 5, second transport blocks (e.g., duplications of the first transport blocks).

Figure 16:
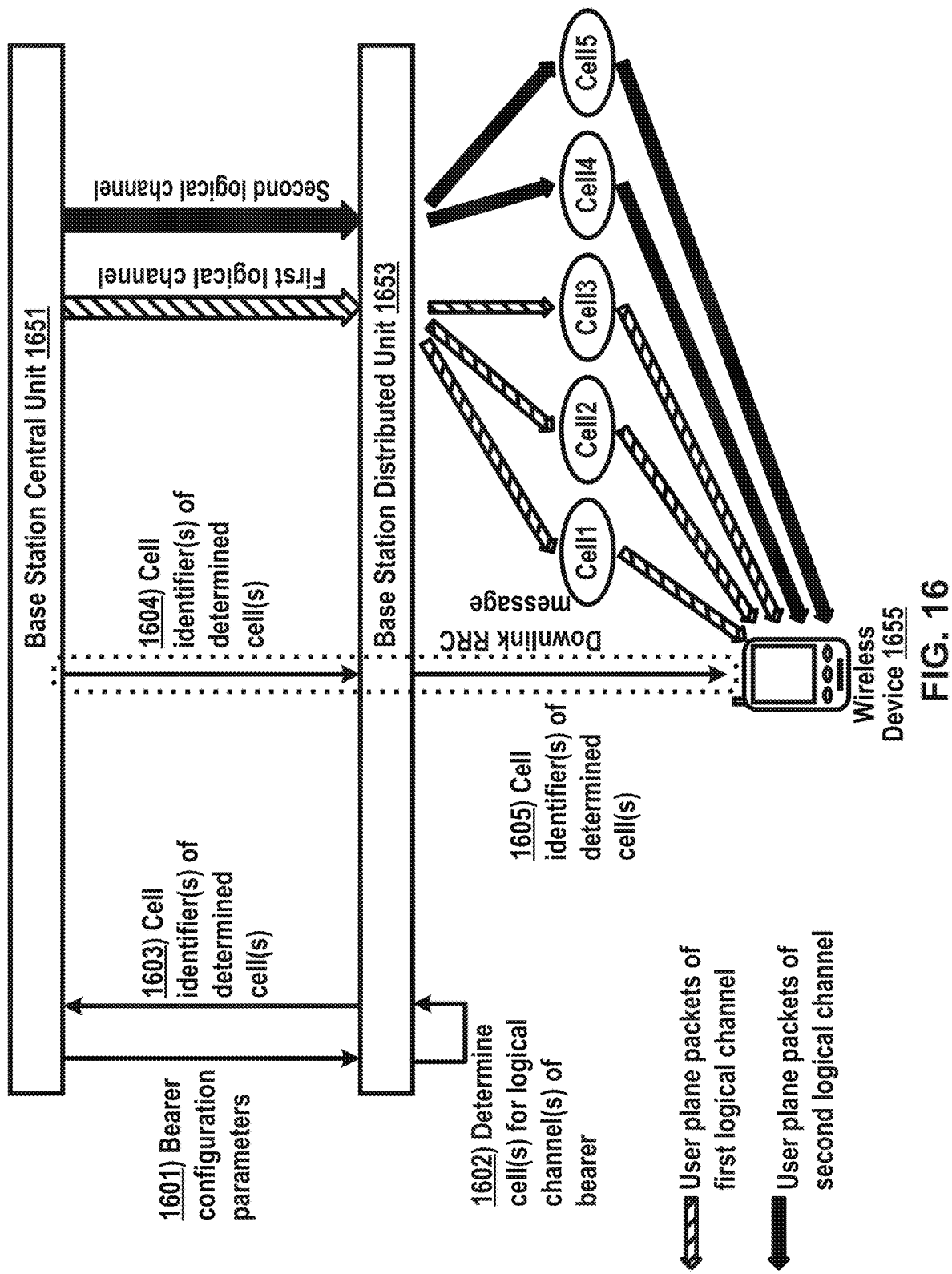
FIG. 16 shows an example for cell configuration associated with downlink transmissions.

FIG. 16 shows an example for cell configuration associated with downlink transmissions. The processes shown in FIG. 16 may be performed in a similar manner as the processes discussed in connection with FIG. 15. A first logical channel, a second logical channel, and/or cell(s) for the first logical channel and/or the second logical channel may be configured by a base station CU 1651, a base station DU 1653, and/or a wireless device 1655, and/or may be configured for downlink communications. The wireless device 1655 may receive, from the base station DU 1653 via cell 1, cell 2, and/or cell 3, first transport blocks. The wireless device 1655 may receive, from the base station DU 1653 via cell 4 and/or cell 5, second transport blocks (e.g., duplications of the first transport blocks).

Figure 17:
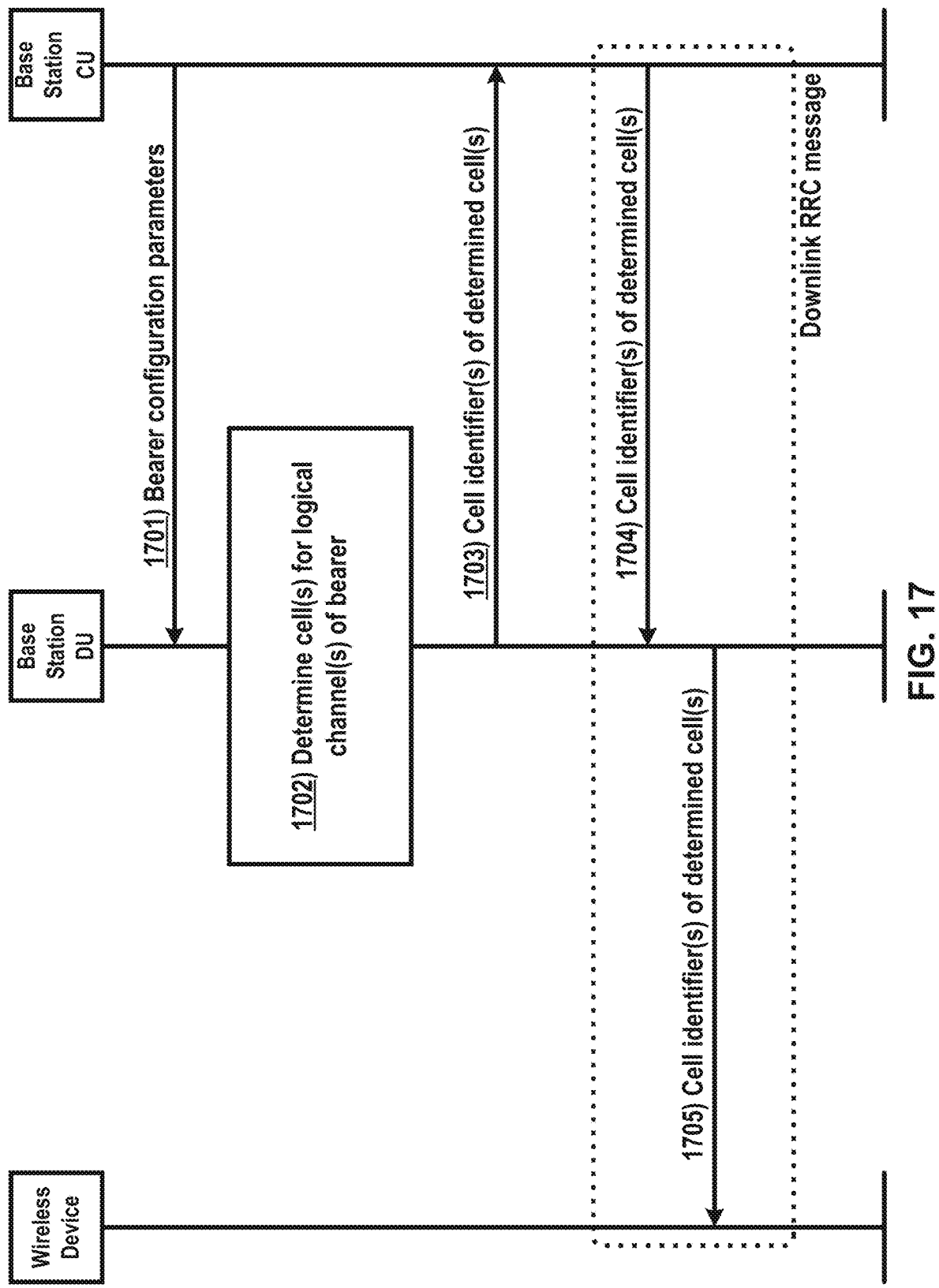
FIG. 17 is a diagram showing an example method for cell configuration.

FIG. 17 is a diagram showing an example method for cell configuration. The method may be performed, for example, by a wireless device (e.g., the wireless devices 1555, 1655), a base station DU (e.g., the base station DUs 1553, 1653), and/or a base station CU (e.g., the base station CUs 1551, 1651). In step 1701, the base station CU, for example, may send, to the base station DU, a first message. The first message may indicate, for example, bearer configuration parameters comprising PDCP duplication information of a first bearer for the wireless device. The base station DU may receive the first message. In step 1702, the base station DU may determine, for example, at least one first cell for a first logical channel and at least one second cell for a second logical channel for duplications of PDCP packets of the first logical channel. The base station DU may determine the at least one first cell for the first logical channel and the at least one second cell for the second logical channel for duplications of PDCP packets of the first logical channel, based on the first message. In step 1703, the base station DU may send, to the base station CU, a second message. The second message may indicate, for example, at least one first cell identifier of the at least one first cell for the first logical channel, and at least one second cell identifier of the at least one second cell for the second logical channel. The base station CU may receive the second message. In step 1704, the base station CU may send, to the base station DU, an RRC message. The RRC message may indicate, for example, the at least one first cell identifier for the first logical channel, and the at least one second cell identifier for the second logical channel. The base station DU may receive the RRC message. In step 1705, the base station DU may send, to the wireless device, the RRC message.

Figure 18:
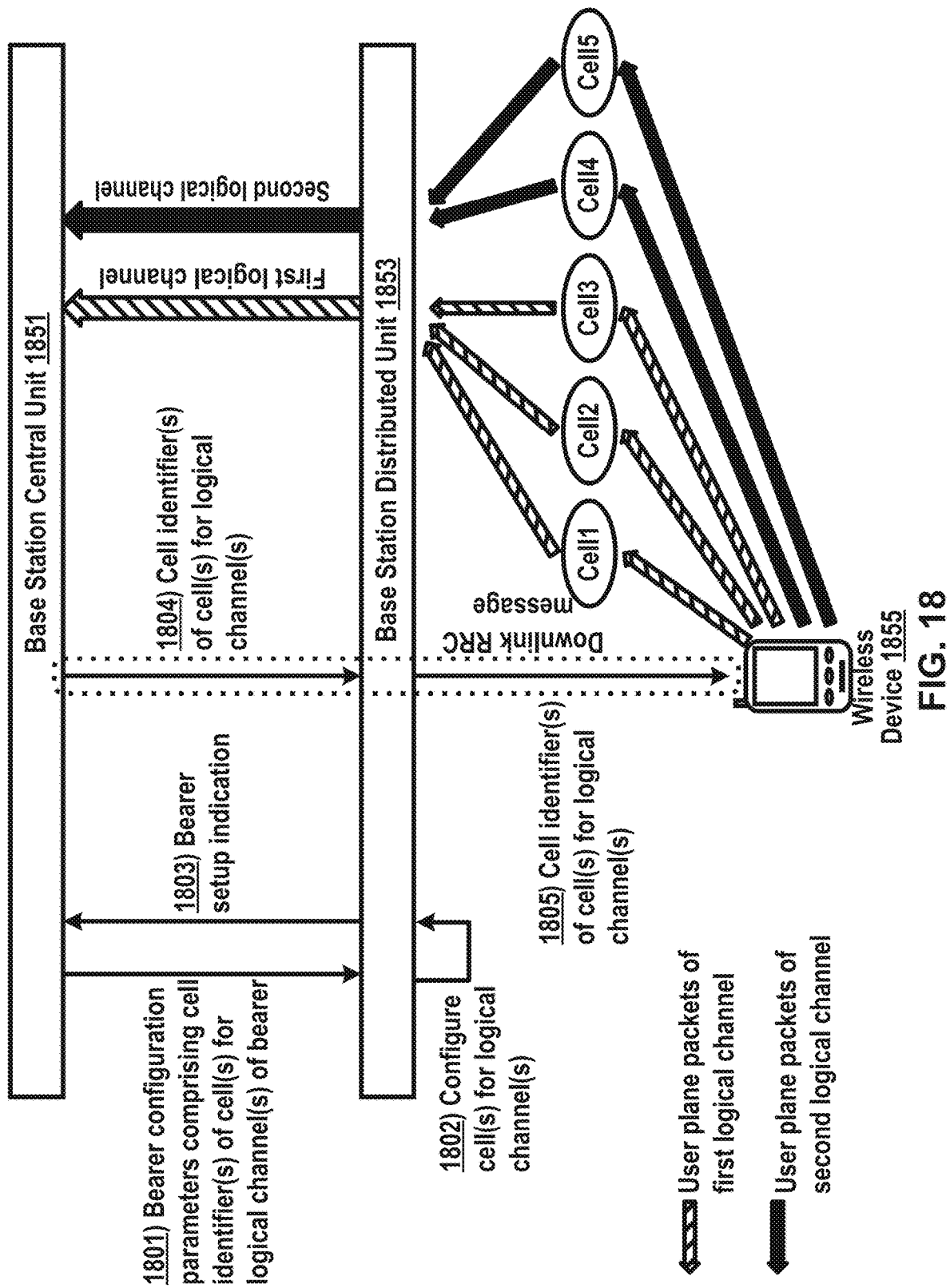
FIG. 18 shows another example for cell configuration associated with uplink transmissions.

FIG. 18 shows an example for cell configuration associated with uplink transmissions. In step 1801, a base station CU 1851 (e.g., a gNB-CU), for example, may send, to a base station DU 1853 (e.g., a gNB-DU), a first message. The first message may indicate, for example, bearer configuration parameters comprising cell identifier(s) of one or more cells (e.g., cell 1, cell 2, and/or cell 3) for a first logical channel of a first bearer for a wireless device 1855 (e.g., a UE), and cell identifier(s) of one or more cells (e.g., cell 4 and/or cell 5) for a second logical channel for duplications of PDCP packets of the first logical channel. The base station DU 1853 may receive the first message. In step 1802, the base station DU 1853 may configure the one or more cells for the first logical channel (e.g., cell 1, cell 2, and/or cell 3) and the one or more cells for the second logical channel (e.g., cell 4 and/or cell 5). The base station DU 1853 may configure the one or more cells for the first logical channel and the one or more cells for the second logical channel, for example, based on the first message. In step 1803, the base station DU 1853 may send, to the base station CU 1851, a second message. The second message may indicate, for example, that the first bearer (e.g., including the cell(s) for the logical channel(s) of the first bearer) is setup. The base station CU 1851 may receive the second message.

In step 1804, the base station CU 1851, for example, may send, to the base station DU 1853, an RRC message. The RRC message may indicate, for example, cell identifiers of cell 1, cell 2, and/or cell 3 for the first logical channel, and/or cell identifiers of cell 4 and/or cell 5 for the second logical channel. The base station DU 1853 may receive the RRC message. In step 1805, the base station DU 1853 may send, to the wireless device 1855, the RRC message. The wireless device 1855 may receive the RRC message. The wireless device 1855 may, for example, configure the one or more cells for the first logical channel (e.g., cell 1, cell 2, and/or cell 3) and/or the one or more cells for the second logical channel (e.g., cell 4 and/or cell 5). The first logical channel, the second logical channel, and/or the cell(s) for the first logical channel and/or the second logical channel may be configured for uplink communications. The wireless device 1855 may send, to the base station DU 1853 via cell 1, cell 2, and/or cell 3, first transport blocks. The wireless device 1855 may send, to the base station DU 1853 via cell 4 and/or cell 5, second transport blocks (e.g., duplications of the first transport blocks).

Figure 19:
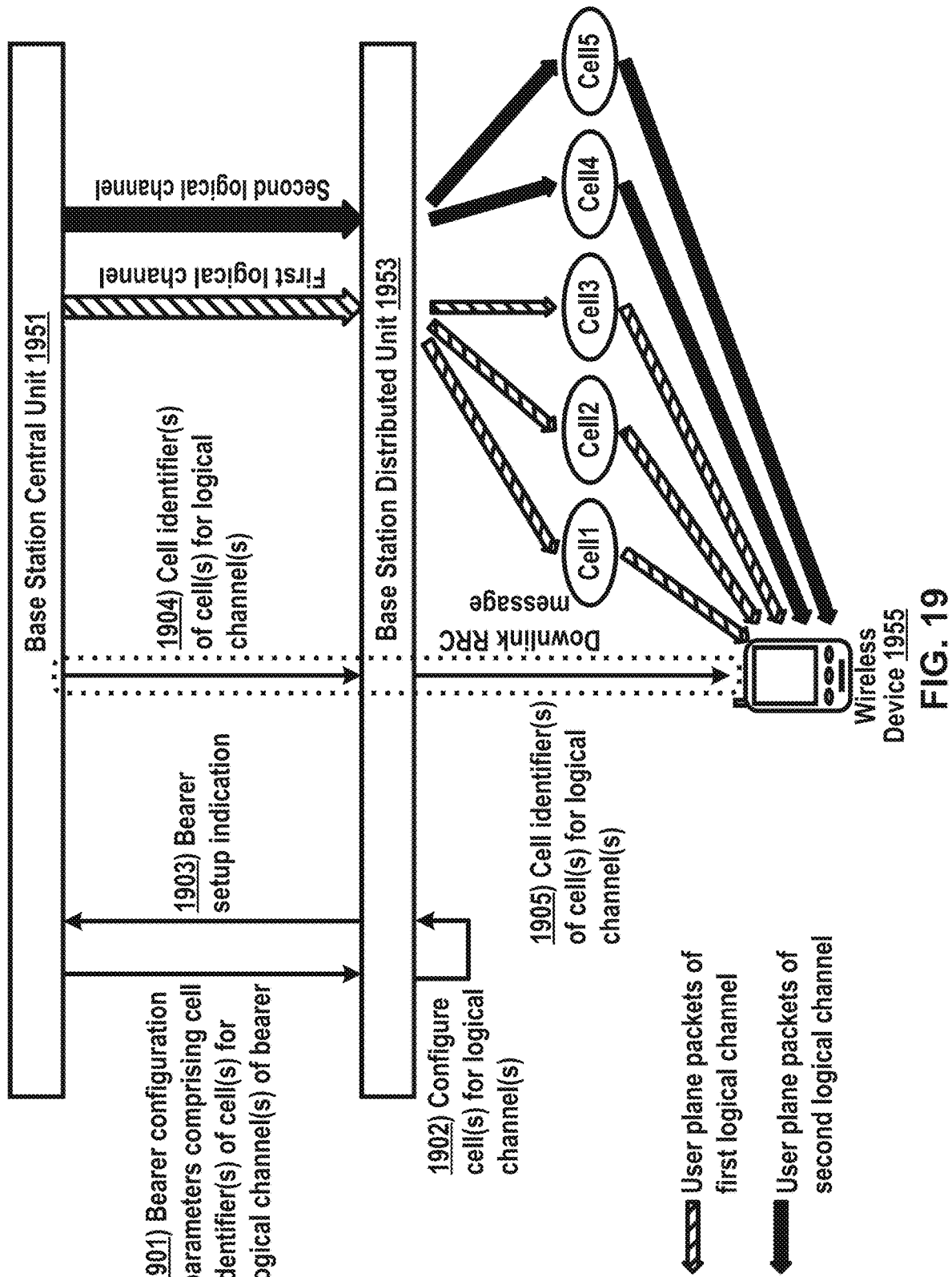
FIG. 19 shows another example for cell configuration associated with downlink transmissions.

FIG. 19 shows an example for cell configuration associated with downlink transmissions. The processes shown in FIG. 19 may be performed in a similar manner as the processes discussed in connection with FIG. 18. A first logical channel, a second logical channel, and/or cell(s) for the first logical channel and/or the second logical channel may be configured by a base station CU 1951, a base station DU 1953, and/or a wireless device 1955, and may be configured for downlink communications. The wireless device 1955 may receive, from the base station DU 1953 via cell 1, cell 2, and/or cell 3, first transport blocks. The wireless device 1955 may receive, from the base station DU 1953 via cell 4 and/or cell 5, second transport blocks (e.g., duplications of the first transport blocks).

Figure 20:
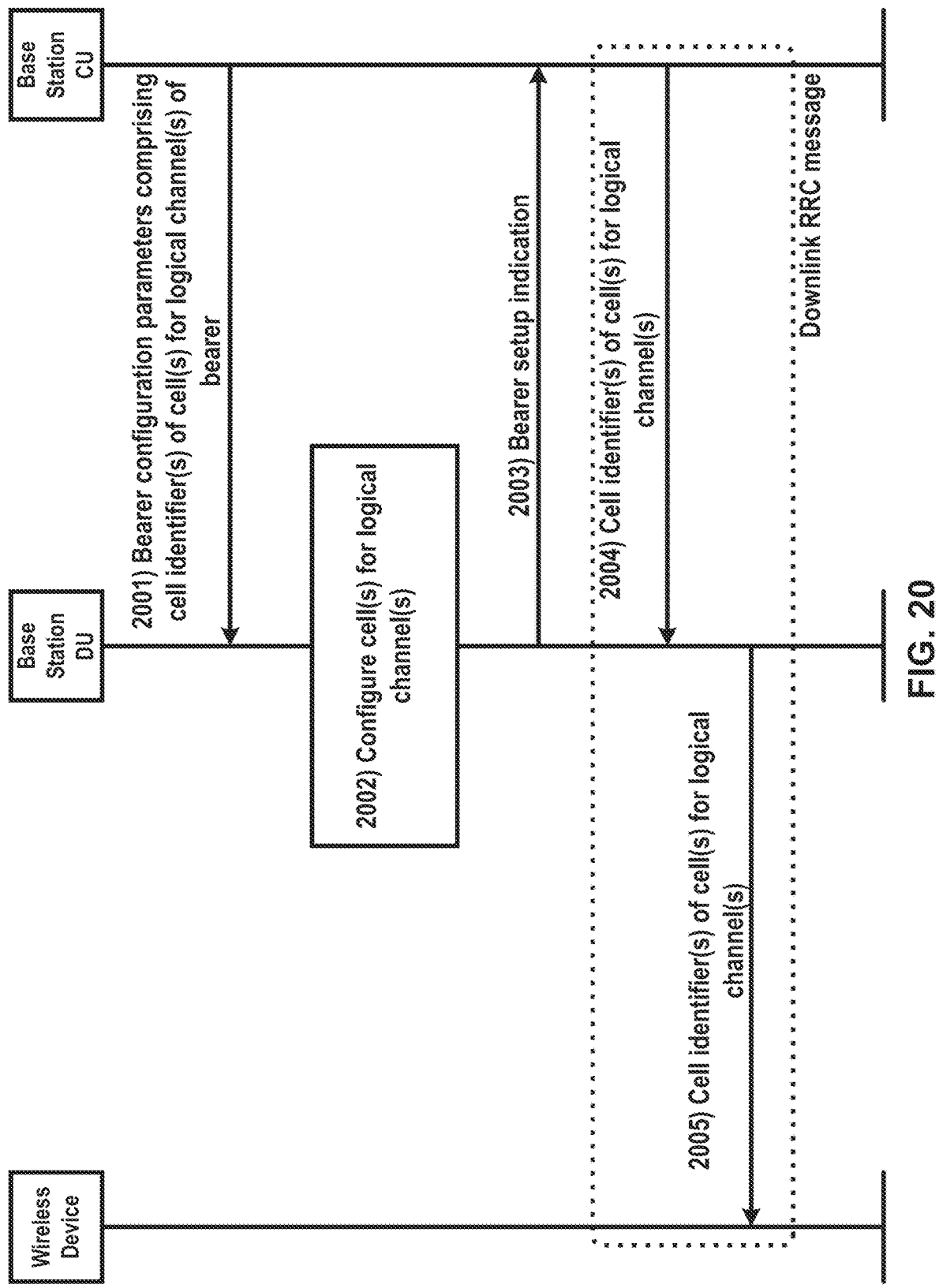
FIG. 20 is a diagram showing another example method for cell configuration.

FIG. 20 is a diagram showing an example method for cell configuration. The method may be performed, for example, by a wireless device (e.g., the wireless devices 1855, 1955), a base station DU (e.g., the base station DUs 1853, 1953), and/or a base station CU (e.g., the base station CUs 1851, 1951). In step 2001, the base station CU, for example, may send, to the base station DU, a first message. The first message may indicate, for example, bearer configuration parameters comprising at least one first cell identifier of at least one first cell for a first logical channel of a first bearer for the wireless device, and at least one second cell identifier of at least one second cell for a second logical channel for duplications of PDCP packets of the first logical channel. The base station DU may receive the first message. In step 2002, the base station DU may configure the at least one first cell for the first logical channel and the least one second cell for the second logical channel. The base station DU may configure the at least one first cell for the first logical channel and the least one second cell for the second logical channel, for example, based on the first message. In step 2003, the base station DU may send, to the base station CU, a second message. The second message may indicate, for example, that the first bearer (e.g., including the cell(s) for the logical channel(s) of the first bearer) is setup. The base station CU may receive the second message. In step 2004, the base station CU may send, to the base station DU, an RRC message. The RRC message may indicate, for example, the at least one first cell identifier for the first logical channel, and the at least one second cell identifier for the second logical channel. The base station DU may receive the RRC message. In step 2005, the base station DU may send, to the wireless device, the RRC message.

Figure 21:
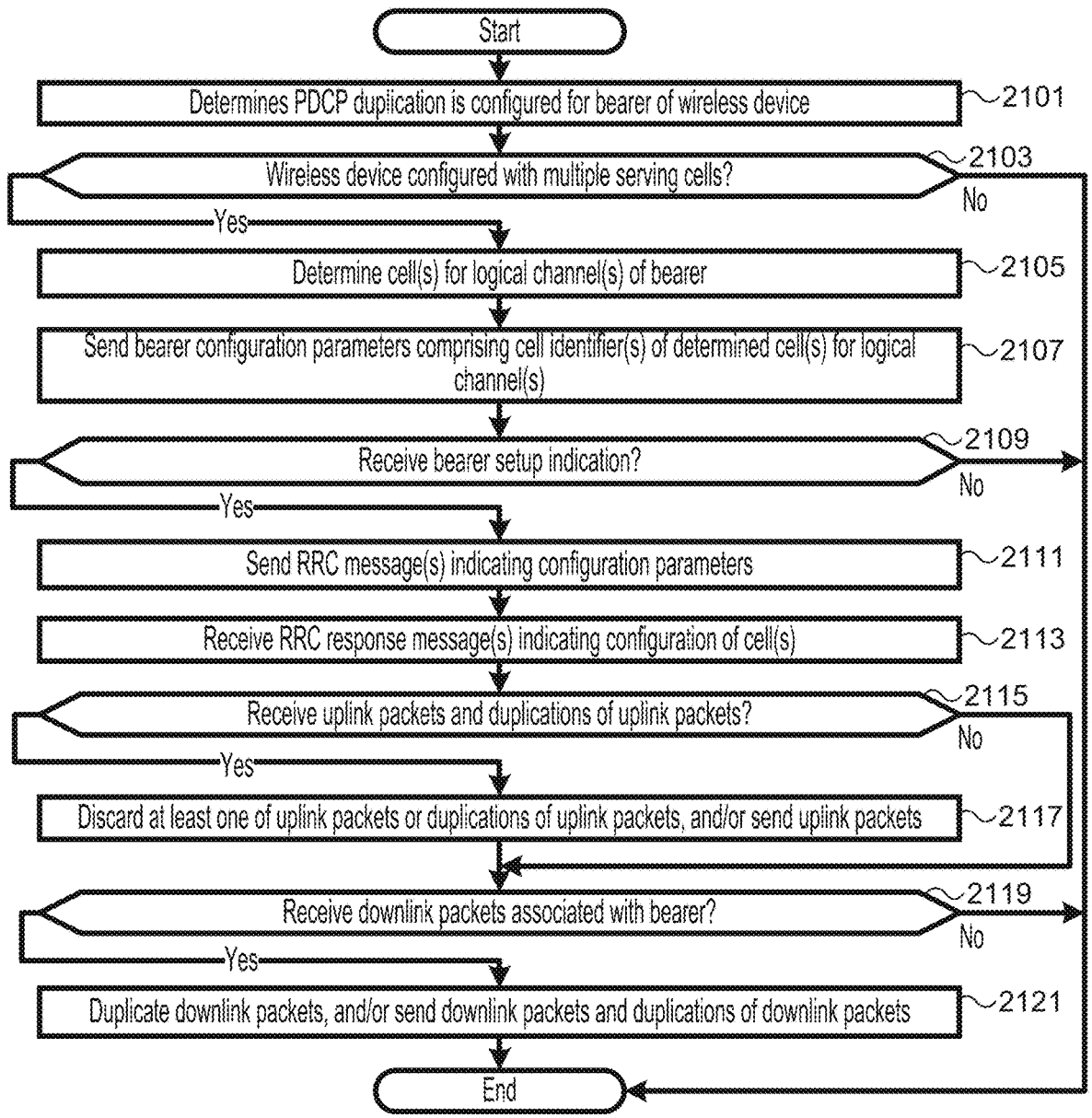
FIG. 21 shows an example method for cell configuration associated with a first part of a base station.

FIG. 21 shows an example method for cell configuration that may be performed, for example, by a base station CU. In step 2101, a base station CU may determine that PDCP duplication is configured for a bearer of a wireless device (e.g., a UE). The determination may be based on, for example, quality of service (QoS) requirements associated with the bearer, service types associated with the bearer, network slices associated with the bearer, downlink/uplink radio channel conditions associated with the bearer, and/or previous base station's configurations of the bearer. If a bearer is used for URLLC services and/or other services (e.g., high priority services), the base station CU may determine that PDCP duplication is configured for the bearer. In step 2103, the base station CU may determine whether the wireless device is configured with multiple serving cells (e.g., for carrier aggregation). If the base station CU determines that the wireless device is configured with multiple serving cells (step 2103: Yes), the method may proceed to step 2105. If the base station CU determines that the wireless device is not configured with multiple service cells (step 2103: No), the method may end.

In step 2105, the base station CU may determine cell(s) for logical channel(s) of the bearer. The base station CU may determine, for example, first cell(s) for a first logical channel of the bearer and second cell(s) for a second logical channel for duplications of packets of the first logical channel. The determination may be based on, for example, a measurement report received from the wireless device via one or more RRC messages. In step 2107, the base station CU may send, to a base station DU, bearer configuration parameters comprising cell identifier(s) of the cell(s), as determined in step 2105, for the logical channel(s) of the bearer. The bearer configuration parameters may comprise, for example, first cell identifier(s) (e.g., cell index) of the first cell(s) for the first logical channel, and second cell identifier(s) (e.g., cell index) of the second cell(s) for the second logical channel.

In step 2109, the base station CU may determine whether a bearer setup indication associated with the bearer is received from the base station DU. The bearer setup indication may indicate, for example, that the first cell(s) for the first logical channel and the second cell(s) for the second logical channel is configured by the base station DU. The bearer setup indication may additionally or alternatively indicate physical layer parameters associated with the configured cell(s) (e.g., the first cell(s) and/or the second cell(s)). If the base station CU determines that it has received a bearer setup indication associated with the bearer (step 2109: Yes), the method may proceed to step 2111. If the base station CU determines that it has not received a bearer setup indication associated with the bearer (step 2109: No), the method may end.

In step 2111, the base station CU may send, to the wireless device and via the base station DU, RRC message(s). The RRC message(s) may indicate, for example, configuration parameters comprising the first cell identifier(s) for the first logical channel and the second cell identifier(s) for the second logical channel. In step 2113, the base station CU may receive, from the wireless device, RRC response message(s) indicating that the cell(s) have been configured by the wireless device based on the configuration parameters (e.g., indicated in the RRC message(s)).

In step 2115, the base station CU may determine whether uplink packets associated with the wireless device are received from the base station DU (e.g., via the first logical channel) and/or whether duplications of the uplink packets associated with the wireless device are received from the base station DU (e.g., via the second logical channel). If the base station CU determines it has received the uplink packets and the duplications of the uplink packets (step 2115: Yes), the method may proceed to step 2117. If the base station CU determines it has not received the uplink packets and the duplications of the uplink packets (step 2115: No), the method may proceed to step 2119. In step 2117, the base station CU may discard at least one of the received uplink packets or the received corresponding duplications (e.g., in order to de-duplicate the received packets). The base station CU may send (e.g., forward, transmit, etc.), to a User Plane Function (UPF) (e.g., of a core network), the de-duplicated uplink packets associated with the wireless device.

In step 2119, the base station CU may determine whether downlink packets associated with the bearer are received from the UPF. If the base station CU determines that it has received the downlink packets from the UPF (step 2119: Yes), the method may proceed to step 2121. If the base station CU determines that it has not received the downlink packets from the UPF (step 2119: No), the method may end. In step 2121, the base station CU may duplicate the downlink packets associated with the bearer. The base station CU may, for example, send (e.g., forward, transmit, etc.), to the wireless device, via the base station DU, and via the first logical channel, the downlink packets. The base station CU may send (e.g., forward, transmit, etc.), to the wireless device, via the base station DU, and via the second logical channel, the duplications of the downlink packets.

Figure 22:
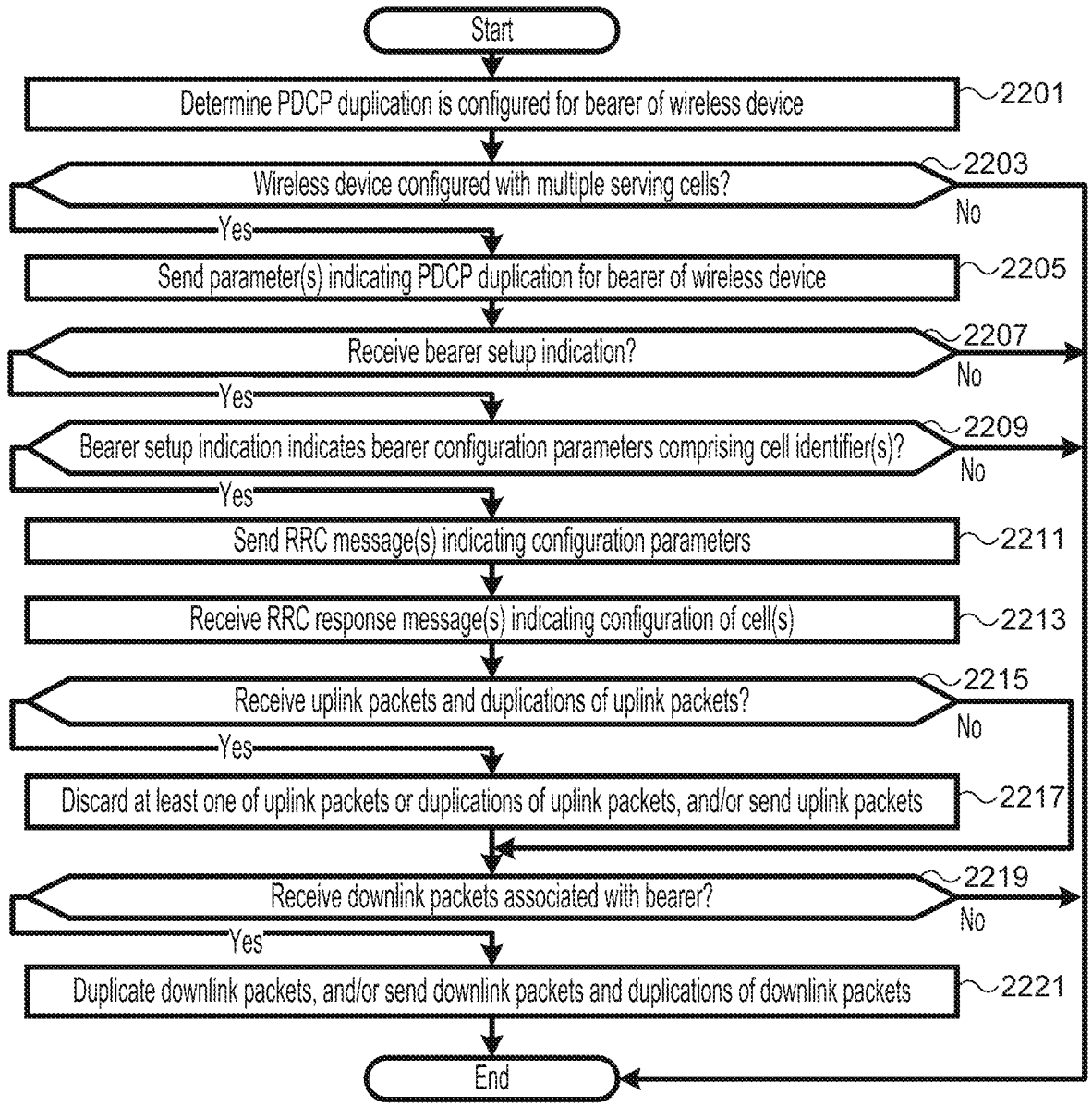
FIG. 22 shows another example method for cell configuration associated with a first part of a base station.

FIG. 22 shows an example method for cell configuration that may be performed, for example, by a base station CU. In step 2201, a base station CU may determine that PDCP duplication is configured for a bearer of a wireless device (e.g., a UE). The determination may be based on, for example, QoS requirements associated with the bearer, service types associated with the bearer, network slices associated with the bearer, downlink and/or uplink radio channel conditions associated with the bearer, and/or a previous base station's configurations of the bearer. If a bearer is used for URLLC services and/or other services (e.g., high priority services), the base station CU may determine that PDCP duplication is configured for the bearer. In step 2203, the base station CU may determine whether the wireless device is configured with multiple serving cells (e.g., carrier aggregation). If the base station CU determines that the wireless device is configured with multiple serving cells (step 2203: Yes), the method may proceed to step 2205. If the base station CU determines that the wireless device is not configured with multiple serving cells (step 2203: No), the method may end.

In step 2205, the base station CU may send, to a base station DU, parameter(s) indicating that PDCP duplication is configured for the bearer of the wireless device. In step 2207, the base station CU may determine whether a bearer setup indication associated with the bearer is received from the base station DU. The bearer setup indication may indicate, for example, that the bearer (e.g., including logical channel(s) and/or cell(s) associated with the bearer) is configured by the base station DU. If the base station CU determines that it has received the bearer setup indication (step 2207: Yes), the method may proceed to step 2209. If the base station CU determines that it has not received the bearer setup indication (step 2207: No), the method may end. In step 2209, the base station CU may determine whether the bearer setup indication indicates bearer configuration parameters associated with the bearer, such as first cell identifier(s) (e.g., cell index) of first cell(s) for a first logical channel of the bearer and second cell identifier(s) (e.g., cell index) of second cell(s) for a second logical channel for duplications of packets of the first logical channel. If the base station CU determines that the bearer setup indication indicates the bearer configuration parameters associated with the bearer (step 2209: Yes), the method may proceed to step 2211. If the base station CU determines that the bearer setup indication does not indicate the bearer configuration parameters associated with the bearer (step 2209: Yes), the method may end.

In step 2211, the base station CU may send, to the wireless device and via the base station DU, RRC message(s). The RRC message(s) may indicate, for example, configuration parameters comprising the first cell identifier(s) for the first logical channel, and the second cell identifier(s) for the second logical channel. In step 2213, the base station CU may receive, from the wireless device, RRC response message(s) indicating that the cell(s) have been configured by the wireless device based on the configuration parameters (e.g., indicated in the RRC message(s)).

In step 2215, the base station CU may determine whether uplink packets associated with the wireless device are received from the base station DU (e.g., via the first logical channel) and/or whether duplications of the uplink packets associated with the wireless device are received from the base station DU (e.g., via the second logical channel). If the base station CU determines that it has received the uplink packets and the duplications of the uplink packets (step 2215: Yes), the method may proceed to step 2217. If the base station CU determines that it has not received the uplink packets and the duplications of the uplink packets (step 2215: No), the method may proceed to step 2219. In step 2217, the base station CU may discard at least one of the received uplink packets or the received corresponding duplications (e.g., in order to de-duplicate the received packets). The base station CU may send (e.g., forward, transmit, etc.), to a UPF (e.g., of a core network), the de-duplicated uplink packets associated with the wireless device.

In step 2219, the base station CU may determine whether downlink packets associated with the bearer are received from the UPF. If the base station CU determines that it has received the downlink packets from the UPF (step 2219: Yes), the method may proceed to step 2221. If the base station CU determines that it has not received the downlink packets from the UPF (step 2219: No), the method may end. In step 2221, the base station CU may duplicate the downlink packets associated with the bearer. The base station CU may, for example, send (e.g., forward, transmit, etc.), to the wireless device, via the base station DU, and via the first logical channel, the downlink packets. The base station CU may send (e.g., forward, transmit, etc.), to the wireless device, via the base station DU, and via the second logical channel, the duplications of the downlink packets.

Figure 23:
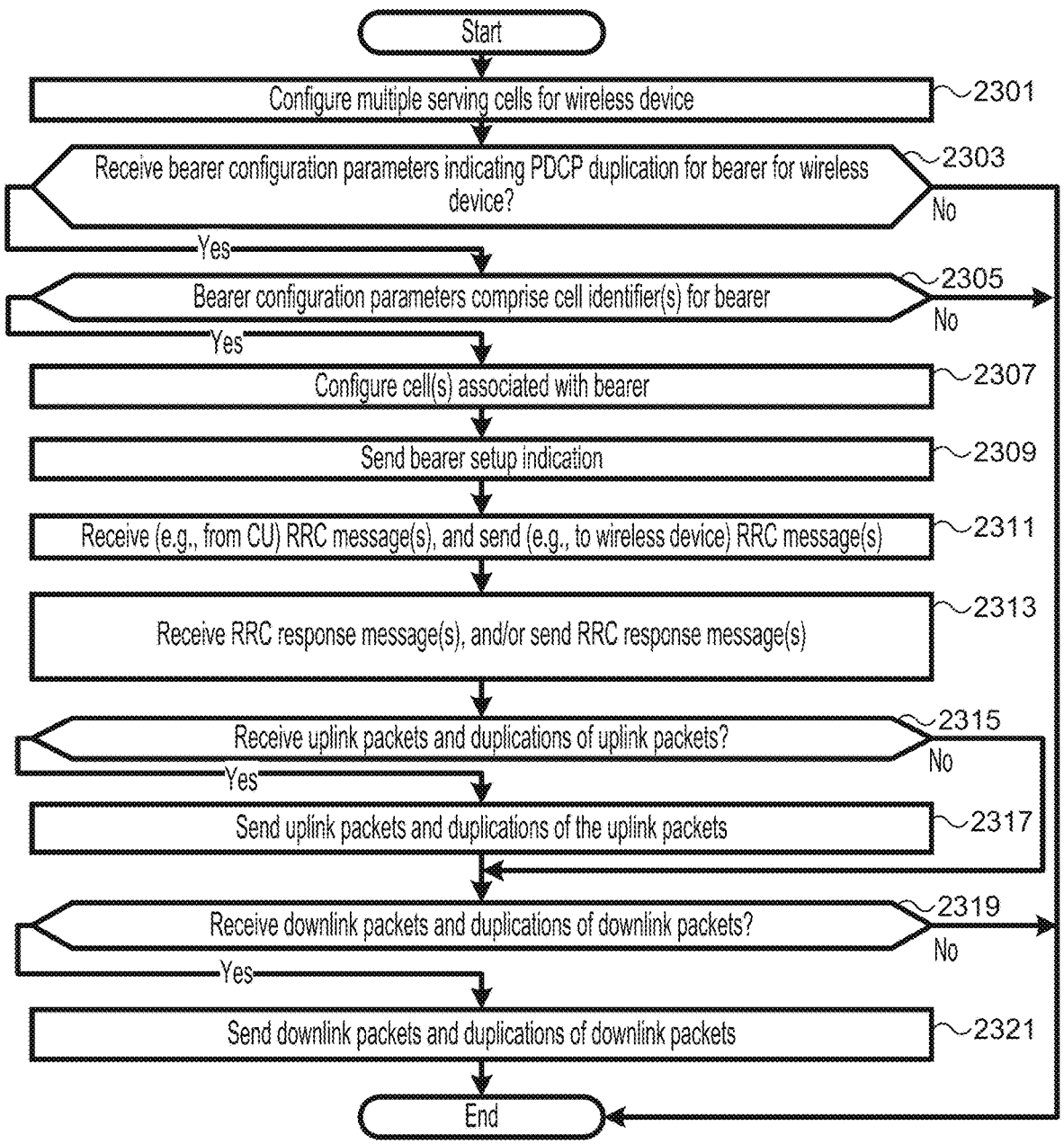
FIG. 23 shows an example method for cell configuration associated with a second part of a base station.

FIG. 23 shows an example method for cell configuration that may be performed, for example, by a base station DU. In step 2301, a base station DU may configure multiple serving cells (e.g., carrier aggregation) for a wireless device. In step 2303, the base station DU may determine whether bearer configuration parameters indicating PDCP duplication for a bearer for the wireless device are received from a base station CU. If the base station DU determines that it has received such bearer configuration parameters (step 2303: Yes), the method may proceed to step 2305. If the base station DU determines that it has not received such bearer configuration parameters (step 2303: No), the method may end. In step 2305, the base station DU may determine whether the received bearer configuration parameters comprise cell identifier(s) for the bearer. The bearer configuration parameters may comprise first cell identifier(s) (e.g., cell index) of first cell(s) for a first logical channel of the bearer, and second cell identifier(s) (e.g., cell index) of second cell(s) for a second logical channel for duplications of packets of the first logical channel. If the base station DU determines that it has received bearer configuration parameters comprising cell identifier(s) for the bearer (step 2305: Yes), the method may proceed to step 2307. If the base station DU determines that it has not received bearer configuration parameters comprising cell identifier(s) for the bearer (step 2305: No), the method may end.

In step 2307, the base station DU may configure cell(s) associated with the bearer. The base station DU may configure the first cell(s) for the first logical channel, and the second cell(s) for the second logical channel. In step 2309, the base station DU may send, to the base station CU, a bearer setup indication associated with the bearer. The bearer setup indication may indicate, for example, that the first cell(s) for the first logical channel and the second cell(s) for the second logical channel are configured by the base station DU. The bearer setup indication may additionally or alternatively indicate physical layer parameters associated with the configured cell(s) (e.g., the first cell(s) and/or the second cell(s)).

In step 2311, the base station DU may receive, from the base station CU, RRC message(s). The RRC message(s) may indicate, for example, configuration parameters comprising the first cell identifier(s) for the first logical channel and the second cell identifier(s) for the second logical channel. The base station DU may send (e.g., forward, transmit, etc.), to the wireless device, the RRC message(s). In step 2313, the base station DU may receive, from the wireless device, RRC response message(s). The RRC response message(s) may indicate, for example, the cell(s) have been configured by the wireless device based on the configuration parameters (e.g., indicated in the RRC message(s)). The base station DU may send (e.g., forward, transmit, etc.), to the base station CU, the RRC response message(s).

In step 2315, the base station DU may determine whether uplink packets are received from the wireless device (e.g., via the first logical channel and/or the first cell(s)), and whether duplications of the uplink packets are received from the wireless device (e.g., via the second logical channel and/or the second cell(s)). If the base station DU determines that it has received the uplink packets and the duplications of the uplink packets (step 2315: Yes), the method may proceed to step 2317. If the base station DU determines that it has not received the uplink packets and the duplications of the uplink packets (step 2315: No), the method may proceed to step 2319. Additionally or alternatively, the base station DU may determine whether a PDCP duplication activation indication for the bearer is sent (e.g., from the base station DU) to the wireless device. If the base station DU determines that such an indication is sent, the method may proceed to step 2317. If the base station DU determines that such an indication is not sent, the method may proceed to step 2319.

In step 2317, the base station DU may send (e.g., forward, transmit, etc.), to the base station CU (e.g., via a first tunnel for the first logical channel), the uplink packets; and the base station DU may send (e.g., forward, transmit, etc.), to the base station CU (e.g., via a second tunnel for the second logical channel), the duplications of the uplink packets. In step 2319, the base station DU may determine whether downlink packets associated with the wireless device are received from the base station CU (e.g., via the first tunnel for the first logical channel), and whether duplications of the downlink packets associated with the wireless device are received from the base station CU (e.g., via the second tunnel for the second logical channel. If the base station DU determines that is has received the downlink packets and the duplications of the downlink packets (step 2319: Yes), the method may proceed to step 2321. If the base station DU determines that it has not received the downlink packets and the duplications of the downlink packets (step 2319: No), the method may end. In step 2321, the base station DU may send (e.g., forward, transmit, etc.), to the wireless device (e.g., via the first logical channel and/or the first cell(s)), the downlink packets; and the base station DU may send (e.g., forward, transmit, etc.), to the wireless device (e.g., via the second logical channel and/or the second cell(s)), the duplications of the downlink packets.

Figure 24:
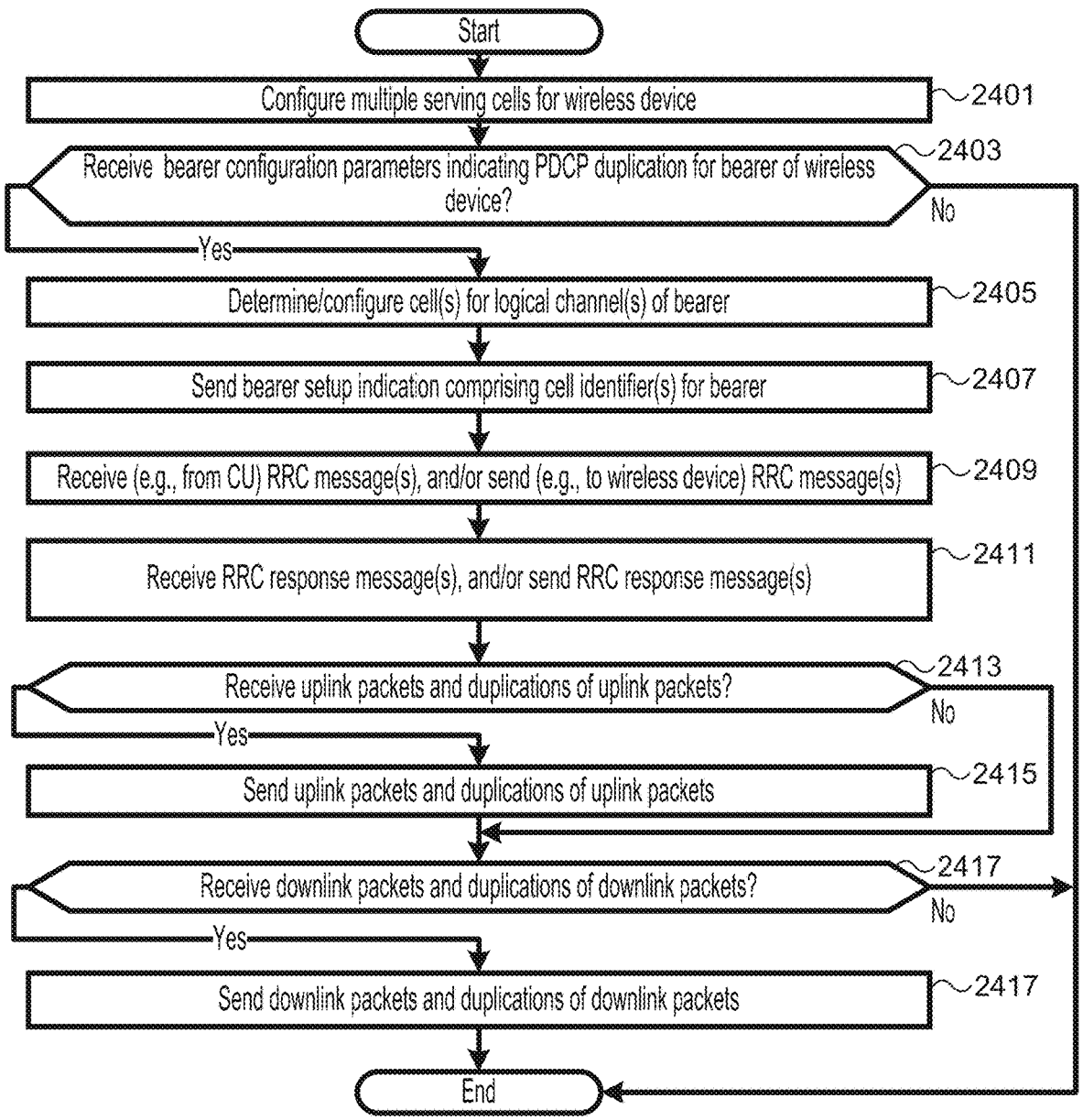
FIG. 24 shows another example method for cell configuration associated with a second part of a base station.

FIG. 24 shows an example method for cell configuration that may be performed, for example, by a base station DU. In step 2401, a base station DU may configure multiple serving cells (e.g., carrier aggregation) for a wireless device. In step 2403, the base station DU may determine whether bearer configuration parameters indicating PDCP duplication for a bearer for the wireless device are received from a base station CU. If the base station DU determines that it has received such bearer configuration parameters (step 2403: Yes), the method may proceed to step 2405. If the base station DU determines that it has not received such bearer configuration parameters (step 2403: No), the method may end. In step 2405, the base station DU may determine and/or configure cell(s) for logical channel(s) of the bearer. The base station DU may determine and/or configure: first cell(s) for a first logical channel of the bearer, and second cell(s) for a second logical channel for duplications of packets of the first logical channel. The determination may be, for example, based on: a channel station information report, associated with the cell(s), received from the wireless device; on a measurement result of one or more sounding reference signals, associated with the cell(s), received from the wireless device; and/or the like.

In step 2407, the base station DU may send, to the base station CU, a bearer setup indication associated with the bearer. The bearer setup indication may indicate, for example, that the bearer is configured by the base station DU. The bearer setup indication may additionally or alternatively indicate bearer configuration parameters comprising cell identifier(s) for the bearer. The bearer configuration parameters may comprise: first cell identifier(s) (e.g., cell index) of the first cell(s) for the first logical channel, and second cell identifier(s) (e.g., cell index) of the second cell(s) for the second logical channel.

In step 2409, the base station DU may receive, from the base station CU, RRC message(s). The RRC message(s)

may indicate, for example, configuration parameters comprising: the first cell identifier(s) for the first logical channel, and the second cell identifier(s) for the second logical channel. The base station DU may send (e.g., forward, transmit, etc.), to the wireless device, the RRC message(s). In step 2411, the base station DU may receive, from the wireless device, RRC response message(s). The RRC response message(s) may indicate, for example, the cell(s) have been configured by the wireless device based on the configuration parameters (e.g., indicated in the RRC message(s)). The base station DU may send (e.g., forward, transmit, etc.), to the base station CU, the RRC response message(s).

In step 2413, the base station DU may determine whether uplink packets are received from the wireless device (e.g., via the first logical channel and/or the first cell(s)), and whether duplications of the uplink packets are received from the wireless device (e.g., via the second logical channel and/or the second cell(s)). If the base station DU determines that it has receive the uplink packets and the duplications of the uplink packets (step 2413: Yes), the method may proceed to step 2415. If the base station DU determines that it has not received the uplink packets and the duplications of the uplink packets (step 2413: No), the method may proceed to step 2417. Additionally or alternatively, the base station DU may determine whether a PDCP duplication activation indication for the bearer is sent (e.g., from the base station DU) to the wireless device. If the base station DU determines that such an indication is sent, the method may proceed to step 2415. If the base station DU determines that such an indication is not sent, the method may proceed to step 2417.

In step 2415, the base station DU may send (e.g., forward, transmit, etc.), to the base station CU (e.g., via a first tunnel for the first logical channel), the uplink packets; and the base station DU may send (e.g., forward, transmit), to the base station CU (e.g., via a second tunnel for the second logical channel), the duplications of the uplink packets. In step 2417, the base station DU may determine whether downlink packets associated with the wireless device are received from the base station CU (e.g., via the first tunnel for the first logical channel), and whether duplications of the downlink packets associated with the wireless device are received from the base station CU (e.g., via the second tunnel for the second logical channel). If the base station DU determines that it has received the downlink packets and the duplications of the downlink packets (step 2417: Yes), the method may proceed to step 2419. If the base station DU determines that it has not received the downlink packets and the duplications of the downlink packets (step 2417: No), the method may end. In step 2419, the base station DU may send (e.g., forward, transmit, etc.), to the wireless device (e.g., via the first logical channel and/or the first cell(s)), the downlink packets; and the base station DU may send (e.g., forward, transmit, etc.), to the wireless device (e.g., via the second logical channel and/or the second cell(s)), the duplications of the downlink packets.

Figure 25:
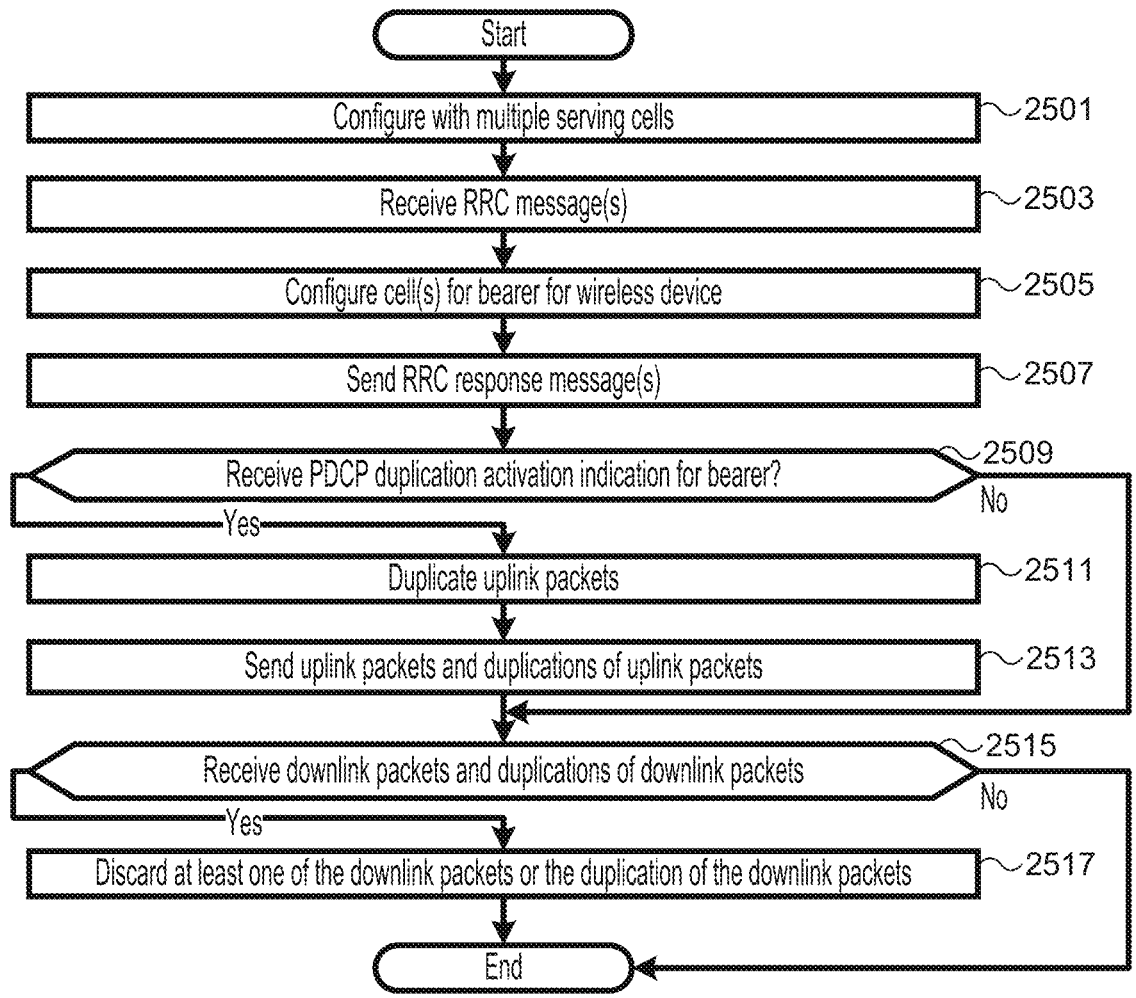
FIG. 25 shows an example method for cell configuration associated with a wireless device.

FIG. 25 shows an example method for cell configuration that may be performed, for example, by a wireless device. In step 2501, a wireless device may configure itself with multiple serving cells (e.g., carrier aggregation). In step 2503, the wireless device may receive, from a base station CU (e.g., via a base station DU), RRC message(s). The RRC message(s) may comprise, for example, configuration parameters. The configuration parameters may comprise: first cell identifier(s) (e.g., cell index) of first cell(s) for a first logical channel of a bearer for the wireless device, and second cell identifier(s) (e.g., cell index) of second cell(s) for a second logical channel for duplications of packets of the first logical channel. In step 2505, the wireless device may configure the cell(s) for the bearer for the wireless device. The wireless device may configure, based on the RRC message(s), the first cell(s) for the first logical channel and the second cell(s) for the second logical channel.

In step 2507, the wireless device may send, to the base station CU (e.g., via the base station DU), RRC response message(s). The RRC response message(s) may indicate, for example, that the cell(s) for the bearer have been configured by the wireless device based on the configuration parameters (e.g., indicated in the RRC message(s)). In step 2509, the wireless device may determine whether a PDCP duplication activation indication associated with the bearer for the wireless device is received (e.g., from the base station CU and/or the base station DU). If the wireless device determines that a PDCP duplication activation indication associated with the bearer for the wireless device is received (step 2509: Yes), the method may proceed to step 2511. If the wireless device determines that a PDCP duplication activation indication associated with the bearer for the wireless device is not received (step 2509: No), the method may proceed to step 2515. Additionally or alternatively, the wireless device may determine whether the wireless device has uplink packets, associated with the bearer, to be sent. If the wireless device determines that it has such uplink packets to be sent, the method may proceed to step 2511. If the wireless device determines that it does not have such uplink packets to be sent, the method may proceed to step 2515.

In step 2511, the wireless device may duplicate the uplink packets, associated with the bearer, to be sent. The wireless device may generate duplications of the uplink packets. In step 2513, the wireless device may send, to the base station CU (e.g., via the base station DU) and via the first logical channel and/or the first cell(s), the uplink packets; and the wireless device may send, to the base station CU (e.g., via the base station DU) and via the second logical channel and/or the second cell(s), the duplications of the uplink packets. In step 2515, the wireless device may receive, from the base station CU (e.g., via the base station DU) and via the first logical channel and/or the first cell(s), downlink packets; and the wireless device may receive, from the base station CU (e.g., via the base station DU) and via the second logical channel and/or the second cell(s), duplications of the downlink packets. In step 2517, the wireless device may discard at least one of the received downlink packets or the received duplications of the downlink packets (e.g., in order to de-duplicate the received packets).

A base station DU may receive, from a base station CU, a first message comprising bearer configuration parameters of a bearer for a wireless device. The bearer configuration parameters may comprise a first parameter indicating that packet duplication is configured for the bearer, at least one first cell index of at least one first cell for a first logical channel, and at least one second cell index of at least one second cell for a second logical channel. The second logical channel may be for duplications of packet data convergence protocol packets of the first logical channel. The base station DU may send, to the base station CU, a second message comprising first physical layer parameters for the at least one first cell and second physical layer parameters for the at least one second cell. The base station DU may receive, from the base station CU, a radio resource control message comprising configuration parameters for the wireless device. The configuration parameters may comprise the bearer configuration parameters, the first physical layer parameters, and the second physical layer parameters. The base station DU may send, to the wireless device, the radio resource control message.

The base station DU may send, to the wireless device: first transport blocks of the first logical channel via the at least one first cell, and second transport blocks of the second logical channel via the at least one second cell. The base station DU may receive, from the wireless device: first transport blocks of the first logical channel via the at least one first cell, and second transport blocks of the second logical channel via the at least one second cell. The base station DU may send, to the wireless device, the radio resource control message without interpretation. The radio resource control message may comprise a radio resource control reconfiguration message. The at least one first cell may be different from the at least one second cell. The bearer configuration parameters may further comprise at least one of a first logical channel index of the first logical channel and a second logical channel index of the second logical channel.

The first message may further comprise: a first tunnel endpoint identifier of a first tunnel for the first logical channel, and a second tunnel endpoint identifier of a second tunnel for the second logical channel. The base station DU may send, to the base station CU packets of the first logical channel via the first tunnel, and packets of the second logical channel via the second tunnel. The base station DU may receive, from the base station CU: packets of the first logical channel via the first tunnel, and packets of the second logical channel via the second tunnel. The first message may further comprise at least one of: a parameter indicating that the first logical channel comprises an original logical channel of the first bearer, and/or a parameter indicating that the second logical channel is for duplicated packets of the first bearer. The second message may comprise at least one of: at least one third cell index of at least one third cell for the first logical channel, and/or at least one fourth cell index of at least one fourth cell for the second logical channel. The base station DU may determine the at least one third cell or the at least one fourth cell, based on at least one of: a channel state information report received from the wireless device, or a measurement result of one or more sounding reference signals received from the wireless device. The base station DU may send a medium access control (MAC) control element (CE) indicating an activation of the packet duplication for the bearer. The base station DU may send a MAC CE indicating a deactivation of the packet duplication for the bearer.

The base station CU may receive, from the wireless device, at least one measurement report comprising measurement results of: the at least one first cell, and/or the at least one second cell. The measurement results may comprise at least one of: a reference signal received power, and/or a reference signal received quality. The base station CU may determine, for example, based on the at least one measurement report, the packet duplication for the bearer. The at least one second cell may comprise a licensed assisted access cell. The second message may indicate that the bearer is configured for the wireless device. The base station DU may receive the radio resource control message via a downlink radio resource control message transfer message. The base station CU may comprise: at least one of a radio resource control layer function, a packet data convergence protocol layer function, or a service data adaptation protocol layer function. The base station DU may comprise at least one of: a physical layer function, a medium access control layer function, and/or a radio link control layer function.

A base station DU may receive, from a base station CU, a first message comprising bearer configuration parameters of a bearer for a wireless device. The bearer configuration parameters may comprise: a first parameter indicating that packet duplication is configured for the bearer, at least one first cell index of at least one first cell for a first logical channel, and/or at least one second cell index of at least one second cell for a second logical channel. The second logical channel may be for duplications of packet data convergence protocol packets of the first logical channel. The base station DU may send, to the base station CU, a second message indicating that the bearer is configured by the base station DU. The base station DU may receive, from the base station CU, a radio resource control message comprising configuration parameters for the wireless device. The configuration parameters may comprise: the at least one first cell index for the first logical channel, and the at least one second cell index for the second logical channel. The base station DU may send, to the wireless device, the radio resource control message.

A base station CU may determine packet duplication for a bearer for a wireless device. The base station CU may send, to a base station DU, a first message comprising bearer configuration parameters of the bearer for the wireless device. The bearer configuration parameters may comprise: a first parameter indicating that the packet duplication is configured for the bearer, at least one first cell index of at least one first cell for a first logical channel, and/or at least one second cell index of at least one second cell for a second logical channel. The second logical channel may be for duplications of packet data convergence protocol packets of the first logical channel. The base station CU may receive, from the base station DU, a second message comprising: first physical layer parameters for the at least one first cell, and/or second physical layer parameters for the at least one second cell. The base station CU may send, to the wireless device via the base station DU, a radio resource control message comprising configuration parameters for the wireless device. The configuration parameters may comprise the bearer configuration parameters, the first physical layer parameters, and/or the second physical layer parameters.

A base station DU may receive, from a base station CU, a first message comprising bearer configuration parameters for a wireless device. The bearer configuration parameters may comprise at least one of: a first bearer identifier of a first bearer, and/or a PDCP duplication information for the first bearer. The base station DU may determine, based on the bearer configuration parameters, at least one first cell to be used for a first logical channel of the first bearer, and/or at least one second cell to be used for a second logical channel for duplications of PDCP packets of the first logical channel. The base station DU may send, to the base station CU, a second message comprising radio resource configuration parameters for the wireless device. The radio resource configuration parameters may comprise at least one: first cell identifier of the at least one first cell and for the first logical channel, and/or at least one second cell identifier of the at least one second cell and for the second logical channel. The base station DU may receive, from the base station CU, an RRC message comprising the radio resource configuration parameters. The base station DU may send, to the wireless device, the RRC message.

The base station DU may receive/send, from/to the wireless device: first transport blocks associated with the first logical channel, and/or second transport blocks associated with the second logical channel. The base station DU may receive/send: the first transport blocks via the at least one first cell, and/or the second transport blocks via the at least one second cell. The base station DU may send, to the wireless device, the RRC message without interpretation. The RRC message may be an RRC connection reconfiguration message. Each of the at least one second cell may be different from any of the at least one first cell.

The PDCP duplication information may comprise at least one of: at least one logical channel information element (IE) (e.g., comprising the first logical channel identifier of the first logical channel of the first bearer, and/or the second logical channel identifier of the second logical channel for duplications of PDCP packets of the first logical channel), and/or a PDCP duplication indication IE indicating that PDCP packets of the first bearer are duplicated. The first message may comprise: a first tunnel endpoint identifier of a first tunnel for the first logical channel, and/or a second tunnel endpoint identifier of a second tunnel for the second logical channel. The base station DU may send, to the base station CU: the first transport blocks via the first tunnel, and/or the second transport blocks via the second tunnel. The first message may further comprise at least one of: a first information element (IE) indicating the first logical channel is a default logical channel of the first bearer, and/or a second IE indicating the second logical channel is for duplicated PDCP packet transmissions of the first bearer.

A base station DU may receive, from a base station CU, a first message comprising bearer configuration parameters for the wireless device. The bearer configuration parameters may comprise at least one of: a first bearer identifier of a first bearer, a PDCP duplication information for the first bearer, at least one first cell identifier of at least one first cell used for a first logical channel of the first bearer, and/or at least one second cell identifier of at least one second cell used for a second logical channel for duplications of PDCP packets of the first logical channel. The base station DU may configure the at least one first cell for the first logical channel and the at least one second cell for the second logical channel. The base station DU may send, to the base station CU, a second message indicating that the first bearer is setup. The base station DU may receive, from the base station CU, an RRC message comprising radio resource configuration parameters for the wireless device. The radio resource configuration parameters may comprise: the at least one: first cell identifier for the first logical channel, and/or the at least one second cell identifier for the second logical channel. The base station DU may send, to the wireless device, the RRC message.

The base station DU may receive/send, from/to the wireless device: first transport blocks associated with the first logical channel, and/or second transport blocks associated with the second logical channel. The base station DU may receive/send: the first transport blocks via the at least one first cell, and/or the second transport blocks via the at least one second cell. The base station DU may send, to the wireless device, the RRC message without interpretation. The RRC message may be an RRC connection reconfiguration message. Each of the at least one second cell may be different from any of the at least one first cell.

The PDCP duplication information may comprise at least one of: at least one logical channel information element (IE) (e.g., comprising the first logical channel identifier of the first logical channel of the first bearer, and/or the second logical channel identifier of the second logical channel for duplications of PDCP packets of the first logical channel), and/or a PDCP duplication indication IE indicating that PDCP packets of the first bearer are duplicated. The first message may comprise: a first tunnel endpoint identifier of a first tunnel for the first logical channel, and/or a second tunnel endpoint identifier of a second tunnel for the second logical channel. The base station DU may send, to the base station CU: the first transport blocks via the first tunnel, and/or the second transport blocks via the second tunnel. The first message may further comprise at least one of: a first information element (IE) indicating that the first logical channel comprises a default logical channel of the first bearer, and/or a second IE indicating that the second logical channel is for duplicated PDCP packet transmissions of the first bearer.

Figure 26:
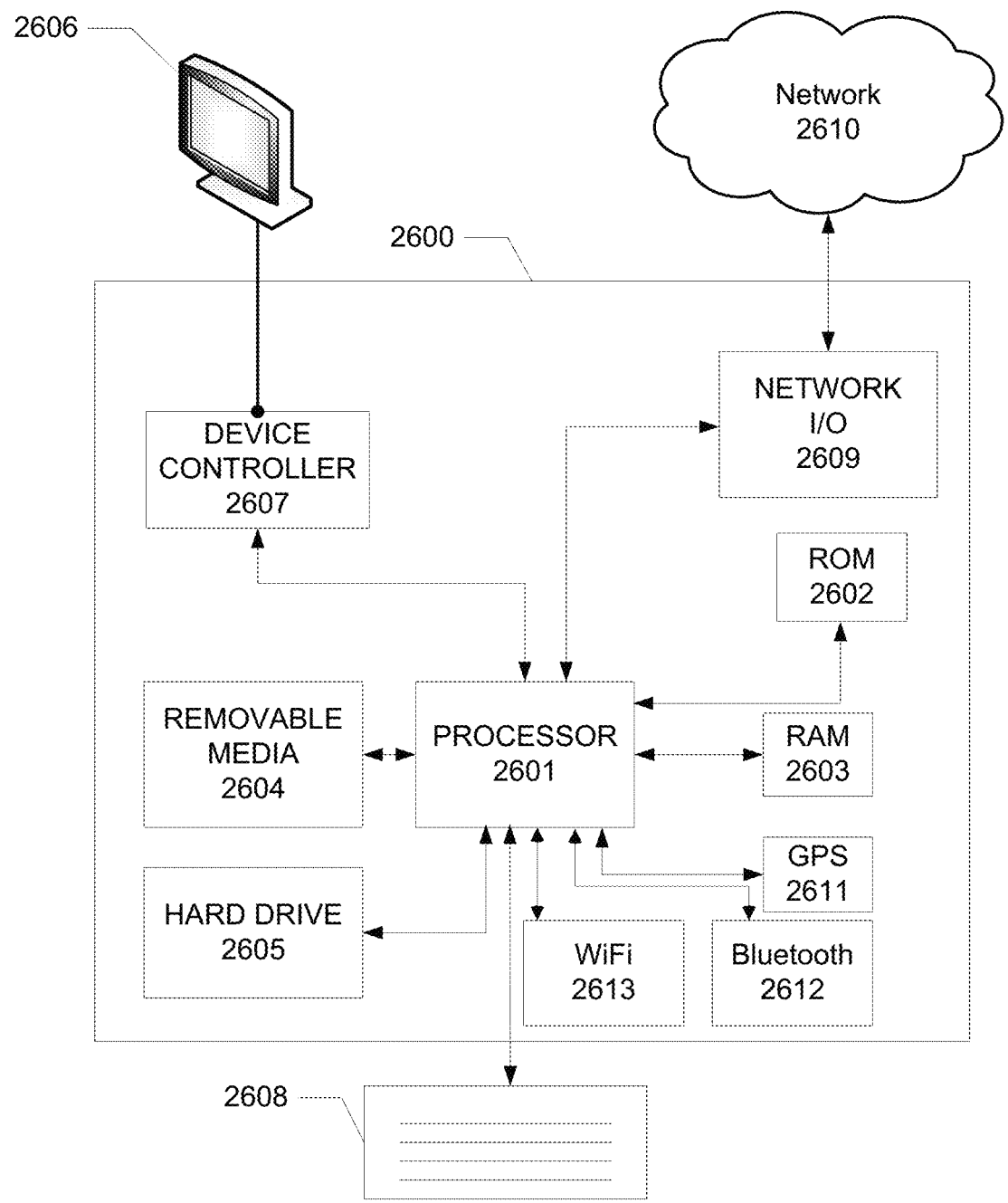
FIG. 26 shows example elements of a computing device that may be used to implement any of the various devices described herein.

FIG. 26 shows general hardware elements that may be used to implement any of the various computing devices discussed herein, including, e.g., the base station 401, the wireless device 406, or any other base station, wireless device, or computing device described herein. The computing device 2600 may include one or more processors 2601, which may execute instructions stored in the random access memory (RAM) 2603, the removable media 2604 (such as a Universal Serial Bus (USB) drive, compact disk (CD) or digital versatile disk (DVD), or floppy disk drive), or any other desired storage medium. Instructions may also be stored in an attached (or internal) hard drive 2605. The computing device 2600 may also include a security processor (not shown), which may execute instructions of one or more computer programs to monitor the processes executing on the processor 2601 and any process that requests access to any hardware and/or software components of the computing device 2600 (e.g., ROM 2602, RAM 2603, the removable media 2604, the hard drive 2605, the device controller 2607, a network interface 2609, a GPS 2611, a Bluetooth interface 2612, a Wi-Fi interface 2613, etc.). The computing device 2600 may include one or more output devices, such as the display 2606 (e.g., a screen, a display device, a monitor, a television, etc.), and may include one or more output device controllers 2607, such as a video processor. There may also be one or more user input devices 2608, such as a remote control, keyboard, mouse, touch screen, microphone, etc. The computing device 2600 may also include one or more network interfaces, such as a network interface 2609, which may be a wired interface, a wireless interface, or a combination of the two. The network interface 2609 may provide an interface for the computing device 2600 to communicate with a network 2610 (e.g., a RAN, or any other network). The network interface 2609 may include a modem (e.g., a cable modem), and the external network 2610 may include communication links, an external network, an in-home network, a provider's wireless, coaxial, fiber, or hybrid fiber/coaxial distribution system (e.g., a DOCSIS network), or any other desired network. Additionally, the computing device 2600 may include a location-detecting device, such as a global positioning system (GPS) microprocessor 2611, which may be configured to receive and process global positioning signals and determine, with possible assistance from an external server and antenna, a geographic position of the computing device 2600.

The example in FIG. 26 may be a hardware configuration, although the components shown may be implemented as software as well. Modifications may be made to add, remove, combine, divide, etc. components of the computing device 2600 as desired. Additionally, the components may be implemented using basic computing devices and components, and the same components (e.g., processor 2601, ROM storage 2602, display 2606, etc.) may be used to implement any of the other computing devices and components described herein. For example, the various components described herein may be implemented using computing devices having components such as a processor executing computer-executable instructions stored on a computer-readable medium, as shown in FIG. 26. Some or all of the entities described herein may be software based, and may co-exist in a common physical platform (e.g., a requesting entity may be a separate software process and program from a dependent entity, both of which may be executed as software on a common computing device).

One or more features of the disclosure may be implemented in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. The functionality of the program modules may be combined or distributed as desired. The functionality may be implemented in whole or in part in firmware or hardware equivalents such as integrated circuits, field programmable gate arrays (FPGA), and the like. Particular data structures may be used to more effectively implement one or more features of the disclosure, and such data structures are contemplated within the scope of computer executable instructions and computer-usable data described herein.

Many of the elements in examples may be implemented as modules. A module may be an isolatable element that performs a defined function and has a defined interface to other elements. The modules may be implemented in hardware, software in combination with hardware, firmware, wetware (i.e., hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally or alternatively, it may be possible to implement modules using physical hardware that incorporates discrete or programmable analog, digital and/or quantum hardware. Examples of programmable hardware may comprise: computers, microcontrollers, microprocessors, application-specific integrated circuits (ASICs); field programmable gate arrays (FPGAs); and complex programmable logic devices (CPLDs). Computers, microcontrollers, and microprocessors may be programmed using languages such as assembly, C, C++ or the like. FPGAs, ASICs, and CPLDs may be programmed using hardware description languages (HDL), such as VHSIC hardware description language (VHDL) or Verilog, which may configure connections between internal hardware modules with lesser functionality on a programmable device. The above-mentioned technologies may be used in combination to achieve the result of a functional module.

A non-transitory tangible computer readable media may comprise instructions executable by one or more processors configured to cause operations of multi-carrier communications described herein. An article of manufacture may comprise a non-transitory tangible computer readable machine-accessible medium having instructions encoded thereon for enabling programmable hardware to cause a device (e.g., a wireless device, wireless communicator, a wireless device, a base station, and the like) to allow operation of multi-carrier communications described herein. The device, or one or more devices such as in a system, may include one or more processors, memory, interfaces, and/or the like. Other examples may comprise communication networks comprising devices such as base stations, wireless devices or user equipment (wireless device), servers, switches, antennas, and/or the like. A network may comprise any wireless technology, including but not limited to, cellular, wireless, Wi-Fi, 4G, 5G, any generation of 3GPP or other cellular standard or recommendation, wireless local area networks, wireless personal area networks, wireless ad hoc networks, wireless metropolitan area networks, wireless wide area networks, global area networks, space networks, and any other network using wireless communications. Any device (e.g., a wireless device, a base station, or any other device) or combination of devices may be used to perform any combination of one or more of steps described herein, including, e.g., any complementary step or steps of one or more of the above steps.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting.

The invention claimed is:

1. A method comprising:
sending, by a base station distributed unit to a base station central unit, a message comprising:
at least one first cell index of at least one first cell for a first logical channel; and
at least one second cell index of at least one second cell for a second logical channel, wherein the second logical channel is for packet duplication associated with the first logical channel;
receiving, by the base station distributed unit from the base station central unit, a radio resource control message comprising configuration parameters for a wireless device, wherein the configuration parameters comprise:
the at least one first cell index of the at least one first cell for the first logical channel; and
the at least one second cell index of the at least one second cell for the second logical channel; and
sending, by the base station distributed unit to the wireless device, the radio resource control message.

2. The method of claim 1, further comprising:
configuring, by the base station distributed unit, the at least one first cell for the first logical channel and the at least one second cell for the second logical channel.

3. The method of claim 1, wherein the radio resource control message further comprises a radio resource control reconfiguration message.

4. The method of claim 1, wherein the at least one second cell is different from the at least one first cell.

5. The method of claim 1, further comprising:
sending, by the base station distributed unit to the base station central unit via a first tunnel for the first logical channel, first transport blocks; and sending, by the base station distributed unit to the base station central unit via a second tunnel for the second logical channel, second transport blocks.

6. The method of claim 1, wherein the message comprises a second message, and wherein the method further comprises:
receiving, by the base station distributed unit from the base station central unit, a first message comprising bearer configuration parameters associated with a bearer for the wireless device, wherein the bearer configuration parameters comprise:
an indication that packet duplication is configured for the bearer;
the at least one first cell index of the at least one first cell for the first logical channel; and
the at least one second cell index of the at least one second cell for the second logical channel.

7. The method of claim 6, wherein the first message further comprises:
a first tunnel endpoint identifier of a first tunnel for the first logical channel; and
a second tunnel endpoint identifier of a second tunnel for the second logical channel.

8. The method of claim 6, wherein the first message further comprises at least one of:
a first information element indicating that the first logical channel comprises a default logical channel of the bearer; or
a second information element indicating that the second logical channel is for duplicated packets of the bearer.

9. The method of claim 1, wherein the second logical channel is for packet duplication of packet data convergence protocol (PDCP) packets associated with the first logical channel, and wherein the message further comprises an indication that a bearer for the wireless device is configured by the base station distributed unit.

10. A method comprising:
receiving, by a base station central unit from a base station distributed unit, a message comprising:
at least one first cell index of at least one first cell for a first logical channel; and
at least one second cell index of at least one second cell for a second logical channel, wherein the second logical channel is for packet duplication associated with the first logical channel; and
sending, by the base station central unit to a wireless device via the base station distributed unit, a radio resource control message comprising configuration parameters for the wireless device, wherein the configuration parameters comprise:
the at least one first cell index of the at least one first cell for the first logical channel; and
the at least one second cell index of the at least one second cell for the second logical channel.

11. The method of claim 10, wherein the radio resource control message further comprises a radio resource control reconfiguration message.

12. The method of claim 10, wherein the at least one second cell is different from the at least one first cell.

13. The method of claim 10, further comprising:
receiving, by the base station central unit from the base station distributed unit via a first tunnel for the first logical channel, first transport blocks; and
receiving, by the base station central unit from the base station distributed unit via a second tunnel for the second logical channel, second transport blocks.

14. The method of claim 10, further comprising:
receiving, by the base station central unit from the wireless device, at least one measurement report comprising measurement results of the at least one first cell or of the at least one second cell, wherein the measurement results comprise at least one of:
a reference signal received power; or
a reference signal received quality; and
determining, by the base station central unit and based on the at least one measurement report, packet duplication for a bearer for the wireless device.

15. The method of claim 10, wherein the message comprises a second message, and wherein the method further comprises:
determining, by the base station central unit, whether packet duplication is configured for a bearer for the wireless device; and
sending, by the base station central unit to the base station distributed unit, a first message comprising bearer configuration parameters associated with the bearer for the wireless device, wherein the bearer configuration parameters comprise:
an indication that the packet duplication is configured for the bearer;
the at least one first cell index of the at least one first cell for the first logical channel; and
the at least one second cell index of the at least one second cell for the second logical channel.

16. The method of claim 15, wherein the first message further comprises at least one of:
a first information element indicating that the first logical channel comprises a default logical channel of the bearer; or
a second information element indicating that the second logical channel is for duplicated packets of the bearer.

17. The method of claim 15, wherein the first message further comprises:
a first tunnel endpoint identifier of a first tunnel for the first logical channel; and
a second tunnel endpoint identifier of a second tunnel for the second logical channel.

18. The method of claim 10, wherein the second logical channel is for packet duplication of packet data convergence protocol (PDCP) packets associated with the first logical channel, and wherein the message further comprises an indication that a bearer for the wireless device is configured by the base station distributed unit.

19. A base station distributed unit comprising:
one or more processors; and
memory storing instructions that, when executed by the one or more processors, cause the base station distributed unit to:
send, to a base station central unit, a message comprising:
at least one first cell index of at least one first cell for a first logical channel; and
at least one second cell index of at least one second cell for a second logical channel, wherein the second logical channel is for packet duplication associated with the first logical channel;
receive, from the base station central unit, a radio resource control message comprising configuration parameters for a wireless device, wherein the configuration parameters comprise:
the at least one first cell index of the at least one first cell for the first logical channel; and
the at least one second cell index of the at least one second cell for the second logical channel; and send, to the wireless device, the radio resource control message.

20. The base station distributed unit of claim 19, wherein the instructions, when executed by the one or more processors, further cause the base station distributed unit to:
configure the at least one first cell for the first logical channel and the at least one second cell for the second logical channel.

21. The base station distributed unit of claim 19, wherein the radio resource control message further comprises a radio resource control reconfiguration message.

22. The base station distributed unit of claim 19, wherein the at least one second cell is different from the at least one first cell.

23. The base station distributed unit of claim 19, wherein the instructions, when executed by the one or more processors, further cause the base station distributed unit to:
send, to the base station central unit via a first tunnel for the first logical channel, first transport blocks; and
send, to the base station central unit via a second tunnel for the second logical channel, second transport blocks.

24. The base station distributed unit of claim 19, wherein the message comprises a second message, and wherein the instructions, when executed by the one or more processors, further cause the base station distributed unit to:
receive, from the base station central unit, a first message comprising bearer configuration parameters associated with a bearer for the wireless device, wherein the bearer configuration parameters comprise:
an indication that packet duplication is configured for the bearer;
the at least one first cell index of the at least one first cell for the first logical channel; and
the at least one second cell index of the at least one second cell for the second logical channel.

25. The base station distributed unit of claim 24, wherein the first message further comprises:
a first tunnel endpoint identifier of a first tunnel for the first logical channel; and
a second tunnel endpoint identifier of a second tunnel for the second logical channel.

26. The base station distributed unit of claim 24, wherein the first message further comprises at least one of:
a first information element indicating that the first logical channel comprises a default logical channel of the bearer; or
a second information element indicating that the second logical channel is for duplicated packets of the bearer.

27. The base station distributed unit of claim 19, wherein the second logical channel is for packet duplication of packet data convergence protocol (PDCP) packets associated with the first logical channel, and wherein the message further comprises an indication that a bearer for the wireless device is configured by the base station distributed unit.

28. A base station central unit comprising:
one or more processors; and
memory storing instructions that, when executed by the one or more processors, cause the base station central unit to:
receive, from a base station distributed unit, a message comprising:
at least one first cell index of at least one first cell for a first logical channel; and
at least one second cell index of at least one second cell for a second logical channel, wherein the second logical channel is for packet duplication associated with the first logical channel; and
send, to a wireless device via the base station distributed unit, a radio resource control message comprising configuration parameters for the wireless device, wherein the configuration parameters comprise:
the at least one first cell index of the at least one first cell for the first logical channel; and
the at least one second cell index of the at least one second cell for the second logical channel.

29. The base station central unit of claim 28, wherein the radio resource control message further comprises a radio resource control reconfiguration message.

30. The base station central unit of claim 28, wherein the at least one second cell is different from the at least one first cell.

31. The base station central unit of claim 28, wherein the instructions, when executed by the one or more processors, further cause the base station central unit to:
receive, from the base station distributed unit via a first tunnel for the first logical channel, first transport blocks; and
receive, from the base station distributed unit via a second tunnel for the second logical channel, second transport blocks.

32. The base station central unit of claim 28, wherein the instructions, when executed by the one or more processors, further cause the base station central unit to:
receive, from the wireless device, at least one measurement report comprising measurement results of the at least one first cell or of the at least one second cell, wherein the measurement results comprise at least one of:
a reference signal received power; or
a reference signal received quality; and
determine, based on the at least one measurement report, packet duplication for a bearer for the wireless device.

33. The base station central unit of claim 28, wherein the message comprises a second message, and wherein the instructions, when executed by the one or more processors, further cause the base station central unit to:
determine, whether packet duplication is configured for a bearer for the wireless device; and
send, to the base station distributed unit, a first message comprising bearer configuration parameters associated with the bearer, wherein the bearer configuration parameters comprise:
an indication that the packet duplication is configured for the bearer;
the at least one first cell index of the at least one first cell for the first logical channel; and
the at least one second cell index of the at least one second cell for the second logical channel.

34. The base station central unit of claim 33, wherein the first message further comprises at least one of:
a first information element indicating that the first logical channel comprises a default logical channel of the bearer; or
a second information element indicating that the second logical channel is for duplicated packets of the bearer.

35. The base station central unit of claim 33, wherein the first message further comprises:
a first tunnel endpoint identifier of a first tunnel for the first logical channel; and
a second tunnel endpoint identifier of a second tunnel for the second logical channel.

36. The base station central unit of claim 28, wherein the second logical channel is for packet duplication of packet data convergence protocol (PDCP) packets associated with the first logical channel, and wherein the message further comprises an indication that a bearer for the wireless device is configured by the base station distributed unit.

37. A non-transitory computer-readable medium storing instructions that, when executed, configure a base station distributed unit to:
   send, to a base station central unit, a message comprising:
      at least one first cell index of at least one first cell for a first logical channel; and
      at least one second cell index of at least one second cell for a second logical channel, wherein the second logical channel is for packet duplication associated with the first logical channel;
   receive, from the base station central unit, a radio resource control message comprising configuration parameters for a wireless device, wherein the configuration parameters comprise:
      the at least one first cell index of the at least one first cell for the first logical channel; and
      the at least one second cell index of the at least one second cell for the second logical channel; and
   send, to the wireless device, the radio resource control message.

38. The non-transitory computer-readable medium of claim 37, wherein the instructions, when executed, further cause the base station distributed unit to:
   configure the at least one first cell for the first logical channel and the at least one second cell for the second logical channel.

39. The non-transitory computer-readable medium of claim 37, wherein the radio resource control message further comprises a radio resource control reconfiguration message.

40. The non-transitory computer-readable medium of claim 37, wherein the at least one second cell is different from the at least one first cell.

41. The non-transitory computer-readable medium of claim 37, wherein the instructions, when executed, further cause the base station distributed unit to:
   send, to the base station central unit via a first tunnel for the first logical channel, first transport blocks; and
   send, to the base station central unit via a second tunnel for the second logical channel, second transport blocks.

42. The non-transitory computer-readable medium of claim 37, wherein the message comprises a second message, and wherein the instructions, when executed, further cause the base station distributed unit to:
   receive, from the base station central unit, a first message comprising bearer configuration parameters associated with a bearer for the wireless device, wherein the bearer configuration parameters comprise:
      an indication that packet duplication is configured for the bearer;
      the at least one first cell index of the at least one first cell for the first logical channel; and
      the at least one second cell index of the at least one second cell for the second logical channel.

43. The non-transitory computer-readable medium of claim 42, wherein the first message further comprises:
   a first tunnel endpoint identifier of a first tunnel for the first logical channel; and
   a second tunnel endpoint identifier of a second tunnel for the second logical channel.

44. The non-transitory computer-readable medium of claim 42, wherein the first message further comprises at least one of:
   a first information element indicating that the first logical channel comprises a default logical channel of the bearer; or
   a second information element indicating that the second logical channel is for duplicated packets of the bearer.

45. The non-transitory computer-readable medium of claim 37, wherein the second logical channel is for packet duplication of packet data convergence protocol (PDCP) packets associated with the first logical channel, and wherein the message further comprises an indication that a bearer for the wireless device is configured by the base station distributed unit.

46. A non-transitory computer-readable medium storing instructions that, when executed, configure a base station central unit to:
   receive, from a base station distributed unit, a message comprising:
      at least one first cell index of at least one first cell for a first logical channel; and
      at least one second cell index of at least one second cell for a second logical channel, wherein the second logical channel is for packet duplication associated with the first logical channel; and
   send, to a wireless device via the base station distributed unit, a radio resource control message comprising configuration parameters for the wireless device, wherein the configuration parameters comprise:
      the at least one first cell index of the at least one first cell for the first logical channel; and
      the at least one second cell index of the at least one second cell for the second logical channel.

47. The non-transitory computer-readable medium of claim 46, wherein the radio resource control message further comprises a radio resource control reconfiguration message.

48. The non-transitory computer-readable medium of claim 46, wherein the at least one second cell is different from the at least one first cell.

49. The non-transitory computer-readable medium of claim 46, wherein the instructions, when executed, further cause the base station central unit to:
   receive, from the base station distributed unit via a first tunnel for the first logical channel, first transport blocks; and
   receive, from the base station distributed unit via a second tunnel for the second logical channel, second transport blocks.

50. The non-transitory computer-readable medium of claim 46, wherein the instructions, when executed, further cause the base station central unit to:
   receive, from the wireless device, at least one measurement report comprising measurement results of the at least one first cell or of the at least one second cell, wherein the measurement results comprise at least one of:
      a reference signal received power; or
      a reference signal received quality; and
   determine, based on the at least one measurement report, packet duplication for a bearer for the wireless device.

51. The non-transitory computer-readable medium of claim 46, wherein the message comprises a second message, and wherein the instructions, when executed, further cause the base station central unit to:
   determine, whether packet duplication is configured for a bearer for the wireless device; and send, to the base station distributed unit, a first message comprising bearer configuration parameters associated with the bearer, wherein the bearer configuration parameters comprise:
- an indication that the packet duplication is configured for the bearer;
- the at least one first cell index of the at least one first cell for the first logical channel; and
- the at least one second cell index of the at least one second cell for the second logical channel.

52. The non-transitory computer-readable medium of claim 51, wherein the first message further comprises at least one of:
- a first information element indicating that the first logical channel comprises a default logical channel of the bearer; or
- a second information element indicating that the second logical channel is for duplicated packets of the bearer.

53. The non-transitory computer-readable medium of claim 51, wherein the first message further comprises:
- a first tunnel endpoint identifier of a first tunnel for the first logical channel; and
- a second tunnel endpoint identifier of a second tunnel for the second logical channel.

54. The non-transitory computer-readable medium of claim 46, wherein the second logical channel is for packet duplication of packet data convergence protocol (PDCP) packets associated with the first logical channel, and wherein the message further comprises an indication that a bearer for the wireless device is configured by the base station distributed unit.

55. A system comprising:
a wireless device;
a base station central unit; and
a base station distributed unit configured to:
 send, to the base station central unit, a message comprising:
  at least one first cell index of at least one first cell for a first logical channel; and
  at least one second cell index of at least one second cell for a second logical channel, wherein the second logical channel is for packet duplication associated with the first logical channel,
wherein the base station central unit is configured to:
 send, to the base station distributed unit, a radio resource control message comprising configuration parameters for the wireless device, wherein the configuration parameters comprise:
  the at least one first cell index of the at least one first cell for the first logical channel; and
  the at least one second cell index of the at least one second cell for the second logical channel, and wherein the wireless device is configured to:
 receive, from the base station distributed unit, the radio resource control message.

56. The system of claim 55, wherein the base station distributed unit is further configured to:
configure the at least one first cell for the first logical channel and the at least one second cell for the second logical channel.

57. The system of claim 55, wherein the radio resource control message further comprises a radio resource control reconfiguration message.

58. The system of claim 55, wherein the at least one second cell is different from the at least one first cell.

59. The system of claim 55, wherein the base station distributed unit is further configured to:
- send, to the base station central unit via a first tunnel for the first logical channel, first transport blocks; and
- send, to the base station central unit via a second tunnel for the second logical channel, second transport blocks.

60. The system of claim 55, wherein the message comprises a second message, and wherein the base station central unit is further configured to:
 send, to the base station distributed unit, a first message comprising bearer configuration parameters associated with a bearer for the wireless device, wherein the bearer configuration parameters comprise:
- an indication that packet duplication is configured for the bearer;
- the at least one first cell index of the at least one first cell for the first logical channel; and
- the at least one second cell index of the at least one second cell for the second logical channel.

61. The system of claim 60, wherein the first message further comprises:
- a first tunnel endpoint identifier of a first tunnel for the first logical channel; and
- a second tunnel endpoint identifier of a second tunnel for the second logical channel.

62. The system of claim 60, wherein the first message further comprises at least one of:
- a first information element indicating that the first logical channel comprises a default logical channel of the bearer; or
- a second information element indicating that the second logical channel is for duplicated packets of the bearer.

63. The system of claim 55, wherein the second logical channel is for packet duplication of packet data convergence protocol (PDCP) packets associated with the first logical channel, and wherein the message further comprises an indication that a bearer for the wireless device is configured by the base station distributed unit.

* * * * *